United States Patent [19]

Sumi et al.

[11] Patent Number: 5,202,193
[45] Date of Patent: Apr. 13, 1993

[54] N-SUBSTITUTED ACRYLAMIDE COPOLYMER

[75] Inventors: Hideyuki Sumi, Osaka; Hiroshi Hotta, Kyoto; Manabu Kikuta, Tsuzuki; Nario Uejyukkoku; Masashi Takeda, both of Shiga; Osamu Wada, Nagoya; Tomomi Ueda, Kyoto; Toshiaki Doyama, Kusatsu; Shoichi Wakatake, Kyoto; Kanji Tanaka, Shiga, all of Japan

[73] Assignees: Kai-Ichi Kogyo Seiyaku Co., Ltd., Kyoto; Toray Industries, Inc., Tokyo, both of Japan

[21] Appl. No.: 797,868

[22] Filed: Nov. 26, 1991

[30] Foreign Application Priority Data

Nov. 28, 1990 [JP] Japan .................. 2-331072
Nov. 28, 1990 [JP] Japan .................. 2-331073
Nov. 28, 1990 [JP] Japan .................. 2-331074
Nov. 28, 1990 [JP] Japan .................. 2-331075
Nov. 28, 1990 [JP] Japan .................. 2-331076
Nov. 28, 1990 [JP] Japan .................. 2-331077
Nov. 28, 1990 [JP] Japan .................. 2-331078
Nov. 28, 1990 [JP] Japan .................. 2-331079
Nov. 28, 1990 [JP] Japan .................. 2-331083
Nov. 28, 1990 [JP] Japan .................. 2-331084
Nov. 28, 1990 [JP] Japan .................. 2-331085

[51] Int. Cl.$^5$ ............................. B32B 27/34
[52] U.S. Cl. ...................... 428/479.6; 428/304.4; 428/316.6; 428/474.4
[58] Field of Search ............. 521/94; 525/424; 428/304.4, 316.6, 319.7, 474.4, 475.5, 479.3, ·479.6

[56] References Cited

U.S. PATENT DOCUMENTS

| | | | |
|---|---|---|---|
| 3,906,137 | 9/1975 | Bauer | 428/316.6 |
| 4,009,195 | 2/1977 | Leister et al. | 558/358 |
| 4,032,692 | 6/1977 | Birnkraut et al. | 428/442 |
| 4,139,685 | 2/1979 | Schroeder | 428/319.7 |
| 4,205,111 | 5/1980 | Pip et al. | 428/319.7 |
| 4,222,901 | 9/1980 | Sinkovitz | 252/500 |

FOREIGN PATENT DOCUMENTS

| | | |
|---|---|---|
| 0011486 | 5/1980 | European Pat. Off. . |
| 0058980 | 9/1982 | European Pat. Off. . |
| 0259654 | 3/1988 | European Pat. Off. . |
| 0276111 | 7/1988 | European Pat. Off. . |
| 0333146 | 9/1989 | European Pat. Off. . |
| 1645018 | 5/1970 | Fed. Rep. of Germany . |
| 2139926 | 1/1973 | France . |
| 2309667 | 11/1976 | France . |
| 58-38730 | 3/1983 | Japan . |
| 62-121717 | 6/1987 | Japan . |
| 63-246750 | 10/1988 | Japan . |
| 2210047 | 6/1989 | United Kingdom . |

OTHER PUBLICATIONS

WO-8 8/09 350 (Crest-Foam Corp.), Dec. 1, 1988.
World Patents Index Latest, Section Ch, Week 8844, Class A, AN-88-312300, Derwent Publications Ltd., London, GB; & JP-A-63 230 770 (Dainippon Ink. Chem. K.K.) Sep. 27, 1988, Abstract.

*Primary Examiner*—William J. Van Balen
*Attorney, Agent, or Firm*—Armstrong, Westerman, Hattori, McLeland & Naughton

[57] ABSTRACT

A linear random N-substituted acrylamide copolymer comprising 65 to 99% by mole of ethylene units, 1 to 15% by mole of acrylate units and 1 to 35% by mole of acrylamide units, the copolymer having a weight average molecular weight of 1000 to 50000, and an aqueous composition, a resin film, a laminate, recording paper and a foamed article comprising the N-substituted acrylamide copolymer, respectively. The N-substituted acrylamide copolymer is excellent in antistatic ability for thermoplastic resins and does not lower physical properties such as transparency and elongation of films and articles which are formed from a thermoplastic resin. Moreover, the N-substituted acrylamide copolymer is excellent in anti-blocking ability so that the copolymer can be suitably used for various uses.

14 Claims, 9 Drawing Sheets

N-SUBSTITUTED ACRYLAMIDE COPOLYMER

BACKGROUND OF THE INVENTION

The present invention relates to an N-substituted acrylamide copolymer, an intermediate product thereof, an aqueous composition of the N-substituted acrylamide copolymer, and an antistatic thermoplastic resin film, a thermoplastic resin film having a vapor deposition layer, a laminated thermoplastic resin film, a laminate comprising a foamed article and a resin layer, a support for recording sheets, an electroconductive paper, an electrostatic recording paper, a foamed article and a laminate of foamed articles.

Thermoplastic resins such as an olefinic resin, ABS resin and vinyl chloride resin hitherto have been formed into films or bags, which have been widely used as packaging materials or wrapping materials, parts of cars, and the like. Since the thermoplastic resins have high electric resistance, there is a serious defect in the thermoplastic resins that they are easily charged with electricity due to friction and dust is adhered to their surfaces thereby.

Recently, as the methods for imparting antistatic property to the thermoplastic resins, there have been proposed, for instance, (A) a method comprising coating a solution of an antistatic agent on the surface of a resin and drying it.
(B) a method comprising mixing an internal antistatic agent with a resin,
(C) a method comprising coating a silicone compound on the surface of a resin, and
(D) a method comprising modifying a resin itself, and the like.

According to the method (A), a solution of a surfactant is used as an antistatic agent. However, since the antistatic agent is easily removed from the surface of a resin by washing, permanent antistatic property cannot be given.

According to the method (B), as an internal antistatic agent, a glycerine fatty acid ester, a sorbitan fatty acid ester, an alkyldiethanolamide, a sodium alkylbenzenesulfonate, a quaternary salt of alkylimidazole, and the like have been used. When these internal antistatic agents are used, since antistatic property is maintained for a relatively long period of time since the antistatic agent is newly and successively bled out from the inside of the resin even when the antistatic agents are removed from the surface by washing. However, when these internal antistatic agents are used, it takes a long period of time for recovering the antistatic property after washing. Also, dust is rather easy to stick to the surface when the antistatic agent is bled out excessively. Further, there are disadvantages that it is necessary to add an excessive amount of the antistatic agent to the resin during processing and it is difficult to control the effective amount since the antistatic agent is volatilized due to, for instance, heat generated during molding at high temperatures because the agent has a low molecular weight.

In order to solve the defects of the above-mentioned internal antistatic agent, various high molecular weight compounds having an antistatic functional group have been proposed. For instance, Japanese Unexamined Patent Publication No. 170603/1989 proposes polymethyl methacrylate in which 20 to 80% by mole of methoxy groups are modified with diethanolamine. Japanese Examined Patent Publication No. 39860/1983 proposes a graft copolymer of an alkoxy polyethylene glycol methacrylate. Japanese Examined Patent Publication No. 29820/1989 discloses that a styrene-maleic anhydride copolymer modified with an imido group is cationized to form a quaternary one. Japanese Unexamined Patent Publication No. 121717/1987 proposes a comb-type copolymer of an aminoalkyl acrylate or acrylamide, and polymethyl methacrylate wherein the terminal carboxyl group is converted into methacryloyl group with glycidyl methacrylate and a cationic quaternary product thereof. However, all of the above-mentioned polymers cause the lowering of properties of the thermoplastic resin such as transparency and elongation, and their antistatic property and durability are insufficient.

The method (C) is disadvantageous in cost because the used silicone compounds are expensive and workability is low though the antistatic agent can be contained in a resin semipermanently.

According to the method (D) wherein a hydrophilic group is introduced into the thermoplastic resin, a large amount of hydrophilic groups should be introduced into the resin in order to give sufficient antistatic property to the resin. Such an introduction of a large amount of hydrophilic groups might result in lowering of moisture resistance and mechanical properties of the thermoplastic resin itself.

Generally, static electricity is remarkably generated on an olefinic resin film because of its large hydrophobic property. Accordingly, in case of using such a film as a packaging material, dust easily sticks, resulting in reducing of commercial values of contents, poor adhesion property, poor printing property and poor vapor deposition property, and also the end of the films is not turned up during rolling up. In addition, human body may be shocked by discharged static electricity and there is a fear of ignition in an atmosphere where a flammable organic solvent is used.

There is also a problem that vapor deposition of metal cannot be conducted to the olefinic resin film after a special surface treatment is conducted thereto since the film is poor in adhesion property due to its non-polarity.

In order to solve the above-mentioned problems, an olefinic resin film is prepared from a resin having a polar group such as a copolymer of ethylene and (meth)acrylic acid, a copolymer of ethylene and (meth)acrylic ester or a copolymer of ethylene and a vinyl compound having a glycidyl group, and the obtained film is subjected to corona discharge treatment in air or inert gas, or subjected to plasma treatment in inert gas, or the film is coated with an adhesive agent on which a metal is vapor deposited. However, when the polar group-containing resin is added thereto, a large amount of resin should be added thereto in order to improve the adhesion property, so it becomes economically disadvantageous. When the copolymer having ethylene units is used, the film is shrunk or molten by the heat during vapor deposition since the more the ethylene content is, the lower the melting point becomes. As to various physical surface treatments, there are some problems as mentioned above.

Also, static electricity is remarkably generaged on a foamed article prepared from the olefinic resin, particularly an ethylene resin or a propyrene resin, because of their hydrophobic property. Therefore, dust sticks on the foamed article, or human body is shocked by discharged static electricity. Also, adhesive agents or printing inks cannot be coated uniformly on the surface of the foamed article, in other words, the adhesive agents or inks are repelled since the surface wettability with water is poor due to its high hydrophobic property, and adhesion property of the adhesive agent is wrong.

In order to improve the surface wettability of an olefinic resin foamed article, there is employed a method comprising conducting corona discharge treatment or a method comprising using a copolymer of ethylene and a vinyl monomer having a functional group or a graft copolymer.

However, when the method comprising conducting corona discharge treatment is employed, the surface wettability deteriorates with the passage of time, namely, permanent effect cannot be imparted. In case of using the above-mentioned copolymer, since a large amount of the copolymer should be added thereto to impart practical surface wettability of at least 37 dyne/cm to the foamed article, the cost increases and the thermal resistance lowers due to the low melting point of the copolymer.

A support for recording sheets is generally obtained in a manner wherein one side or both sides of a filmy substrate such as paper or a polyester film is coated with a macromolecule electrolyte such as polyvinylbenzyltrimethylammonium chloride or an electroconductive agent such as an ionic surfactant. However, since these electroconductive agents are hydrophilic and the electroconductivity depends upon humidity, when these electrolytes and electroconductive agents are used in the electrostatic recording paper, the electrostatic recording properties vary depending upon humidity.

In order to solve the above-mentioned problem, a metal is deposited by vapor deposition on a support, or a binder containing an electroconductive filler is coated on the support. However, according to these methods, a cost increases because of complicated processings. Also, when these methods are applied to a recording material for electrophotography, natural color of its material is lost since the material is colored.

Further, a conventional electroconductive agent has a hydrophilic group such as a cationic group or anionic group. To the contrary, since a lipophilic resin such as silicone, a vinyl chloride resin, a vinyl acetate copolymer, polyacrylate or polystyrene is used in a high resistant dielectric layer formed on an electroconductive layer, the affinity between the electroconductive layer and the high resistant dielectric layer is wrong. Therefore, the high resistant dielectric layer is not uniformly provided on the electroconductive layer, and images become unclear.

Also, as to an electroconductive agent having a relatively low molecular weight such as a weight average molecular weight up to 1000, since the electroconductive agent moves to a substrate or a high resistant dielectric article with the passage of time, recording properties are deteriorated.

According to a method comprising depositing a metal on a substrate by vapor deposition, the substrate is necessitated to be coated with an adhesive agent before the vapor deposition because there is no affinity between the metallic film and the high resistant dielectric layer. Also, according to a method comprising coating a binder containing an electroconductive filler, recorded images become unclear since the adhesion property varies depending upon the kind of the binders.

An electrostatic recording system has advantages that recording can be carried out at a high speed, and formed high quality images of high resolution can be semipermanently stored. Further, according to this system, since paper does not impair its natural feeling, it is used in a high speed facsimile apparatus, a monochroplotter or color for CAD and CAM, or the like.

The electrostatic recording paper used for the electrostatic recording system basically comprises paper as a substrate, a dielectric layer for maintaining an electrostatic charge and a low electric resistant layer which acts so that the dielectric layer is stably charged with an electric charge in various surroundings.

As the substrate paper of the electrostatic recording paper, high quality paper is mainly used, and an electroconductive layer is provided on one or both sides of the substrate paper to increase its electrostatic capacity, and a dielectric layer is formed on the electroconductive layer to have three or four layers. In order to form a low resistant layer, a method of coating an electroconductive polymer is usually employed. The electroconductive polymer takes an important role to give clear images, and influences electrostatic recording property.

As such an electroconductive polymer, there have been known, for instance, cationic polymers such as polyvinylbenzyltrimethylammonium chloride, polydimethyldiallylammonium chloride, polymethacryloyloxydiethyltrimethylammonium chloride and methacryloylamidopropyltrimethylammonium chloridediacetone acrylamide copolymer, anionic polymers such as sodium polystyrene sulfonate and polystyrene sulfonate ammonium, and the like. However, in case of using the electroconductive polymer, the following problems have been pointed out.

(A) In the process for preparing an electrostatic recording paper, substrate paper is coated with the electroconductive polymer followed by drying to form a low electric resistant layer, and it is once rolled up. Then, in the second step, it is rewound, and a solvent solution such as a toluene solution of vinyl chloride-vinyl acetate copolymer or styrene-acrylic acid copolymer is coated on the low resistant layer followed by drying to form a dielectric layer. Thus, an electrostatic recording paper is obtained. In the rewinding step, the low electric resistant layer becomes sticky or tacky due to blocking resulting from the properties of the electroconductive polymer. Therefore, the workability lowers and the quality of an obtained electrostatic recording paper is remarkably lowered.

(B) In the process for preparing an electrostatic recording paper, there is a problem in solvent resistance, which is so-called "solvent holdout". After a low electric resistant layer is formed, a vinyl chloride-vinyl acetate copolymer, an acrylic acid-styrene copolymer or the like is coated thereon as a solution of a solvent such as toluene. At that time, the solvent is immersed into the inside of the low resistant layer to impair the formation of a dielectric layer and a low resistant layer, and as a result, recording property of an obtained electrostatic recording paper is lowered.

(C) There is lowering of recording property depending upon humidity, which is a fatal defect of electrostatic recording paper.

The electric resistance of the conventional electroconductive agent greatly varies depending upon humidity of surroundings. The electric resistance is relatively low in high humidity and it is relatively high in low humidity. Consequently, recording density is greatly influenced by the humidity of surroundings.

Accordingly, as the electroconductive agent used in the electrostatic recording paper, a material having no stickiness (tackiness), excellent solvent resistance, and small moisture dependency is desired.

In the above-mentioned circumstances, there have been proposed a method comprising using a composition containing 0.1 to 10% by weight of organic silicone as an electroconductive agent from the viewpoint of the improvement of tackiness (Japanese Unexamined Patent Publication No. 2362/1982), a method comprising using a copolymer of quaternary diallyldimethylammonium chloride and a fluorine-containing monomer such as octafluoropentyl methacrylate (Japanese Unexamined Patent Publication No. 60510/1980) or a method comprising using a copolymer of a water-soluble quaternary ammonium monomer such as vinylbenzyltrimethylammonium chloride or dimethyldiallylammonium chloride and acrylamide (Japanese Unexamined Patent Publication No. 86842/1980) from the viewpoint of the improvement of solvent resistance, and the like.

In order to improve both of tackiness and solvent resistance, there have been proposed a method comprising using a fluoro-surface active agent and a stabilizer together with the above-mentioned electroconductive agent (Japanese Unexamined Patent Publication No. 66944/1980), a method comprising providing a barrier layer made of fluorocarbon on a low resistant layer (Japanese Unexamined Patent Publication No. 112398/1980), and the like. As a method for satisfying tackiness and humidity dependency of electric resistance, there have been proposed a method comprising using a cellulose derivative substituted by 2,3-epoxytrialkylammonium chloride (Japanese Unexamined Patent Publication No. 73773/1980), a method comprising using a copolymer of an epihalohydrine and a monoamine or polyamine (Japanese Unexamined Patent Publication No. 63799/1986), a method comprising using a copolymer of a diallyldialkylammonium chloride and a vinyl acetamide monomer (Japanese Unexamined Patent Publication No. 267385/1987), and the like.

However, the above methods still have the problems that
(A) it is necessitated to use an expensive silicone or fluorine-containing compounds, and that
(B) all of the above-mentioned problems are not completely solved at the same time although tackiness, solvent resistance and moisture dependency of electric resistant are partially improved.

An object of the present invention is to provide a copolymer which semipermanently possesses excellent antistatic property, which does not impair physical properties of resins by the addition of the copolymer or does not cause blocking in a final product, which is excellent in all of properties required for coating of an antistatic agent as mentioned below, and which is suitable for the uses such as an antistatic agent and an aqueous composition.

The properties required for the antistatic agent are described in a column of performances required for an antistatic agent for coating in "Practical Handbook for Plastics and Rubbers" (1987) Kabushiki Kaisha Kagaku Kogyosha p. 395, that is, there are required that
(A) an abrasion resistance and washability resistance with water are excellent, that
(B) transparency is excellent, that
(C) there are no fine cracks on a resin surface, and that
(D) heat resistance and chemical resistance are excellent.

A further object of the present invention is to provide an antistatic thermoplastic resin film and an olefinic resin foamed article laminate which is excellent in antistatic property, which has no bleeding or blocking, and which has a metal vapor deposition layer with excellent adhesion.

A still further object of the present invention is to provide a support for recording sheets, an electrostatic recording paper and an electroconductive substrate, which are excellent in electroconductivity and affinity between the electroconductive layer and the high resistant dielectric layer.

A still further object of the present invention is to provide an olefinic resin foam, which is excellent in antistatic property and surface wettability, which has no bleeding or blocking, and which is excellent in printability.

These and other objects of the present invention will become apparent from the description hereinafter.

SUMMARY OF THE INVENTION

In accordance with the present invention, there are provided
(A) a linear random N-substituted acrylamide copolymer comprising:
(1) 65 to 99% by mole of ethylene units having the formula (I):

$$-(CH_2-CH_2)- \quad (I)$$

(2) 1 to 15% by mole of acrylate units having the formula (II):

$$-(CH_2-CH)- \atop COOR^1 \quad (II)$$

wherein $R^1$ is an alkyl group having 1 to 4 carbon atoms, and
(3) 1 to 35% by mole of acrylamide units having the formula (III):

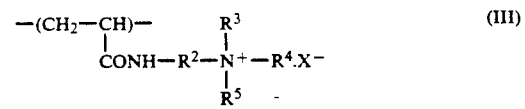

$$-(CH_2-CH)- \atop CONH-R^2-\overset{R^3}{\underset{R^5}{N^+}}-R^4 \cdot X^- \quad (III)$$

wherein $R^2$ is an alkylene having 2 to 8 carbon atoms, $R^3$ and $R^4$ are the same or different and each is an alkyl group having 1 to 4 carbon atoms, $R^5$ is an alkyl having 1 to 12 carbon atoms, an arylalkyl having 6 to 12 carbon atoms or an alicyclic alkyl having 6 to 12 carbon atoms, and X is a halogen atom, $CH_3OSO_3-$ or $C_2H_5OSO_3-$; and the copolymer has a weight average molecular weight of 1000 to 5000;
(B) a linear random N-substituted acrylamide copolymer comprising:
(1) 65 to 99% by mole of ethylene units having the above formula (I),
(2) 1 to 15% by mole of acrylate units having the above formula (II) and
(3) 1 to 35% by mole of acrylamide units having the formula (IV):

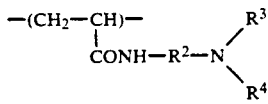
(IV)

wherein $R^2$, $R^3$ and $R^4$ are the same as mentioned above, and the copolymer has a weight average molecular weight of 1000 to 50000;

(C) an aqueous composition of the above N-substituted acrylamide copolymer;

(D) an antistatic thermoplastic resin film comprising a thermoplastic resin containing 0.3 to 50% by weight of the above N-substituted acrylamide copolymer;

(E) a thermoplastic resin film having a vapor deposition layer comprising an antistatic thermoplastic resin film containing 0.3 to 50% by weight of the above N-substituted acrylamide copolymer and a vapor deposition layer;

(F) a laminated thermoplastic resin film having a thermoplastic resin layer containing the above N-substituted acrylamide copolymer;

(G) a laminate comprising an olefinic resin foamed article and an olefinic resin layer containing the above N-substituted acrylamide copolymer;

(H) a support for recording sheets comprising a substrate and an electroconductive layer containing the above N-substituted acrylamide copolymer;

(I) an electroconductive paper comprising a paper having a layer of the above N-substituted acrylamide copolymer;

(J) an electrostatic recording paper comprising a paper, a high resistant dielectric layer and an electroconductive layer comprising an olefinic resin containing the above N-substituted acrylamide copolymer;

(K) a foamed article comprising an olefinic resin containing the above N-substituted acrylamide copolymer; and (L) a laminate of foamed articles having an olefinic resin foamed article layer containing the above N-substituted acrylamide copolymer.

DETAILED DESCRIPTION

Figure 1:
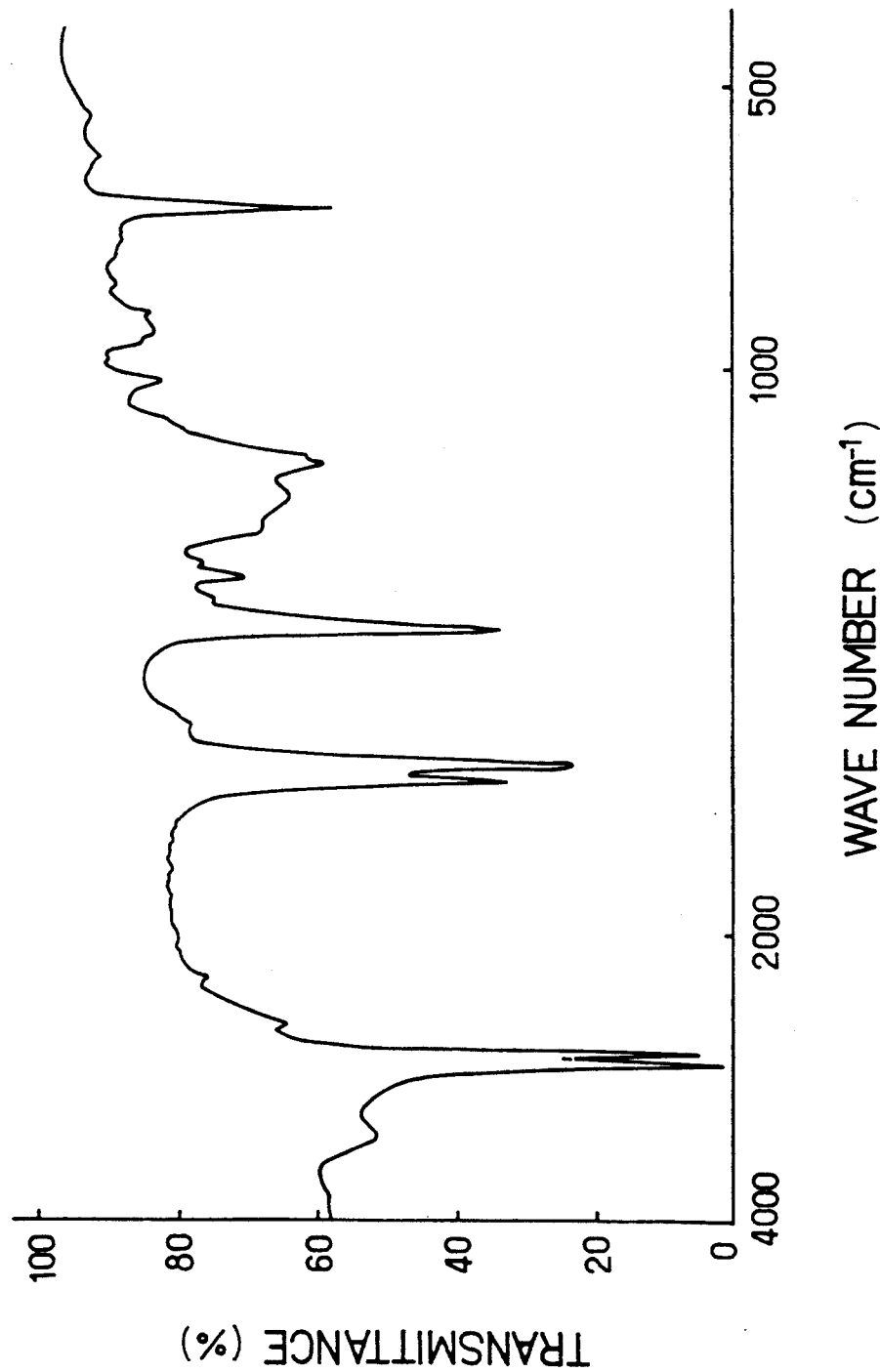
FIGS. 1 and 2 are diagrams showing infrared absorption spectrum and $^1$H-NMR spectrum of the ethyleneethyl acrylate-acrylic acid copolymer prepared in Reference Example 1, respectively.

An acrylamide copolymer according to the present invention, which can be desirably used as an antistatic agent, is a linear random N-substituted acrylamide copolymer comprising:

(1) 65 to 99% by mole of ethylene units having the formula (I):

(2) 1 to 15% by mole of acrylate units having the formula (II):

wherein $R^1$ is an alkyl having 1 to 4 carbon atoms, and (3) 1 to 35% by mole of acrylamide units having the formula (III):

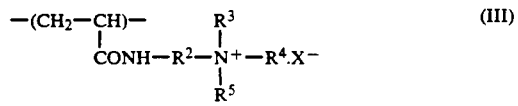

wherein $R^2$ is an alkylene group having 2 to 8 carbon atoms, $R^3$ and $R^4$ are the same or different and each is an alkyl having 1 to 4 carbon atoms, $R^5$ is an alkyl having 1 to 12 carbon atoms, an arylalkyl having 6 to 12 carbon atoms or an alicyclic alkyl having 6 to 12 carbon atoms, and X is a halogen atom, $CH_3OSO_3-$ or $C_2H_5OSO_3-$; and the copolymer has a weight average molecular weight of 1000 to 50000 as mentioned above.

The content of the ethylene units having the formula (I) in the N-substituted acrylamide copolymer is 65 to 99% by mole. When the content of the ethylene units is less than 65% by mole, since the softening point of the N-substituted acrylamide copolymer becomes too low and waxy, durabilities against friction, solvent resistance deteriorate at such temperatures that the N-substituted acrylamide copolymer is generally used. Further, since a thermoplastic resin containing the N-substituted acrylamide copolymer becomes tacky or sticky, dust and the like easily adhere to the surface of the resin. To the contrary, when the content of the ethylene units exceeds 99% by mole, antistatic properties and electroconductivity of the N-substituted acrylamide copolymer become too low. In the present invention, the content of the above-mentioned ethylene units is preferably 85 to 97% by mole in view of the balance of a softening point and antistatic properties, and the balance of adhesive properties and electroconductivity.

The content of the acrylate units having the formula (II) is 1 to 15% by mole. When the content of the acrylate units exceeds 15% by mole, since the softening point of the N-substituted acrylamide copolymer becomes too low, and a thermoplastic resin containing the N-substituted acrylamide copolymer becomes tacky or sticky, dust and the like easily adhere to the surface of the resin. Therefore, the content of the acrylate units is adjusted to 1 to 15% by mole, preferably 3 to 7% by mole in view of the balance of its softening point, and toughness and impact resistance and the balance of adhesion property and solvent resistance. Since the acrylate units are incorporated in the N-substituted acrylamide copolymer, a thermoplastic resin containing the N-substituted acrylamide copolymer is tough and has high impact resistance, and film foaming ability and adhesion property to acrylic resins and the like are improved, and as a result, solvent resistance is improved.

In the above-mentioned acrylate units, $R^1$ is an alkyl group having 1 to 4 carbon atoms. Typical examples of $R^1$ are, for instance, methyl, ethyl, n-propyl, i-propyl, n-butyl, i-butyl, and the like. These groups can be present together in one molecule. Among these groups, methyl and ethyl are particularly suitable since these groups give a high softening point to the N-substituted acrylamide copolymer and do not bring harmful effects due to tackiness to the N-substituted acrylamide copolymer.

The content of the acrylamide units having the formula (III) in the N-substituted acrylamide copolymer is 1 to 35% by mole. When the content of the acrylamide units is less than 1% by mole, antistatic properties become too low. When the content of the acrylamide units exceeds 35% by mole, since thermoplastic resins containing the N-substituted acrylamide copolymer easily absorb moisture and thereby the thermoplastic resins become cloudy, and transparency and water resistance deteriorate. Also, sticky is generated, and humidity dependency of electric resistance of electroconductive paper containing the N-substituted acrylamide copolymer according to the present invention increases. In the present invention, the content of the acrylamide units is preferably 3 to 15% by mole in view of the balance of antistatic property and humidity dependency, and the balance of water resistance, transparency and adhesion property.

In the above-mentioned acrylamide units, $R^2$ is an alkylene group having 2 to 8 carbon atoms. Typical examples of $R^2$ are, for instance, ethylene, propylene, hexamethylene, neopentylene, and the like. These groups can be present together in one molecule. In these groups, ethylene and propylene are preferable from the viewpoint of easiness of its preparation and cost thereof, and propylene is particularly preferable.

The above-mentioned $R^3$ and $R^4$ are the same or different and each is an alkyl group having 1 to 4 carbon atoms. Typical examples of $R^3$ and $R^4$ are, for instance, methyl, ethyl, propyl and butyl. These groups can be present together in one molecule. In these groups, methyl and ethyl are preferable from the viewpoint of giving antistatic property.

The above-mentioned $R^5$ is an alkyl having 1 to 12 carbon atoms, an arylalkyl having 6 to 12 carbon atoms or an alicyclic alkyl having 6 to 12 carbon atoms. Typical examples of $R^5$ are, for instance, an alkyl such as methyl, ethyl, n-propyl, i-propyl, n-butyl, sec-butyl, n-octyl or n-lauryl; an arylalkyl such as benzyl or 4-methylbenzyl; an alicyclic alkyl such as cyclohexyl or methylcyclohexyl, and the like. These groups can be present together in one molecule. As the above-mentioned $R^5$, a linear alkyl and an arylalkyl are preferable from the viewpoint of thermal resistance and adhesion property of the N-substituted acrylamide copolymer according to the present invention, and also a lower alkyl is preferable from the viewpoint of antistatic property. As the above $R^5$, methyl and ethyl are particularly preferable.

The above-mentioned X is a halogen atom such as Cl, Br or I, $CH_3OSO_3-$ or $C_2H_5OSO_3-$, and these can be present together in one molecule. Among these groups, Cl, $CH_3OSO_3-$ and $C_2H_5OSO_3-$ are preferable from the viewpoint of antistatic property.

The N-substituted acrylamide copolymer of the present invention has a weight average molecular weight of 1000 to 50000. When the weight average molecular weight is less than 1000, since the molecular weight thereof is too small, the N-substituted acrylamide copolymer volatilizes when the N-substituted acrylamide copolymer is added to a thermoplastic resin and then heated, and in addition, film forming ability of the N-substituted acrylamide copolymer deteriorates and so durability against friction and solvent resistance required in the present invention are insufficiently exhibited. When the weight average molecular weight exceeds 50000, since the viscocity of the molten N-substituted acrylamide copolymer is too high, or the viscosity during the preparation of dispersion, emulsion or solution of the copolymer is too high, workability becomes wrong. The preferable weight average molecular weight is 3000 to 35000, in particular 3000 to 30000.

The weight average molecular weight according to the present invention is intended to refer to a weight average molecular weight converted into the weight average molecular weight of monodispersed polystyrene determined by means of Gel Permeation Chromatography (GPC).

The weight average molecular weight of the N-substituted acrylamide copolymer of the present invention cannot be easily determined because the copolymer is slightly soluble in usual eluates for GPC such as tetrahydrofuran (THF) and xylene, but the weight average molecular weight of the copolymer can be determined in accordance with the ultra-high temperature GPC method disclosed in Kobunshironbunshu by Kinugawa, 44 [2] p. 139–141 (1987).

An intermediate product of the N-substituted acrylamide copolymer according to the present invention comprises ethylene units having the above formula (I), acrylate units having the above formula (II) and acrylamide units having the formula (IV):

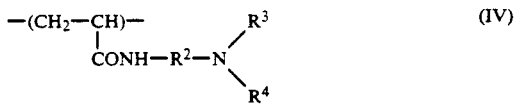

wherein $R^2$, $R^3$ and $R^4$ are as defined above, and has a weight average molecular weight of 1000 to 50000. The intermediate product can be obtained by, for instance, the following methods.

Although starting materials for preparing the intermediate product of the N-substituted acrylamide copolymer of the present invention are not particularly limited, a (partial)hydrolysate of a copolymer of ethylene ($C_2H_4$) and an acrylate having the formula (V):

wherein $R^1$ is as defined above can be preferably used. This copolymer can be easily prepared by copolymerizing ethylene and the above-mentioned acrylate using a high pressure polymerization method.

Since the ratio of the ethylene units and the acrylate units determines the ratio of ethylene units, acrylate units and acrylamide units of an obtained N-substituted acrylamide copolymer, ethylene and acrylate are copolymerized so that the ratio of ethylene and the acrylate having the formula (V), that is, the molar ratio of ethylene/acrylate can be equal to the ratio of [ethylene units]/[(acrylate units)+(acrylamide units)].

Although the above-mentioned copolymer can be used as it is, it is desirable that the copolymer is modified into a lower molecular weight compound by means of thermal degradation at the same time hydrolyzing it at a high pressure and a high temperature in the presence of water. At that time, a part of the acrylate units having the formula (II) based upon the acrylate are hydrolyzed and acrylic acid units having the formula (VI):

are formed.

In order to prepare a copolymer having a weight average molecular weight of 1000 to 50000, the copolymer is thermally decomposed at a reaction temperature of 150° to 500° C. under a reaction pressure of 3 to 500 kg/cm² in the presence of water.

The content of the acrylic acid units can be voluntarily determined by adjusting the amount of water charged, reaction temperature, reaction pressure, reaction time, and the like.

Typical examples of the above-mentioned degradation method, are, for instance, methods described in Japanese Unexamined Patent Publication No. 57295/1978, Japanese Unexamined Patent Publication No. 65389/1978, Japanese Unexamined Patent Publication No. 79008/1985, Japanese Unexamined Patent Publication No. 79015/1985, and the like.

Since the N-substituted acrylamide copolymer of the present invention sometimes becomes unmarketable when the copolymer is colored, it is desirable that a product prepared by the method exemplified in Japanese Unexamined Patent Publication No. 79008/1985 is used as a starting material.

The N-substituted acrylamide copolymer of the present invention and an intermediate product thereof can be prepared from the thus obtained ethylene-acrylic acid ester-acrylic acid copolymer as a starting material.

Methods for preparing the intermediate product of the N-substituted acrylamide copolymer of the present invention from the above-mentioned starting material are not particularly limited. One of them is explained below.

The above-mentioned starting material is dissolved in an aromatic hydrocarbon or an aliphatic hydrocarbon such as benzene, toluene, xylene, cyclohexanone, decane, cumene or cymene, or an inert solvent such as ketone, and a dialkylaminoalkylamine is added thereto in an amount of 100 to 150 moles based upon 100 moles of carboxyl groups of the above-mentioned starting material. The reaction is carried out at a temperature of 130° to 220° C. to convert carboxyl group contained in the acrylic acid units into a dialkylaminoalkylamide group to give an intermediate product of the N-substituted acrylamide copolymer. The intermediate product is then reacted with a known quarternarizing agent such as an alkyl halide or a dialkylsulfonate to obtain a cationized linear random N-substituted acrylamide copolymer of the present invention.

The thus obtained N-substituted acrylamide copolymer of the present invention shows excellent antistatic property. The reason why the copolymer shows excellent antistatic property is not clear, but it can be supposed that the acrylamide units incorporated in the N-substituted acrylamide copolymer of the present invention hold moisture contained in the atmosphere and $X^-$ is ionized to impart electroconductivity and thereby electric resistance is lowered. In the present invention, it is considered that the acrylamide units are not volatilized during processing, and generation of blocking and lowering of physical properties of a thermoplastic resin are not caused after processing since the acrylamide units are not volatilized at high temperatures and they are chemically incorporated in the N-substituted acrylamide copolymer.

Typical examples of the thermoplastic resin to which the N-substituted acrylamide copolymer of the present invention can be applied are, for instance, olefinic resins such as polyethylene and polypropylene, styrene resins such as polystyrene and ABS resin, amide resins, polyesters such as polybutylene terephthalate, polyethers such as modified polyphenylene ether, and the like, and the present invention is not limited to the exemplified ones.

An aqueous composition of the N-substituted acrylamide copolymer of the present invention can be suitably used as an antistatic agent for coating.

In preparing the aqueous composition containing the N-substituted acrylamide copolymer of the present invention, the N-substituted acrylamide copolymer is dispersed, emulsified or solubilized in water.

Methods for dispersing, emulsifying or solubilizing the N-substituted acrylamide copolymer in water are not particularly limited. One of the methods is, for instance, a high pressure emulsifying method employed in preparing a polyethylene emulsion. A typical example of the method is, for instance, a method comprising charging a high pressure vessel provided with a mechanical stirring apparatus, such as an autoclave with the N-substituted acrylamide copolymer, water and a surfactant if necessary and heating the resulting mixture with stirring.

As the surfactant, nonionic surfactants and cationic surfactants are desirable. Anionic surfactants are not desirable since they ionically form complexes with the cationic N-substituted acrylamide copolymer, which are insoluble in water. Since the N-substituted acrylamide copolymer has a self-emulsifying property itself, surfactants are not necessarily required.

When an aqueous composition is prepared using a large amount of a surfactant, durability of the aqueous composition deteriorates and the composition comes to show adhesive property. Therefore, it is desirable that the amount of the surfactant used is generally at most 25 parts (parts by weight, hereinafter referred to the same), preferably at most 20 parts based upon 100 parts of the N-substituted acrylamide copolymer.

After a high pressure vessel is charged with the N-substituted acrylamide copolymer, water and a surfactant, they are generally heated to a temperature of 5° to 20° C. higher than the temperature at which the N-substituted acrylamide copolymer melts, that is, 60° to 200° C. The heating period of time depends upon the heating temperature, but is sufficiently about 10 minutes to about one hour. When the heating temperature is too low or the heating time is too short, the aqueous composition gives precipitates with the passage of time, that is, the stability of the composition deteriorates. When the heating temperature is too high or the heating time is too long, undesirable hydration of the N-substituted acrylamide copolymer may occur besides arising economic disadvantages.

The amount of the N-substituted acrylamide copolymer in the aqueous composition of the present invention is not particularly limited and can be suitably adjusted in accordance with the object or the uses of the aqueous composition. In consideration of economics and the like, the amount of the N-substituted acrylamide copolymer is generally 5 to 40 parts, preferably 10 to 30 parts based upon 100 parts of the aqueous composition.

In accordance with the uses and the like, an antifoamer, a thickner, and the like can be added to the aqueous composition.

The reasons why the N-substituted acrylamide copolymer is easily dispersed, emulsified or solubilized without any special methods and the aqueous composition has excellent storing stability are not clear, but it is supposed that the ethylene units and the acrylate units having hydrophobic property and the acrylamide units having hydrophilic property present in the N-substituted acrylamide copolymer are distributed in a well balanced state in one molecule and the N-substituted acrylamide copolymer exists in water as a surfactant having a high molecular weight.

An antistatic theremoplastic resin film of the present invention can be suitably used in, for instance, packaging materials and the like.

The antistatic thermoplastic resin film can be produced by mixing the N-substituted acrylamide copolymer with a thermoplastic resin so that 0.3 to 50% by weight of the N-substituted acrylamide copolymer is contained therein and then molding the mixture.

Typical examples of the thermoplastic resin are, for instance, olefinic resins such as polypropylene, ethylene-propylene copolymer ethylene content of which is 2 to 30% by weight, terpolymer prepared by copolymerizing an ethylene-propylene copolymer with butene-1, high pressure processed low density polyethylene, linear low density polyethylene, linear ultra-low density polyethylene, high density polyethylene, ethylene-vinyl acetate copolymer, saponificated ethylene-vinyl acetate copolymer, ethylene-(meth)acrylic acid copolymer, ethylene-(meth)acrylic acid ester copolymer, ethylene-(meth)acrylic acid-maleic anhydride terpolymer, ethylene-(meth)acrylic acid ester-maleic anhydride terpolymer, ester resins, amide resins, styrene resins, polycarbonates, ABS resins, and the like. These resins can be used alone or in admixture thereof.

The amount of the above-mentioned N-substituted acrylamide copolymer to be used is 0.3 to 50% by weight, preferably 0.5 to 20% by weight, and in case of a resin film having a vapor deposition layer, it is preferably 0.5 to 30% by weight based upon the total amount of the N-substituted acrylamide copolymer and the thermoplastic resin. When the amount of the N-substituted acrylamide copolymer is less than 0.3% by weight, since the molecular weight of the N-substituted acrylamide copolymer is greater than that of common surfactant type antistatic agents and the content of cationic units of the N-substituted acrylamide copolymer is relatively lower, it is good in brocking resistance, but surface resistance and half life of charge, that is, antistatic property deteriorate and further adhesion property deteriorates since the amount of the N-substituted acrylamide copolymer present on the surface layer becomes small due to its high molecular weight. When the amount of the N-substituted acrylamide copolymer exceeds 50% by weight, since the molecular weight of the N-substituted acrylamide copolymer is smaller than that of the thermoplastic resin to be mixed, it is desirable from the viewpoint of antistatic property, but mechanical properties of an obtained thermoplastic resin film deteriorate and the lowering of a melting point of the mixture thereof is remarkable, and as a result, disadvantages such as shrinkage and fusion occur.

There is no special limitation in the methods of producing an antistatic thermoplastic resin film and known various methods of producing films can be employed. Typical examples of the methods of producing the thermoplastic resin film are, for instance, casting method, film blowing method, tubular film process, tenter method, and the like.

The thermoplastic resin film of the present invention may be any of unstretched film, uniaxial stretched film and biaxial stretched film.

The thickness of the above-mentioned thermoplastic resin film is not particularly limited and it can be suitably adjusted in accordance with the uses of the obtained thermoplastic resin film. The thickness of the film is usually 2 to 500 $\mu$m, and in case of a film having a vapor deposition layer, 2 to 200 $\mu$m.

The thermoplastic resin film of the present invention may contain an inorganic filler such as calcium carbonate, talc or single glass fiber, various auxiliary agents such as antioxidant, flame retardant, colorant and multifunctional monomer, and the like in an amount which does not obstruct the objects of the present invention.

The N-substituted acrylamide copolymer also may contain a known surfactant having low molecular weight in an amount of at most 30% by weight based upon the weight of the N-substituted acrylamide copolymer. When the surfactant is used within a range of at most 30% by weight, bleeding would not be observed from an obtained film. The thermoplastic resin film of the present invention can be further processed by means of corona discharge treatment on at least one side surface of the film to improve surface wettability and adhesion property to various water-soluble coating agents. When a coating agent layer is formed on the film, various layers such as film, sheet or a layer for heatsealing can be laminated on the film to give a composite material which can be used as various packaging materials and casing materials. Also, at least one side surface of the film of the present invention can be vapor-deposited with a metal to form a metallic film or a layer for heatsealing can be formed on at least one side surface of the film to give a composite material which can be used as various packaging materials and casing materials.

A thermoplastic resin film having a vapor deposition layer of the present invention can be suitably used as, for instance, various packaging materials.

The thermoplastic resin film of the present invention has a vapor deposition layer on its surface.

Examples of the thermoplastic resin are, for instance, the thermoplastic resins which are used in the above antistatic thermoplastic resin film can be cited.

Kinds of a metal usable for the vapor deposition layer are not particularly limited. Typical examples of the metal are, for instance, aluminum, gold, silver, copper, zinc, tin, palladium, cobalt, nickel, composite metal, alloy, and the like.

The thickness of the vapor deposition layer may be suitably adjusted according to the uses of the thermoplastic resin film of the present invention. The thickness is usually 10 to 50 nm, preferably 20 to 30 nm. Since the thermoplastic resin film having a vapor deposition layer of the present invention is particularly excellent in adhesion property between the film and the vapor deposition layer, oxygen permeability of the film is very small. Accordingly, the thermoplastic resin film of the present invention can be desirably used as packaging materials for which small gas permeability is required, such as wrappers with which materials, which easily change in quality in the presence of oxygen, such as confectionary containing oil or the like, are covered.

A laminated thermoplastic film having a thermoplastic resin layer of the present invention is excellent in antistatic property and printability and can be suitably used as packaging materials and the like.

The laminated thermoplastic resin film having a thermoplastic resin layer of the present invention is produced by forming a thermoplastic resin layer containing the above-mentioned N-substituted acrylamide copolymer on a resin film.

A mixture of the above-mentioned N-substituted acrylamide copolymer and a thermoplastic resin can be used in the resin layer.

As the thermoplastic resin, the thermoplastic resins used in the above-mentioned antistatic thermoplastic resin film can be cited.

The amount of the above-mentioned N-substituted acrylamide copolymer to be used is adjusted so that the content of the N-substituted acrylamide copolymer is 0.3 to 50% by weight, preferably 0.5 to 20% by weight in the resin layer. When the content of the N-substituted acrylamide copolymer is less than 0.3% by weight, since the molecular weight of the N-substituted acrylamide copolymer is greater than that of known surfactant type antistatic agents and the ratio of the N-substituted acrylamide copolymer becomes relatively small in the resin composition, it is good in blocking resistance but surface resistance and half life of charge deteriorate, that is, antistatic property deteriorates. When the content of the N-substituted acrylamide polymer exceeds 50% by weight, since the molecular weight of the N-substituted acrylamide copolymer is smaller than that of the thermoplastic resin to be mixed, it is good in antistatic property but mechanical properties of an obtained laminated film deteriorates.

The thickness of the thermoplastic resin layer can be 0.1 to 50 μm when a final product is produced therefrom. When the thickness is less than 0.1 μm, the laminated resin film generates cohesive failure in the interface of the resin layer and the resin film, and consequently adhesion property and vapor deposition property deteriorate. When the thickness exceeds 50 μm, the laminated resin film generates blocking since flexibility of the resin layer becomes remarkable.

Typical examples of the resin film used as a substrate of the laminated thermoplastic resin film having an olefinic resin layer are, for instance, propylene resins containing propylene as a main component, a low pressure processed high density polyethylene, linear low density polyethylene, and the like.

The resin film can be produced by the same methods as in the above-mentioned antistatic thermoplastic resin film.

Although the thickness of the above-mentioned resin film is not particularly limited and can be suitably selected in accordance with the uses of the laminated thermoplastic resin film. The thickness is usually 10 to 500 μm.

In the present invention, the thermoplastic resin layer or the resin film may contain an inorganic filler, various auxiliary agents and the like which can be used in the above thermoplastic resin film in an amount which does not obstruct the objects of the present invention. In the present invention, a known surfactant having a low molecular weight can also be used in the thermoplastic resin layer in a content of at most 30% by weight based upon the weight of the above-mentioned N-substituted acrylamide copolymer. When the surfactant is used within the range of at most 30% by weight, bleeding would not be observed from an obtained thermoplastic resin layer.

Methods of integrating the above-mentioned thermoplastic resin layer with the resin film are, for instance, a method comprising coating a resin for the thermoplastic resin layer in a molten state with heating or in a state of an emulsion on a resin film by means of reverse roll coating method, gravure coating method or bar coating method, a method comprising integrating a resin for the thermoplastic resin film with a resin for the resin layer by means of direct laminating process, coextrusion process in which two polymer streams join in a die, and the like. The present invention is not limited to the exemplified ones.

At least one side surface of the laminated thermoplastic resin film of the present invention can be processed by means of corona discharge treatment to improve wettability and adhesion property to various water-soluble coating agents. A coating agent layer can also be formed on its surface and various layers such as film, sheet or heatsealant layer can be formed on its surface to give a composite laminated material which can be used as various packaging materials and casing materials. A metallic layer also can be vapor deposited on at least one side surface of the laminated thermoplastic resin film, and a heatsealant layer can be formed on at least one side surface of the laminated thermoplastic resin film to give a composite laminated film for various packaging materials and casing materials.

A laminate of an olefinic resin foamed article and an olefinic resin layer of the present invention is excellent in antistatic property, and can be suitably used in living goods such as bath mats, packings, heat insulating materials, interior materials for cars, and the like.

The laminate of an olefinic resin foamed article and an olefinic resin layer of the present invention can be produced by laminating a resin for the olefinic resin layer containing the above-mentioned N-substituted acrylamide copolymer on the olefinic resin foamed article.

As the resin for the olefinic resin layer, the N-substituted acrylamide copolymer solely or admixture of the N-substituted acrylamide copolymer and an olefinic resin can be used.

As the olefinic resin, the olefinic resins used in the above thermoplastic resin film are cited.

When the N-substituted acrylamide copolymer is employed together with the olefinic resin, it is desirable that the amount of the N-substituted acrylamide copolymer is at least 0.1 part, preferably at least 10 parts based upon 100 parts of the resin for the olefinic resin layer to impart antistatic property.

The resin components of the foamed article which is used as a substrate of the laminate is not particularly limited and can be suitably selected in accordance with the uses of the laminate. Typical examples of the resin usable for the above foamed article are, for instance, polypropylene, various propylene-another olefine copolymers such as ethylene-propylene copolymer ethylene content of which is 2 to 30% by weight and terpolymer prepared by copolymerizing ethylene-propylene copolymer and butene-1, high pressure processed low density polyethylene, low pressure processed high density polyethylene, linear low density polyethylene, linear ultra-low density polyethylene, ethylene-vinyl acetate copolymer, saponificated ethylene-vinyl acetate copolymer, ethylene-(meth)acrylic acid copolymer, ethylene-(meth)acrylic acid ester copolymer, ethylene-(meth)acrylic acid maleic anhydride terpolymer, ethylene-(meth)acrylic acid ester-maleic anhydride terpolymer, and the like. These resins can be used alone or in admixture thereof.

As to the methods of producing the foamed article, there are particularly no limitations, and known methods can be employed. Typical examples of the method of producing a foamed article are, for instance, a method comprising mixing a foamable resin composition containing the olefinic resin with a chemical blowing agent, introducing the resulting mixture into an extruder and decomposing the blowing agent to give a foamed article; a so-called extruding method comprising introducing a foamable resin composition into an extruder, pressure-incorporating a physical blowing agent into the extruder and expanding the composition to give a foamed article; a so-called block method comprising filling a mold with a foamable resin composition together with a mixture of a chemical blowing agent and a peroxide, pressurizing and heating the resulting mixture, decomposing the peroxide to crosslink, decomposing the chemical blowing agent and releasing the pressure to expand the mixture to give a foamed article; a crosslinking foaming method under ambient pressure comprising introducing a foamable resin composition into an extruder, forming a sheet-like material, irradiating electron beam to the material or adding a peroxide to the material to crosslink the resin and heating the material to expand the material, and the like.

The expansion ratio and the thickness of the foamed article are not particularly limited and can be suitably selected in accordance with the uses of the laminate. Also, various auxiliary agents, which can be contained in the above antistatic thermoplastic resin film, can be contained in the laminate in an amount which does not obstruct the objects of the present invention.

The resin for the resin layer and the foamed article also may contain known surfactants having a low molecular weight in an amount of at most 30 parts based upon 100 parts of the olefinic resin. When the surfactant is used within a range of at most 30 parts, bleeding would not be observed from an obtained laminate.

Methods of laminating the resin for the resin layer on the thermoplastic resin foamed article are not particularly limited. Examples of the methods are, for instance, a method of laminating a resin for the resin layer on a foamed article by means of extrusion laminating method, a method of directly laminating a resin for the resin layer on a foamed article during the preparation of a foamed article, more concretely a method of laminating a resin for the resin layer on one side or both sides of a resin to form a foamed article in a molten state and foaming the resin to form a foamed article, a method of coating a resin for the resin layer in a molten state with heating, a dissolved state with a solvent or an emulsion state on a foamed article by means of reverse roll coating method, gravure coating method, bar coating method or the like, and the like.

The thickness of the resin layer of a final product can be 1 to 150 μm, preferably 3 to 100 μm, more preferably 5 to 50 μm. When the thickness is less than 1 μm, cohesive failure occurs in the interface of the resin layer and the foamed article, and consequently adhesion property and vapor deposition property deteriorate. When the thickness exceeds 150 μm, flexibility of the resin layer becomes remarkable and phenomenon such as blocking occurs.

The thus obtained laminate comprising an olefinic resin foamed article and an olefinic resin layer of the present invention can be provided with a coating layer, and also can be laminated on a surface material, film, sheet, foamed article, metallic foil, paper, non-woven fabric composed of natural fiber or synthetic resin fiber, or synthesized leather, and the laminated material also can be molded by various methods.

A support for recording sheets of the present invention can be suitably used in an electrostatic recording article for converting electric signals corresponding to words or figures into electrostatic images and recording them, a recording article of electrophotography for converting light signals into electrostatic images and recording them, and the like.

The support for recording sheets of the present invention is produced by providing an olefinic resin layer containing the above-mentioned N-substituted acrylamide copolymer as an electroconductive layer on a substrate. The above N-substituted acrylamide copolymer solely, or a mixture of the N-substituted acrylamide copolymer and an olefinic resin can be used in the above electroconductive layer.

Typical examples of the olefinic resin are, for instance, polyvinyl acetate, ethylene-vinyl acetate copolymer, saponificated ethylene-vinyl acetate copolymer, ethylene-(meth)acrylic acid copolymer, ethylene-(meth)acrylic acid ester copolymer, ethylene-(meth)acrylic acid-maleic anhydride terpolymer, ethylene-(meth)acrylic acid ester-maleic anhydride terpolymer, vinyl acetate-(meth)acrylic acid ester copolymer, and the like. These resins can be used alone or in admixture thereof.

When the above N-substituted acrylamide copolymer is used together with the above olefinic resin, it is desirable that the amount of the N-substituted acrylamide copolymer is at least one part, preferably at least 5 parts based upon 100 parts of the resin of the electroconductive layer so that sufficient electroconductivity can be given.

Methods of providing the electroconductive layer on a substrate or providing the electroconductive article on a substrate paper are not particularly limited. Examples of the methods are, for instance, a method of coating a resin for the electroconductive layer as it is or an emulsion thereof on a substrate by a reverse roll coating method, a gravure coating method, a bar coating method, and the like.

The thickness of the dried electroconductive layer can be suitably adjusted in accordance with the uses of electrostatic recording articles, and it is generally 0.1 to 5 μm, preferably 0.5 to 3 μm.

In accordance with the desired electric resistance, metal powder or inorganic fine granules on which a metal such as gold, tin or copper is plated can be added to the formed electroconductive layer within a range of at most 10% by weight of the electroconductive layer.

Typical examples of the substrate are, for instance, paper of natural fibrous pulp, paper of synthesized pulp of synthesized resin fiber, synthesized paper of a resin such as polycarbonate, styrene copolymer, biaxial stretched polyester or polymethyl methacrylate, and the like. The present invention is not limited to the exemplified ones.

When a high resistant dilectric layer is provided on the electroconductive layer formed on a substrate to give electrostatic recording paper, a known resin can be used as a resin for the high resistant dielectric layer. For instance, a mixture produced by adding an inorganic fine powder to a high dielectric resin, and the like can be cited.

The resin for the above high dielectric layer is intended to mean a resin having an electric resistance of at least $10^{12}\Omega$. Typical examples of the resin are, for instance, resins soluble in organic solvents or dispersible in water such as polymers or copolymers of vinyl chloride, vinyl acetate, vinyl acetal, vinylidene chloride, ethylene, styrene, butadiene, (meth)acrylic acid ester, (meth)acrylic acid and the like, polycarbonate, polyolefine, polyester, and the like.

Examples of the inorganic fine powder are, for instance, powders having a particle diameter of at most 3 μm such as calcium carbonate, almina sol and silica sol.

The amount of the inorganic fine powder to be added to the resin for the high dielectric layer is usually 1 to 30 parts, preferably 5 to 20 parts based upon 100 parts of the resin for the high dielectric layer.

The above-mentioned high resistant dielectric layer can be provided on the electroconductive layer as an aqueous dispersed emulsion or a solution of an organic solvent such as methyl ethyl ketone. The dried thickness of a high resistant dielectric layer can be suitably adjusted in accordance with the uses of electrostatic recording articles, and it is usually 0.5 to 20 μm, preferably 5 to 7 μm.

An electroconductive paper of the present invention is excellent in antistatic property and can be suitably used as electrostatic recording paper, paper for an electrophotography, and the like.

The electroconductive paper of the present invention is produced by adding the N-substituted acrylamide copolymer to a substate paper.

The substrate paper for the electroconductive paper can be paper to which sizing is carried out or not on its surface. Typical examples of electroconductive paper applicable to the present invention are, for instance, woodfree paper, copying paper, computer paper, facsimile paper, and the like other than electrostatic recording paper, and the present invention is not limited to the exemplified ones.

Methods of adding the N-substituted acrylamide copolymer to the substrate paper are not particularly limited and, for instance, a method of coating the N-substituted acrylamide copolymer on a substrate paper, a method of impregnating the N-substituted acrylamide copolymer into a substrate paper, and the like. When the N-substituted acrylamide copolymer is added to the substrate paper, the N-substituted acrylamide copolymer can be used as a solution of an organic solvent such as toluene or an aqueous composition thereof. Also, an auxility agent such as polyvinyl alcohol, casein, cellulose derivatives, starch, protein, synthesized gum or natural gum can be added thereto, and a solution containing a pigment such as clay can be added thereto so that smoothness of electroconductive paper and coating properties of materials forming a photosensitive layer or a recording rayer can be improved.

The amount of the N-substituted acrylamide copolymer added to the substrate paper cannot be absolutely determined because the amount depends upon the uses of the electroconductive paper, but it is desirable that the amount is usually 0.1 to 10 g/m$^2$, preferably 2 to 5 g/m$^2$ in solids content. When the amount is less than the above range, it is difficult to include the above N-substituted acrylamide copolymer in the substrate paper uniformly. When the amount is more than the above range, there is a tendency that economical disadvantages increase.

The electroconductive paper of the present invention is not sticky and has solvent resistance, and has a small humidity dependency. It is supposed that the reason why the electroconductive paper of the present invention is excellent in these properties is that each of the units of the N-substituted acrylamide copolymer shows the following functions.

The ethylene units have a function of removing the defect of adhesion property at high temperatures and high humidities and releasing humidity dependency of the electroconductivity of the acrylamide units, and at the same time have film forming property after coating. Therefore, it is thought that the ethylene units exhibit solvent resistance based upon the barriering effect against a solvent. Since the N-substituted acrylamide copolymer has little solubility in a solvent at room temperature although the copolymer can be coated on or impregnated in a substrate paper in a state of a solution of a solvent such as toluene at high temperatures, it is thought the barriering effect can be exhibited.

The acrylate units improve film forming property based upon the ethylene units and impart more excellent solvent resistance.

The acrylamide units are the components for giving electroconductivity, and impart excellent electroconductivity to a substrate paper.

An electrostatic recording paper of the present invention can be suitably used as printing paper such as electronic copy paper or high speed facsimile paper.

The electrostatic paper of the present invention is produced by forming a resin containing the N-substituted acrylamide copolymer as an electroconductive substance on a substrate paper. The N-substituted polyamide copolymer solely, or a mixture of the copolymer and an olefinic resin can be used in the electroconductive substance.

As the olefinic resin, for instance, the olefinic resins usable in the above-mentioned support for recording sheets can be exemplified.

When the N-substituted acrylamide copolymer is used together with the olefinic resin, it is desirable that the amount of the N-substituted acrylamide copolymer is at least one part, preferably at least 5 parts based upon 100 parts of the resin for the resin layer so that antistatic property can be imparted.

Methods of forming the electroconductive substance on a substrate paper are not particularly limited and, for instance, a method of coating an emulsion of the electroconductive substance on a substrate paper by means of reverse roll coating method, gravure coating method or bar coating method, and the like can be cited.

The thickness of the dried electroconductive substance can be suitably adjusted in accordance to the uses of the electrostatic recording paper and is generally 0.1 to 5 μm or so, preferably 0.5 to 3.0 μm or so.

Electroconductive metallic powder or inorganic fine particle the surface of which is plated with a metal such as gold, tin or copper can also be added to the formed electroconductive substance within a range of at most 20% by weight so that electric resistance can be adjusted.

Typical examples of the substrate paper are, for instance, paper of natural fibrous pulp, a synthesized paper of synthesized resin fibrous pulp, synthesized paper of a resin such as polycarbonate, styrene polymer, a biaxial stretched polyester or polymethyl methacrylate, and the like, and the present invention is not limited to the exemplified ones.

As a high resistant dielectric material which is formed on the electroconductive layer of the substrate paper, known high resistant dielectric materials can be used. As the high resistant dielectric material, for instance, a material prepared by blending a high dielectric resin with inorganic fine powder and the like can be cited.

The high dielectric resin is intended to mean a resin of which electric resistance is at least $10^{12}\Omega$. Typical examples of the resin are, for instance, resins for the high dielectric layer which can be used in the above-mentioned support for recording sheets, and the like.

Examples of the inorganic fine powder are, for instance, powder having a particle diameter of at most 2 μm such as calcium carbonate, hydrated almina sol, silica or these powders of which surface is treated with a titanate coupling agent.

The amount of the inorganic fine powder added to the high dielectric resin is usually 3 to 50 parts, preferably 10 to 40 parts based upon 100 parts of the high dielectric resin.

The high resistant dielectric material is formed on the electroconductive layer as an emulsion or a solution of an organic solvent such as methyl ethyl ketone. The thickness of the dried high resistant dielectric layer can be suitably adjusted in accordance with the uses of the electrostatic recording article, and is usually 0.5 to 10 μm, preferably 5 to 7 μm.

A foamed article comprising an olefinic resin of the present invention is excellent in antistatic property and surface wettability, and can be suitably used as a material for living goods such as bath mats, packings, heat insulating materials, interior materials of cars, and the like.

The foamed article comprising an olefinic resin of the present invention contains the above-mentioned N-substituted acrylamide copolymer. The N-substituted acrylamide copolymer can be used alone or together with an olefinic resin.

As the olefinic resin, the resins which can be used in the above-mentioned resin for the foamed article of the laminate of an olefinic resin foamed article and an olefinic resin layer can be exemplified.

When the N-substituted acrylamide copolymer is used together with an olefinic resin, it is desirable that the amount of the N-substituted acrylamide copolymer is at least 0.1 part, preferably at least 20 parts based upon 100 parts of the resin components contained in an obtained olefinic resin foamed article so that antistatic property and surface wettability can be imparted to the foamed article.

In the present invention, an inorganic filler such as calcium carbonate, talc or single glass fiber, various assistants such as antioxidant, flame retarder, colorant or multifunctional monomer and the like can be contained in the foamed article in an amount which does not obstruct the objects of the present invention. The foamed article of the present invention also may contain a known surfactant having a low molecular weight within an amount of at most 30 parts based upon 100 parts of the olefinic resin. When the surfactant is used within a range of at most 30 parts, bleeding would not be observed from an obtained foamed article.

Methods of producing the olefinic resin foamed article of the present invention are not particularly limited and known methods can be employed. Typical examples of the methods are, for instance, the methods employed in preparing the above-mentioned foamed article for the laminate comprising a olefinic resin foamed article and an olefinic resin layer, and the like.

The thus obtained foamed article of the present invention can be processed by corona discharge treatment on at least one side surface of the foamed article to improve wettability and adhesion property to various water-soluble coating agents. The foamed article of the present invention also can be further provided with a coating agent layer and laminated with various materials such as surface materials, films, sheets, the other foamed artices, metallic foil, paper or non-woven fabric made of natural or synthesized fiber or synthesized leather to give a laminated composite and the obtained composite can be molded by various methods.

A laminate of foamed articles of the present invention can be suitably used as a material for living goods such as bath mats, packings, heat insulating materials, interior materials for cars, and the like.

The laminate of foamed articles is produced by laminating a foamed article layer containing the N-substituted acrylamide copolymer on an olefinic resin foamed article for a substrate.

The olefinic resin foamed article layer contains the N-substituted acrylamide copolymer. The N-substituted acrylamide copolymer can be used alone or together with an olefinic resin.

As the olefinic resin, for instance, the resins which can be used in the above-mentioned foamed article comprising an olefinic resin are cited.

When the N-substituted acrylamide copolymer is used together with the olefinic resin, the amount of the N-substituted acrylamide copolymer is at least 0.1 part, preferably at least 20 parts based upon 100 parts of the resins of the olefinic resin layer so that antistatic property can be imparted to the foamed article.

The resin components of an olefinic resin foamed article used as a substrate is not particularly limited and may be suitably selected in accordance with the uses of the laminate of foamed articles of the present invention. Typical examples of the resins are, for instance, the resins which can be used in the olefinic resins for the foamed article of the above-mentioned laminate of an olefinic resin foamed article and an olefinic resin layer can be cited.

Examples of the methods for preparing the foamed article are, for instance, there can be cited the methods employed when the foamed article for the above-mentioned laminate comprising an olefinic resin article and an olefinic resin layer is produced.

The expansion ratio and the thickness of the above-mentioned foamed article and the above-mentioned foamed article layer are not particularly limited and can be suitably selected in accordance with the uses of the laminate of foamed articles.

In the above-mentioned foamed article layer and the foamed article, various auxiliary agents usuable in the above-mentioned thermoplastic resin film can be contained in an amount which does not obstruct the objects of the present invention.

Also, a known surfactant having a low molecular weight can be used in the olefinic resin within an amount of at most 30 parts based upon 100 parts of the olefinic resin. When the surfactant is used within the range of at most 30 parts, bleeding would not be observed from an obtained laminate of foamed articles.

Methods for laminating the foamed article layer on the foamed article are not particularly limited. Examples of the methods are, for instance, a method comprising preparing a foamed article for a substrate, heating the both surfaces of a foamed article layer containing the N-substituted acrylamide copolymer by hot air to a temperature of at least the melting point thereof to fuse and laminating the foamed article thereon, a method comprising directly laminating a foamed article layer containing the N-substituted acrylamide copolymer on a foamed article during the preparation of the foamed article, more concretely, a method comprising laminating an olefinic resin foamed article layer having a thickness of 0.5 to 2 mm on one or both sides of the olefinic resin for a foamed article in a molten state, and expanding the olefinic resin, and the like.

The thus obtained laminate of foamed articles of the resin present invention can be processed by means of a corona treatment method on at least one side surface to improve wettability and adhesion property to various water-soluble coating agents. The laminate of foamed articles also can be provided with a coating agent layer or laminated with various articles such as a surface material, a film, a sheet, another foamed article, metallic foil, paper, nonwoven fabric made of natural fiber or synthesized fiber or a synthesized leather to give a laminated composite, and the obtained composite can be molded by various methods.

The present invention is more specifically described and explained by means of the following examples, but is not limited to these examples.

REFERENCE EXAMPLE 1

A 4 l autoclave having a magnetic stirrer was charged with 200 g of an ethylene-ethyl acrylate copolymer having a weight average molecular weight of 78,000 (ethyl acrylate content: 7% by mole) and 2 kg of water. After oxygen gas dissolved in water was thoroughly removed by bubbling of nitrogen gas, the mixture was pressured under nitrogen gas (50 kg/cm$^2$), then degassed (1 kg/cm$^2$). The procedure was repeated five times to adjust the concentration of oxygen in the mixture to at most 1 ppm.

After the degradation reaction was conducted at 350° C. under a pressure of 200 kg/cm$^2$ for 4 hours under nitrogen atmosphere, cooling was carried out.

Figure 2:
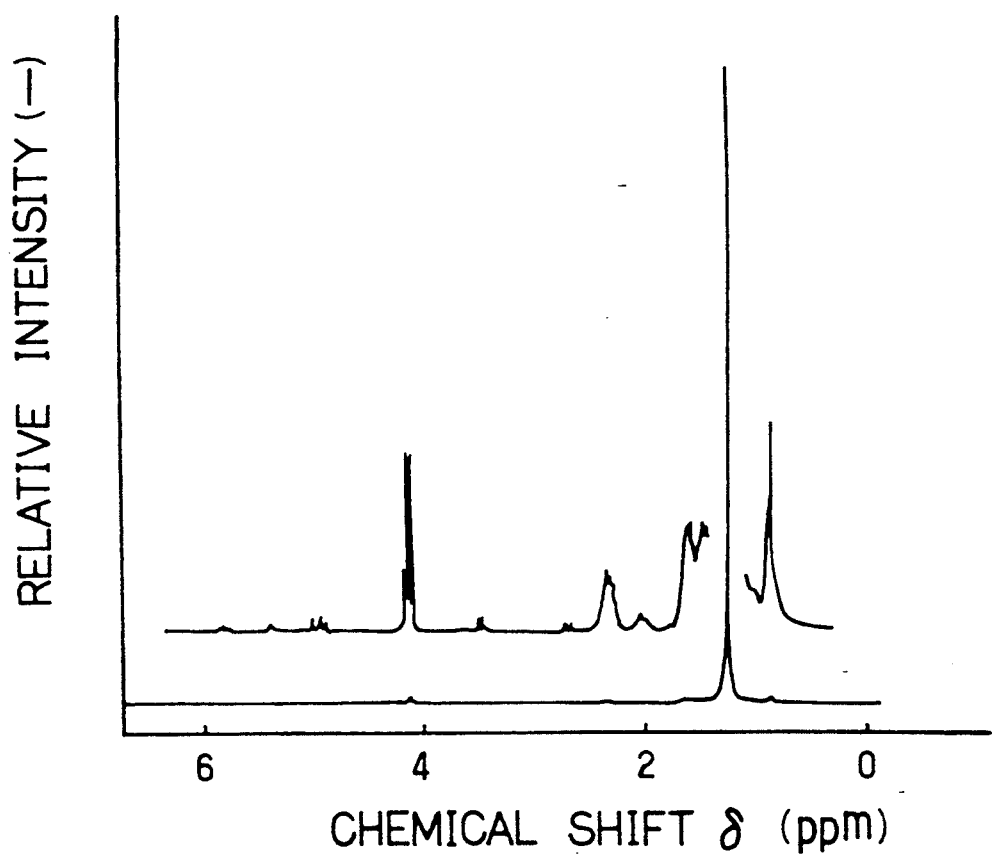

As to the obtained ethylene-ethyl acrylate-acrylic acid copolymer, a weight average molecular weight, IR (infrared absorption) spectrum and $^1$H-NMR (nuclear magnetic resonance) spectrum were determined according to the following methods. The weight average molecular weight and the content of each structure units are shown in Table 1. Also, FIG. 1 shows a chart of the IR spectrum and FIG. 2 shows a chart of the $^1$H-NMR spectrum.

Weight average molecular weight

The weight average molecular weight is determined according to the description in "Kobunshi Ronbunsyu" 44 [2] pages 139 to 141 (1987). The measuring conditions are as follows:

Apparatus: GPC-244 commercially available from Waters Inc. Column: Shodex A-80M/S (two colums) commercially available from Showa Denko Kabushiki Kaisha Solvent: 1-Chloronaphthalene
Flow rate: 0.7 ml/minute
Column temperature: 210° C.

IR spectrum

From the obtained ethylene-ethyl acrylate-acrylic acid copolymer, a KBr disc is prepared and IR spectrum is determined by using "A-202" commercially available from Nippon Bunko Kogyo Kabushiki Kaisha.

$^1$H-NMR spectrum $^1$H-NMR spectrum was determined by using "JMN-GSX 270" commercially available from Nippon Denshi Kabushiki Kaisha at 55° C., using chloroform-D as a solvent.

REFERENCE EXAMPLES 2 TO 3 AND COMPARATIVE REFERENCE EXAMPLES 1 AND 2

The procedure of Reference Example 1 was repeated except that an ethylene-acrylate copolymer as shown in Table 1 was used to give an ethylene-acrylate-acrylic acid copolymer.

As to the obtained copolymer, the weight average molecular weight and each content of the structure units were measured in the same manner as in Reference Example 1. The results are shown in Table 1.

TABLE 1

| | Ethylene-acrylate copolymer | | | Ethylene-acrylate-acrylic acid copolymer | | | |
|---|---|---|---|---|---|---|---|
| Reference Ex. No. | Weight average molecular weight | Kind of alkyl acrylate | Content (% by mole) | Weight average molecular weight | Ethylene content (% by mole) | Acrylate content (% by mole) | Acrylic acid content (% by mole) |
| 1 | 78000 | Ethyl acrylate | 7 | 22000 | 93 | 3 | 4 |
| 2 | 72000 | Propyl acrylate | 35 | 17000 | 65 | 5 | 30 |
| 3 | 61000 | Butyl acrylate | 20 | 13000 | 80 | 10 | 10 |
| Com. Ref. Ex. 1 | 100000 | Methyl acrylate | 20 | 34000 | 80 | 0 | 20 |
| Com. Ref. Ex. 2 | 46000 | Ethyl acrylate | 9 | 6500 | 91 | 0 | 9 |

EXAMPLE 1

A 1 l four-necked flask provided with a thermometer, a stirrer, a droping funnel and a Dean-stark water-separator was charged with 400 ml of xylene, 150 g of the ethylene-ethylacrylate-acrylic acid copolymer obtained in Reference Example 1 and 1.0 g of p-toluenesulfonic acid. To the flask was added 21.1 g of N,N-dimethylaminopropylamine, and it was heated to 140° C. in an oil bath. While the produced water was continuously removed from the flask by azeotropic distillation with xylene, the amidation reaction of the mixture was continued at 140° C. for 17 hours, then the reaction was further continued until the azeotrope of water disappeared.

The reaction mixture (458 g) was cooled to 80° C., 10 g of the reaction mixture containing the intermediate product of the present invention was separated.

To the rest reaction mixture was added dropwise gradually 28.7 g of methyl iodide over 1 hour. During the addition, the reaction temperature was maintained at 90° C. by cooling since the reaction system was exothermic reaction. After completing the addition, the reaction mixture was aged at 100° C. for 4 hours.

Each of the intermediate product previously obtained and the obtained reaction mixture was poured into a large amount of methanol separately to give a precipitate, and it was vacuum dried to give products.

The amounts of the obtained intermediate product and the N-substituted acrylamide copolymer were 3.5 g and 187.5 g, respectively. The yield of the intermediate product and the N-substituted acrylamide copolymer were respectively 96.7% and 98% based upon the ethylene-ethyl acrylate-acrylic acid copolymer.

Figure 3:
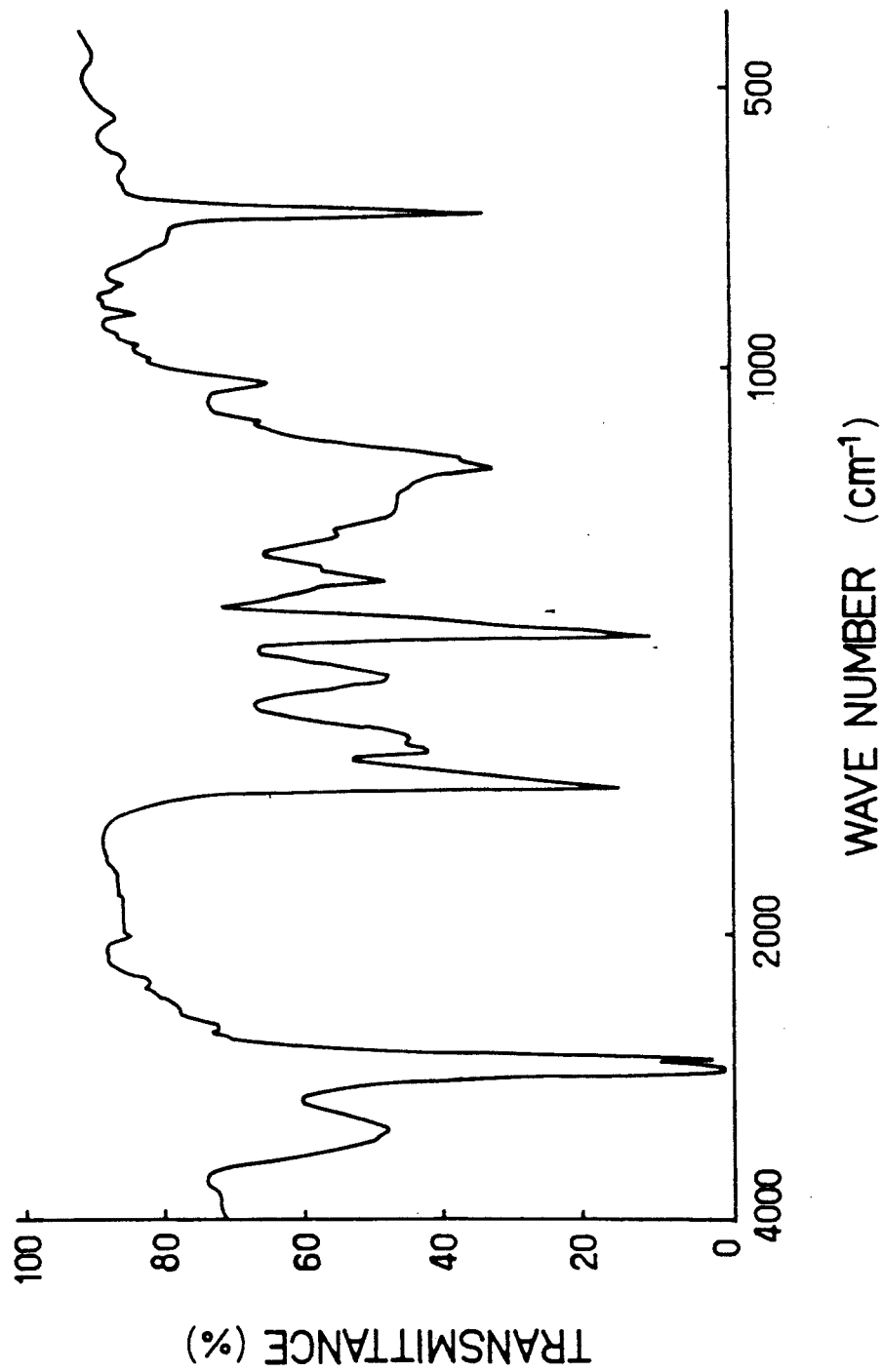
FIGS. 3 and 4 are diagrams showing infrared adsorption spectrum and $^1$H-NMR spectrum of the intermediate product of the N-substituted acrylamide copolymer prepared in Example 1, respectively.
Figure 4:
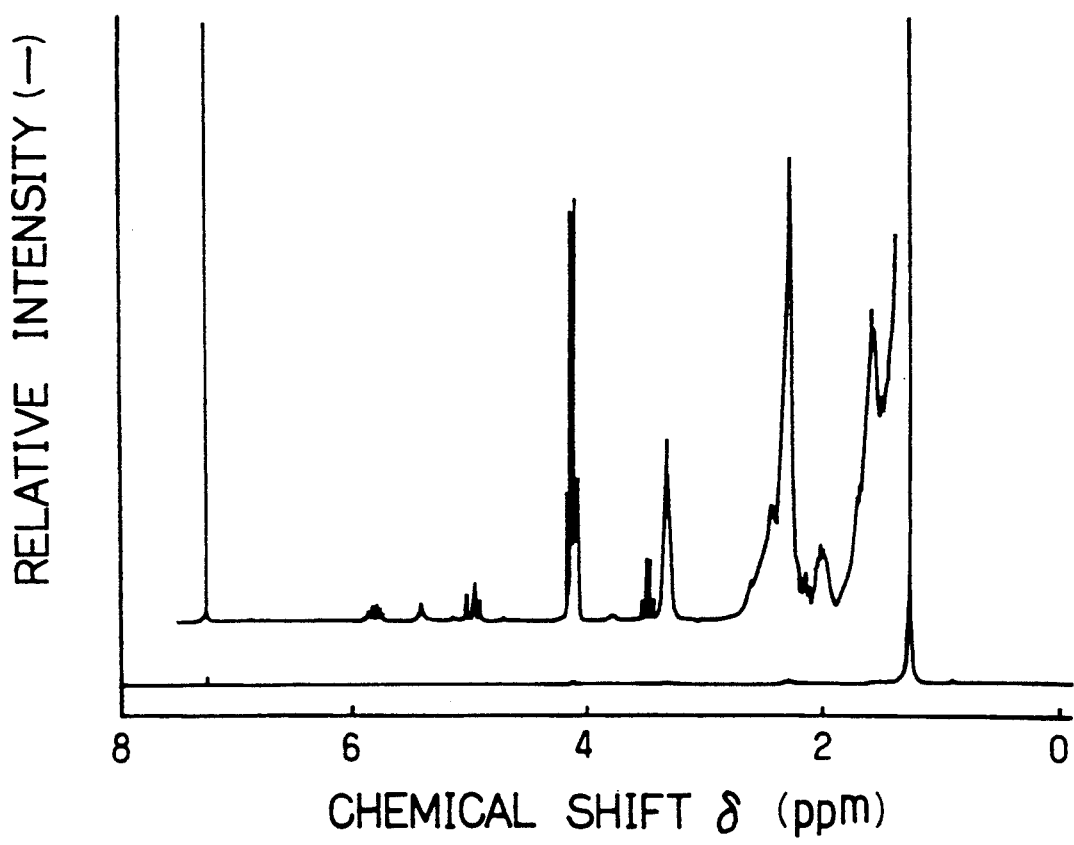
Figure 5:
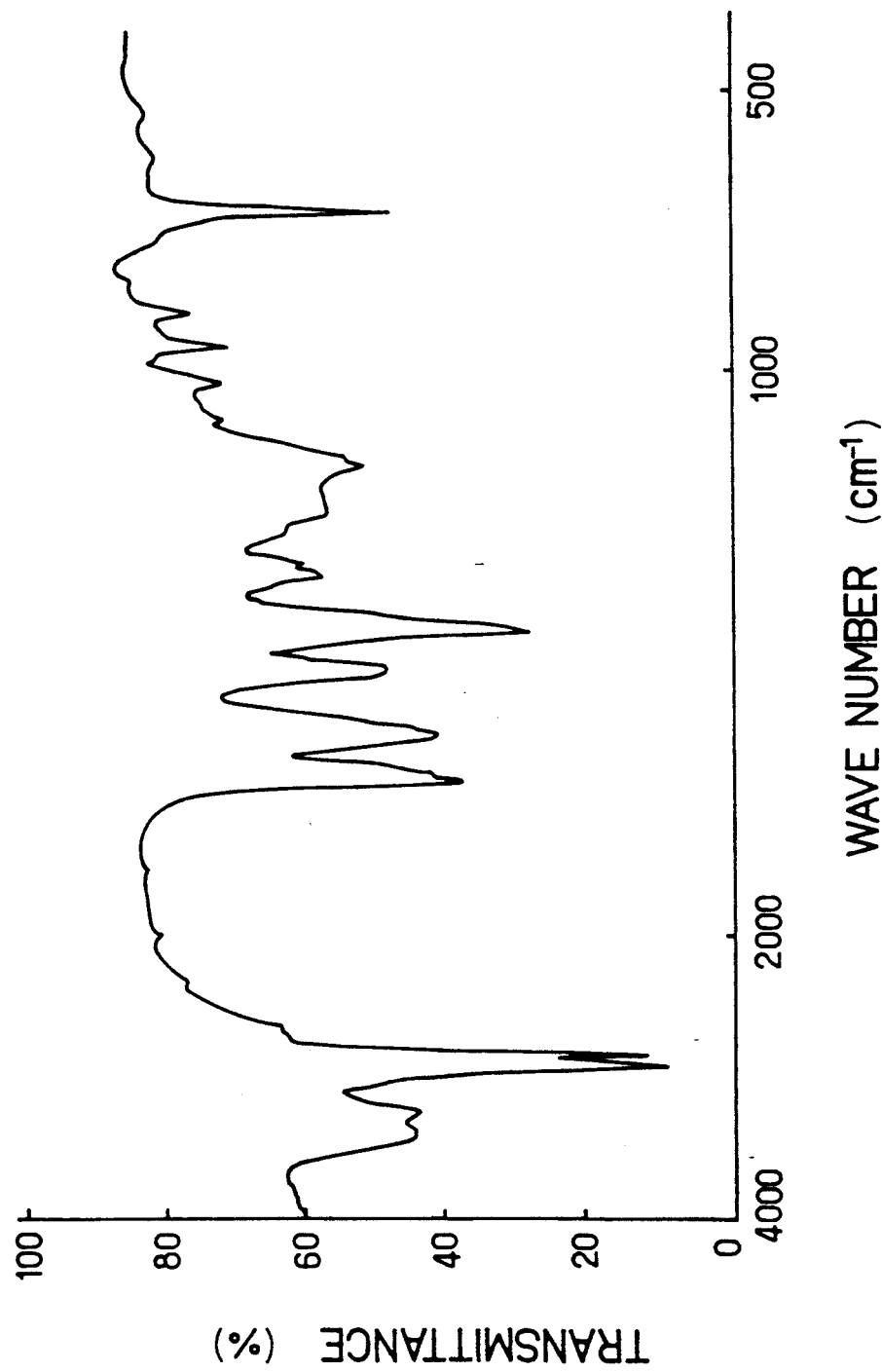
FIGS. 5 and 6 are diagrams showing infrared absorption spectrum and $^1$H-NMR spectrum of the N-substituted acrylamide copolymer prepared in Example 1.
Figure 6:
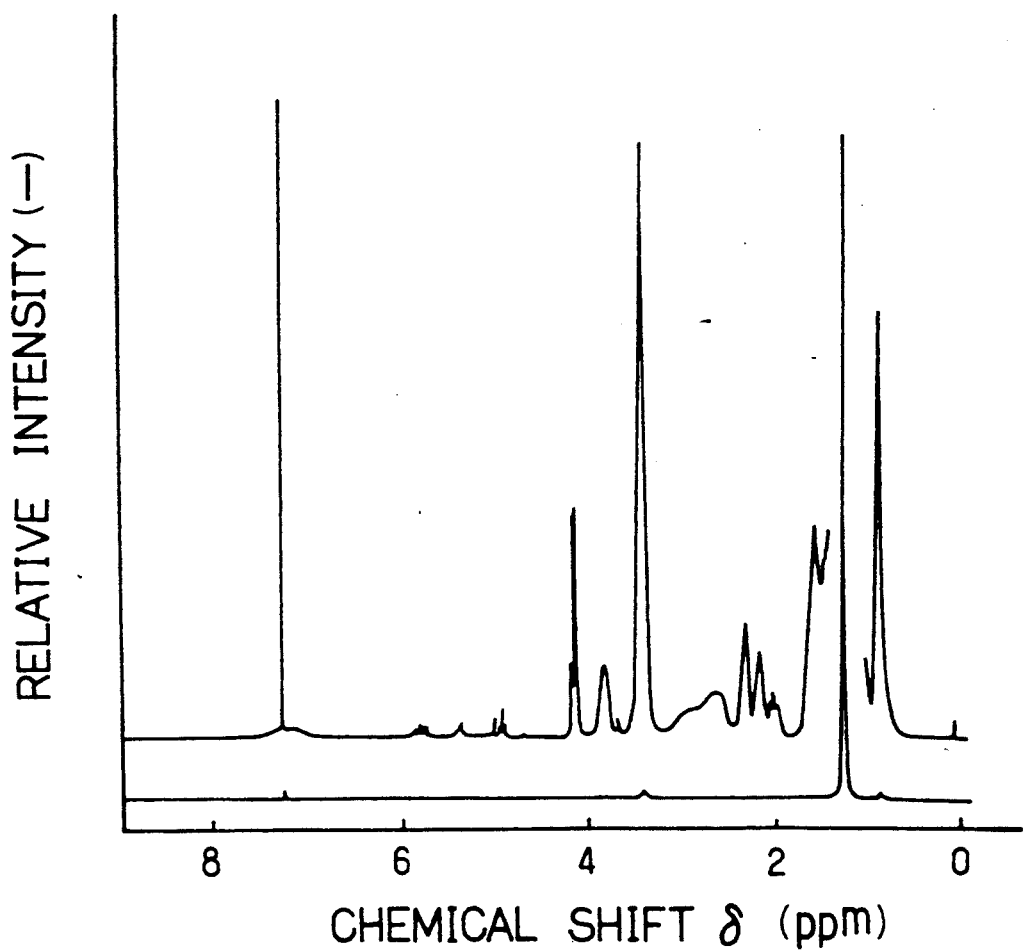
Figure 7:
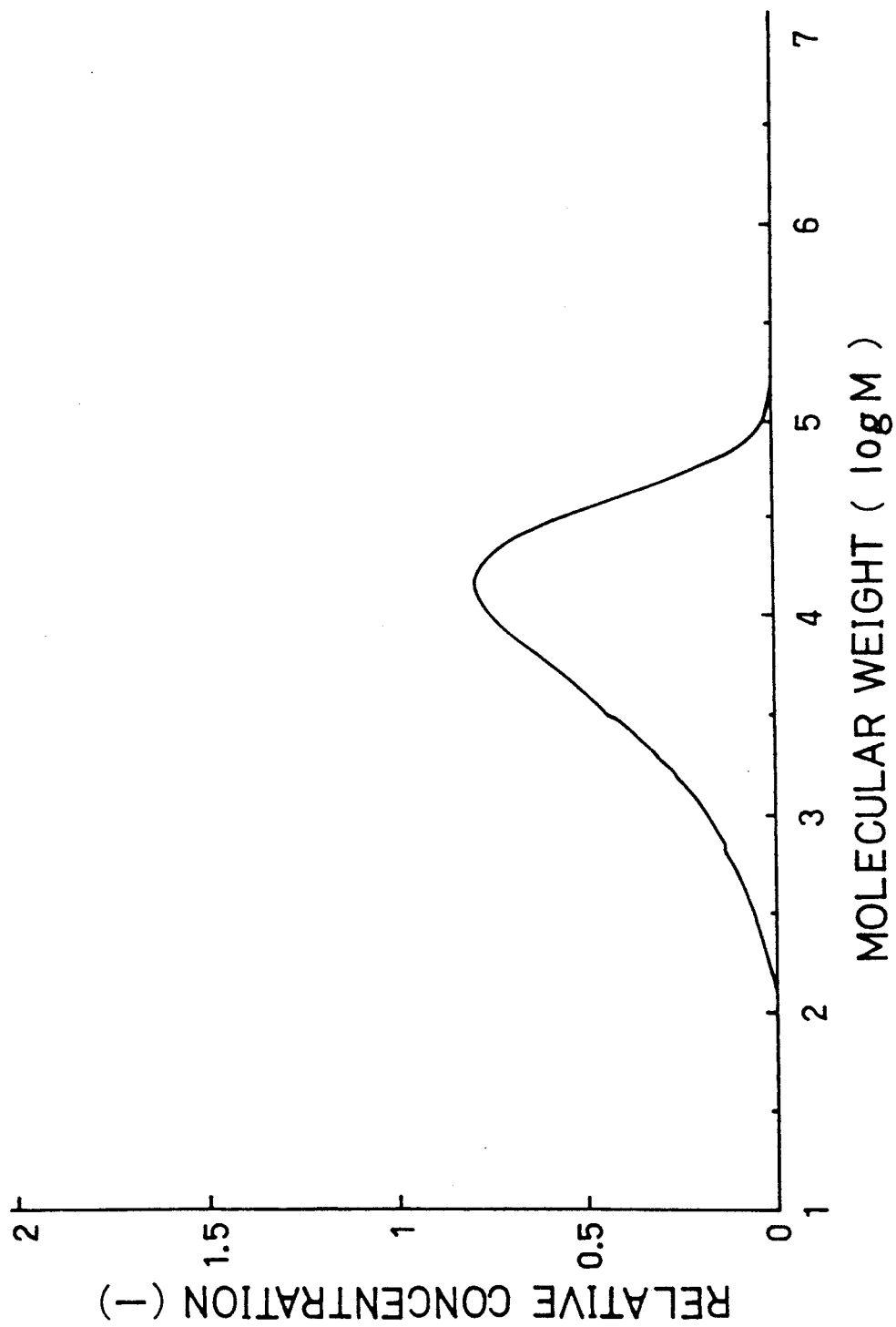
FIGS. 7 and 8 are diagrams showing molecular weight distribution curve of the intermediate product and the N-substituted acrylamide copolymer prepared in Example 1, respectively.
Figure 8:
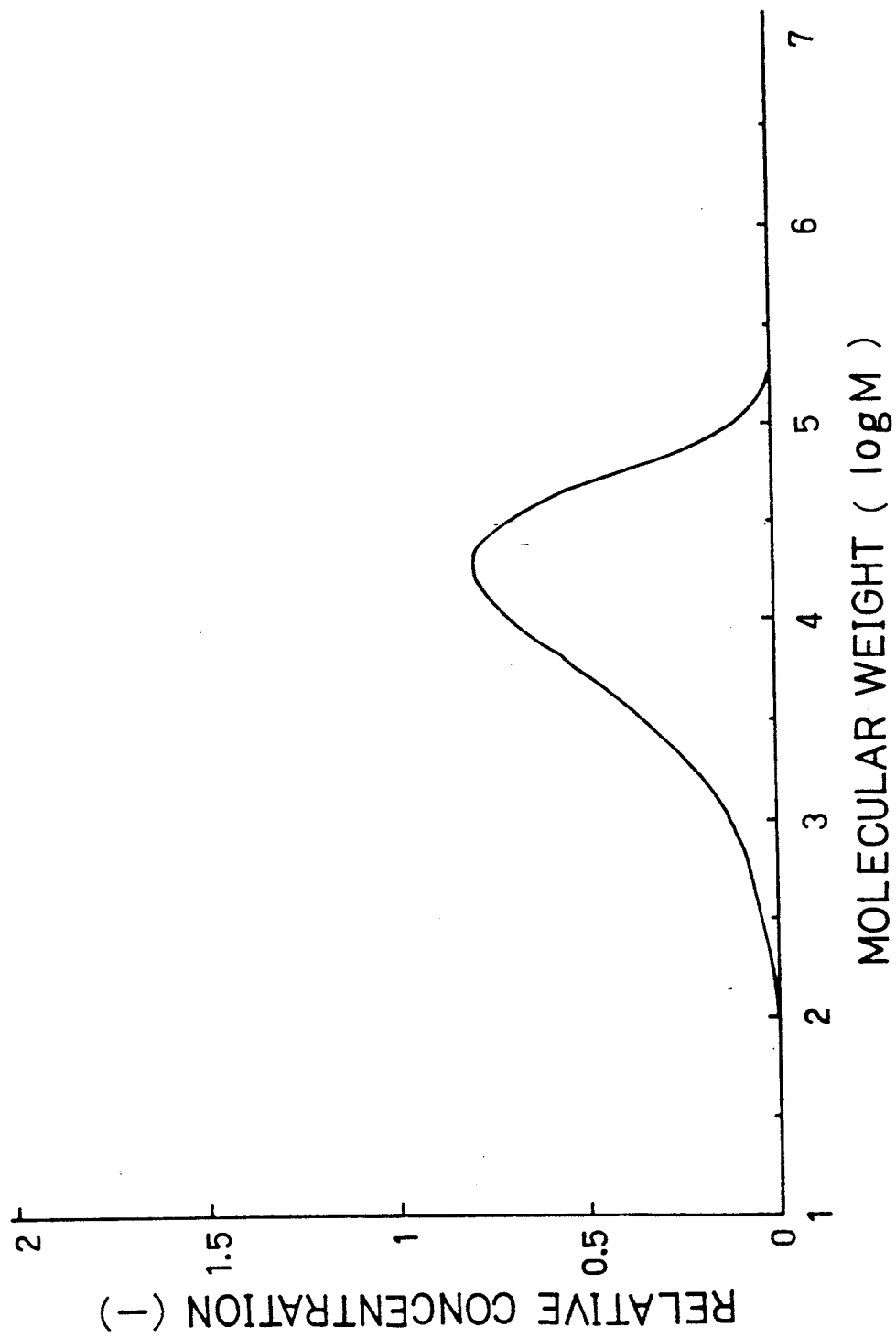

The IR spectrum, $^1$H-NMR spectrum, weight average molecular weight and number average molecular weight of the intermediate product and the N-substituted acrylamide copolymer were determined in the same manner as in Reference Example 1. The results of the IR spectrum, the weight average molecular weight and the number average molecular weight are shown in Table 2. Also, a chart of the IR spectrum and a chart of the $^1$H-NMR spectrum of the intermediate product are shown in FIG. 3 and FIG. 4, respectively and a chart of the IR spectrum and a chart of the $^1$H-NMR spectrum of the N-substituted acrylamide copolymer are shown in FIG. 5 and FIG. 6, respectively. Further, the molecular weight distribution curves of the intermediate product and the N-substituted acrylamide copolymer are shown in FIG. 7 and FIG. 8, respectively.

EXAMPLES 2 TO 7 AND COMPARATIVE EXAMPLES 1 AND 2

The procedure of Example 1 was repeated except that an ethylene-acrylate-acrylic acid copolymer, an amine and a quartermarizing agent shown in Table 2 were used to give an N-substituted acrylamide copolymer.

Yields of the N-substituted acrylamide copolymers are shown in Table 2. Also, as to the intermediate product, the number average molecular weight and weight average molecular weight were measured. As to the N-substituted acrylamide copolymer, the number average molecular weight, weight average molecular weight, IR spectrum and $^1$H-NMR spectrum were determined. The results are shown in Table 2.

The results of the $^1$H-NMR spectrum [chemical shift (ppm)] are as follows.

(a) Results of the $^1$H-NMR spectrum of the N-substituted acrylamide polymer of Example 1

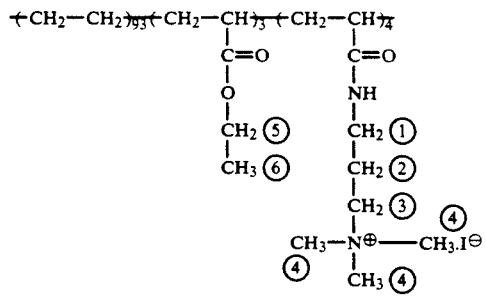

Chemical shift (ppm) ①: 3.4, ②: 2.2, ③: 3.8, ④: 3.4, ⑤: 4.1, ⑥: 1.5.

(b) Results of the $^1$H-NMR spectrum of the N-substituted acrylamide copolymer of Example 2

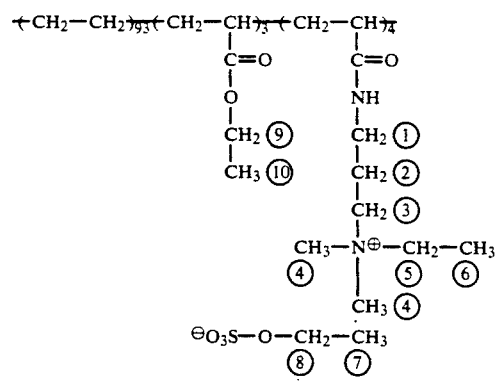

Chemical shift (ppm) ①: 3.4, ②: 2.2, ③: 3.7, ④: 3.1, ⑤: 3.5, ⑥: 1.5, ⑦: 1.5, ⑧: 4.1, ⑨: 4.1, ⑩: 1.5.

(c) Results of the $^1$H-NMR spectrum of the N-substituted acrylamide copolymer of Example 3

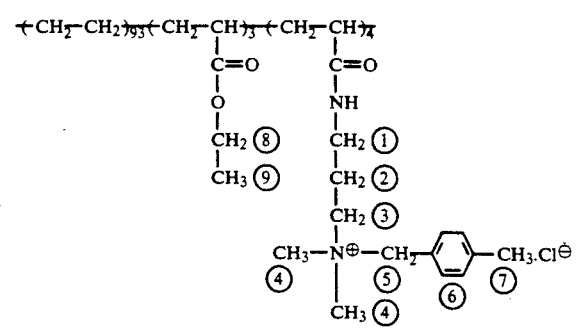

Chemical shift (ppm) ①: 3.3, ②: 2.2, ③: 3.7, ④: 3.1, ⑤: 4.6, ⑥: 7.2 to 7.4, ⑦: 2.3, ⑧: 4.1, ⑨: 1.5.

(d) Results of the $^1$H-NMR spectrum of the N-substituted acrylamide copolymer of Example 4

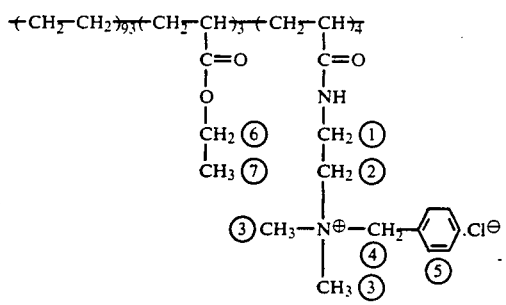

Chemical shift (ppm) ①: 3.8, ②: 3.8, ③: 3.3, ④: 4.9, ⑤: 7.4 to 7.6, ⑥: 4.1, ⑦: 1.5.

(e) Results of the $^1$H-NMR spectrum of the N-substituted acrylamide polymer of Example 5

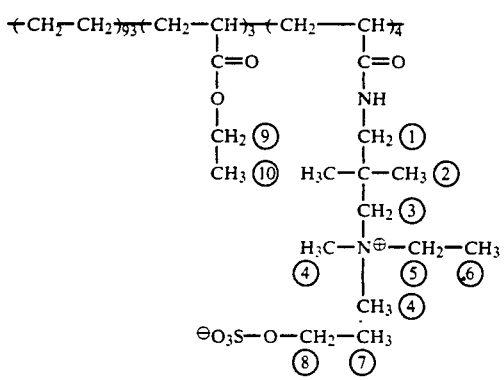

Chemical shift (ppm) ①: 3.5, ②: 1.5, ③: 3.9, ④: 3.1, ⑤: 3.5, ⑥: 1.5, ⑦: 1.5, ⑧: 4.1, ⑨: 4.1, ⑩: 1.5.

(f) Results of the $^1$H-NMR spectrum of the N-substituted acrylamide polymer of Example 6

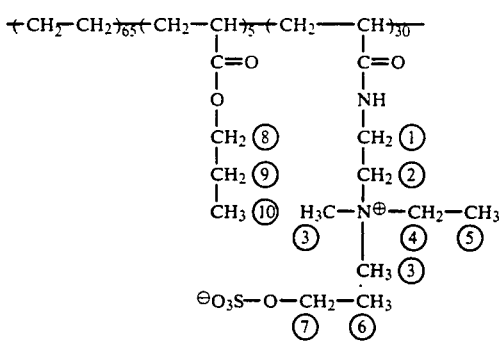

Chemical shift (ppm) ①: 3.8, ②: 3.8, ③: 3.1, ④: 3.5, ⑤: 1.5, ⑥: 1.5, ⑦: 4.1, ⑧: 4.1, ⑨: 1.5, ⑩: 1.5.

(g) Results of the $^1$H-NMR spectrum of the N-substituted acrylamide copolymer of Example 7

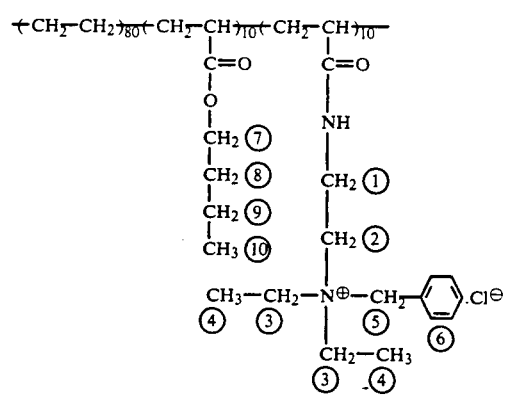

Chemical shift (ppm) ①: 3.8, ②: 3.8, ③: 3.5, ④: 1.5, ⑤: 4.9, ⑥: 7.4~7.6, ⑦: 4.0, ⑧: 1.5, ⑨: 1.5, ⑩: 1.5.

(h) Results of the $^1$H-NMR spectrum of the N-substituted acrylamide copolymer of Comparative Example 2

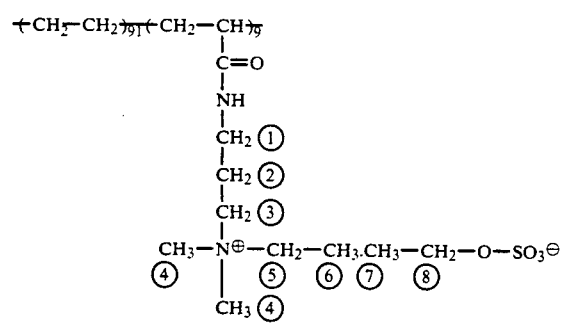

Chemical shift ①: 3.4, ②: 2.1, ③: 3.5, ④: 3.1, ⑤: 3.5, ⑥: 1.5, ⑦: 1.5, ⑧: 4.1.

(i) Results of the $^1$H-NMR spectrum of the N-substituted acrylamide copolymer of Comparative Example 2

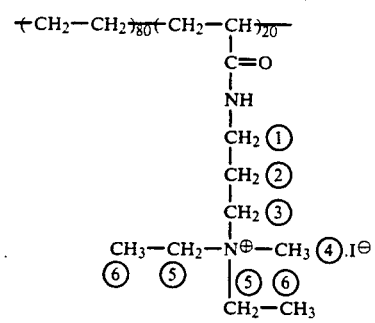

Chemical shift (ppm) ①: 3.4, ②: 2.2, ③: 3.8, ④: 3.1, ⑤: 3.5, ⑥: 1.5.

TABLE 2

| Ex. | Ethylene-acrylate-acrylic | Amine | | Quaternarizing agent | | Intermediate product | |
|---|---|---|---|---|---|---|---|
| | | | Amount | | Amount | Weight average molecular | Number average molecular |

TABLE 2-continued

| No. | acid copolymer | Kind | (mole)*1 | Kind | (mole)*2 | weight | weight |
|---|---|---|---|---|---|---|---|
| 1 | The polymer in Ref. Ex. 1. | N,N-Dimethyl-aminopropylamine | 110 | Methyl iodide | 100 | 14200 | 3060 |
| 2 | The polymer in Ref. Ex. 1. | N,N-Dimethyl-aminopropylamine | 110 | Diethyl sulfate | 103 | 14200 | 3060 |
| 3 | The polymer in Ref. Ex. 1. | N,N-Dimethyl-aminopropylamine | 110 | α-Chloropara-xylene | 105 | 14200 | 3060 |
| 4 | The polymer in Ref. Ex. 1. | N,N-Dimethyl-aminopropylamine | 105 | Benzylchloride | 105 | 13100 | 3050 |
| 5 | The polymer in Ref. Ex. 1. | N,N-Dimethyl-neopentyldiamine | 120 | Diethyl sulfate | 103 | 15500 | 3370 |
| 6 | The polymer in Ref. Ex. 3. | N,N-Dimethyl-aminoethylamine | 105 | Diethyl sulfate | 103 | 11150 | 2530 |
| 7 | The polymer in Ref. Ex. 4. | N,N-Diethyl-aminoethylamine | 105 | Benzylchloride | 105 | 7370 | 1640 |
| Com. Ex. 1 | The polymer in Com. Ref. Ex. 2. | N,N-Dimethyl-aminopropylamine | 110 | Diethyl sulfate | 103 | 3100 | 780 |
| 2 | The polymer in Com. Ref. Ex. 1. | N,N-Diethyl-aminopropylamine | 105 | Methyl iodide | 103 | 30500 | 6350 |

| | | | N-substituted acrylamide copolymer | | |
|---|---|---|---|---|---|
| Ex. No. | Yield (%) | Color | IR spectrum Characteristic absorption | Weight average molecular weight | Number average molecular weight |
| 1 | 98.0 | Light yellow | 1730 cm$^{-1}$ (acrylate $\nu_{C=O}$); 1650 cm$^{-1}$ (amide $\nu_{C=O}$); 1530 cm$^{-1}$ (amide $\nu_{C-N}$) | 19400 | 4120 |
| 2 | 99.8 | Light yellow | 1730 cm$^{-1}$ (acrylate $\nu_{C=O}$); 1650 cm$^{-1}$ (amide $\nu_{C=O}$); 1540 cm$^{-1}$ (amide $\nu_{C-N}$) | 19900 | 4230 |
| 3 | 97.9 | Light yellow | 1735 cm$^{-1}$ (acrylate $\nu_{C=O}$); 1650 cm$^{-1}$ (amide $\nu_{C=O}$); 1545 cm$^{-1}$ (amide $\nu_{C-N}$); 820 cm$^{-1}$ (phenyl) | 20010 | 4250 |
| 4 | 97.5 | Light yellow | 1725 cm$^{-1}$ (acrylate $\nu_{C=O}$); 1650 cm$^{-1}$ (amide $\nu_{C=O}$); 1530 cm$^{-1}$ (amide $\nu_{C-N}$); 760 cm$^{-1}$ (phenyl) | 15600 | 3890 |
| 5 | 96.7 | Light yellow | 1730 cm$^{-1}$ (acrylate $\nu_{C=O}$); 1650 cm$^{-1}$ (amide $\nu_{C=O}$); 1550 cm$^{-1}$ (amide $\nu_{C-N}$) | 21000 | 4500 |
| 6 | 99.5 | Light yellow | 1725 cm$^{-1}$ (acrylate $\nu_{C=O}$); 1650 cm$^{-1}$ (amide $\nu_{C=O}$); 1530 cm$^{-1}$ (amide $\nu_{C-N}$) | 14050 | 3050 |
| 7 | 97.5 | Light yellow | 1730 cm$^{-1}$ (acrylate $\nu_{C=O}$); 1650 cm$^{-1}$ (amide $\nu_{C=O}$); 1530 cm$^{-1}$ (amide $\nu_{C-N}$); 760 cm$^{-1}$ (phenyl) | 9100 | 2000 |
| Com. Ex. 1 | 98.8 | Light yellow | 1650 cm$^{-1}$ (amide $\nu_{C=O}$); 1545 cm$^{-1}$ (amide $\nu_{C-N}$); | 4000 | 990 |
| Com. Ex. 2 | 98.7 | Light yellow | 1650 cm$^{-1}$ (amide $\nu_{C=O}$); 1545 cm$^{-1}$ (amide $\nu_{C-N}$); | 33000 | 7020 |

| | N-substituted acrylamide copolymer Acrylamide structure units | | | | |
|---|---|---|---|---|---|
| Ex. No. | $R^2$ | $R^3$ | $R^4$ | $R^5$ | $X^-$ |
| 1 | $-(CH_2)_3-$ | $-CH_3$ | $-CH_3$ | $-CH_3$ | $I^-$ |
| 2 | $-(CH_2)_3-$ | $-CH_3$ | $-CH_3$ | $-C_2H_5$ | $C_2H_5-O-SO_3^-$ |
| 3 | $-(CH_2)_3-$ | $-CH_3$ | $-CH_3$ | $-CH_2-C_6H_4-CH_3$ | $Cl^-$ |
| 4 | $-(CH_2)_3-$ | $-CH_3$ | $-CH_3$ | $-CH_2-C_6H_5$ | $Cl^-$ |
| 5 | $-(CH_2-C(CH_3)_2-CH_2)-$ | $-CH_3$ | $-CH_3$ | $-C_2H_5$ | $C_2H_5-O-SO_3^-$ |
| 6 | $-(CH_2)_2-$ | $-CH_3$ | $-CH_3$ | $-C_2H_5$ | $C_2H_5-O-SO_3^-$ |
| 7 | $-(CH_2)_2-$ | $-C_2H_5$ | $-C_2H_5$ | $-CH_2-C_6H_5$ | $Cl^-$ |
| Com. Ex. 1 | $-(CH_2)_3-$ | $-CH_3$ | $-CH_3$ | $-C_2H_5$ | $C_2H_5-O-SO_3^-$ |

TABLE 2-continued

| 2 | —(CH$_2$)$_3$— | —C$_2$H$_5$ | —C$_2$H$_5$ | —CH$_3$ | I$^-$ |
|---|---|---|---|---|---|

(Notes)
*¹Mole based upon 100 moles carboxy groups
*²Mole based upon 100 moles of tertiary amines

EXPERIMENTAL EXAMPLES 1 TO 7

A non-stretched film was prepared from the N-substituted acrylamide copolymer obtained in each of Examples 1 to 7, or a mixture of 10 parts of the N-substituted acrylamide copolymer and 90 parts of polypropylene (commercially available under the trade name "JS 1429" from Mitsui Toatsu Chemical, Inc.) using a T-die film-forming apparatus having a temperature of 200° C. The non-stretched film was 50 μm in thickness and 500 mm in a width.

The obtained film was cut to give a test film (10 cm×10 cm).

As to the obtained test film, surface resistivity, durability, water resistance, anti-blocking property, transparency, and tensile strength and strein were determined according to the following methods. The results are shown in Table 3.

Surface resistivity (A) Surface resistivity

The test film is allowed to stand at 20° C. under 30% RH (relative humidity), or at 20° C. under 60% RH for 24 hours. Then, the surface resistivity of the test film is measured using a super insulation meter R-503 commercially available from Kabushiki Kaisha Kawaguchi Denki Seisakusho.

(B) Durability

After the test film is stored at room temperature for 30 days, it is allowed to stand at 20° C. under 60% RH for 24 hours. The surface resistivity is measured in the same manner as the above.

(C) Water resistance

The test film prepared from the N-substituted acrylamide copolymer is stored at room temperature for 30 days. Also, the test film prepared from the mixture of the N-substituted acrylamide copolymer and polypropylene is aged at 40° C. for 14 days in an oven. Then, the surface of each film is thoroughly washed with a 0.1 aqueous solution of a neutral detergent commercially available under the trademark "Mama Lemom" from Lion Corporation, and subsequently was thoroughly washed with deionized water. The film is allowed to stand at 20° C. under 60% RH for 24 hours. The surface resistivity was measured in the same manner as the above.

Anti-blocking property

Two test films prepared from the mixture of the N-substituted acrylamide copolymer and polypropylene are put between two glass plates (20 cm×20 cm), and it is aged in an oven having a temperature of 40° C. for 14 days.

The film is peeled off from the other by hands, and the film surface is observed with naked eyes.

Estimation
○: There is no blocking on the film.
X: There is a blocking on the film.

Transparency

The film prepared from the mixture of the N-substituted acrylamide copolymer and polypropylene is observed with naked eyes.

Estimation
○: Excellent transparency
X: Bad transparency

Tensile strength and strein

The film prepared from the N-substituted acrylamide copolymer is cut to give a sample having 10 mm in width and 10 mm in length, and the thickness of the sample (T mm) is measured. The sample is set in a Tensilon tensile tester wherein the distance between chacks is 50 mm, and a tensile strength at break (S) and a strein at break (s) of the sample are measured by stretching the sample at a speed of 300 mm/minute. The tensile strength and strein are respectively calculated according to the following equations.

$$\text{Tensile strength (kg/mm}^2\text{)} = \frac{S \text{ (kg)}}{10 \text{ mm} \times T \text{ mm}}$$

$$\text{Strein (\%)} = \frac{s \text{ (mm)}}{50 \text{ mm}} \times 100$$

COMPARATIVE EXPERIMENTAL EXAMPLE 1

The procedure of Experimental Example 1 was repeated except that polypropylene was used solely to give a test film. As to the test film, the physical properties were measured in the same manner as in Experimental Example 1. The results are shown in Table 3.

COMPARATIVE EXPERIMENTAL EXAMPLE 2

The procedure of Experimental Example 1 was repeated except that a mixture of 100 parts of polypropylene and 3 parts of stearyl diethanol amide was used as an antistatic agent to give a test film. As to the test film, the physical properties were measured in the same manner as in Example 1. The results are shown in Table 3.

COMPARATIVE EXPERIMENTAL EXAMPLES 3 AND 4

The procedure of Experimental Example 1 was repeated except that the N-substituted acrylamide copolymer obtained in each of Comparative Examples 1 and 2 was used to give a test film. As to the test film, the physical properties were measured in the same manner as in Experimental Example 1. The results are shown in Table 3.

TABLE 3

| | Surface resistivity (Ω) N-substituted acrylamide copolymer | | | |
|---|---|---|---|---|
| | Surface resistivity | | Durability At 20° C. under | Water resistance At 20° C. under |
| | At 20° C. under 30% RH | At 20° C. under 60% RH | 60% RH | 60% RH |

TABLE 3-continued

| Experimental Ex. No. | | | | |
|---|---|---|---|---|
| 1 | $3.3 \times 10^8$ | $7.6 \times 10^7$ | $7.8 \times 10^7$ | $8.1 \times 10^7$ |
| 2 | $1.6 \times 10^8$ | $8.5 \times 10^7$ | $8.1 \times 10^7$ | $8.5 \times 10^7$ |
| 3 | $4.3 \times 10^8$ | $1.5 \times 10^7$ | $1.6 \times 10^7$ | $1.8 \times 10^7$ |
| 4 | $9.3 \times 10^8$ | $2.4 \times 10^8$ | $3.0 \times 10^8$ | $3.5 \times 10^8$ |
| 5 | $1.4 \times 10^8$ | $6.9 \times 10^7$ | $6.9 \times 10^7$ | $7.1 \times 10^7$ |
| 6 | $5.6 \times 10^7$ | $1.7 \times 10^7$ | $1.8 \times 10^7$ | $1.9 \times 10^7$ |
| 7 | $2.0 \times 10^8$ | $7.8 \times 10^7$ | $7.7 \times 10^7$ | $7.9 \times 10^7$ |
| Com. Experimental Ex. | | | | |
| 1 | — | — | — | — |
| 2 | — | — | — | — |
| 3 | $2.4 \times 10^8$ | $1.0 \times 10^7$ | $1.5 \times 10^7$ | $2.0 \times 10^7$ |
| 4 | $6.2 \times 10^7$ | $1.8 \times 10^7$ | $2.0 \times 10^7$ | $1.9 \times 10^7$ |

| Surface resistivity ($\Omega$) N-substituted acrylamide copolymer/polypropylene (10 parts/90 parts) | | | | | | | |
|---|---|---|---|---|---|---|---|
| Surface resistivity | | Durability | Water resistance | Anti-blocking property | Trans-parency | Tensile strength (kg/mm$^2$) | Strein (%) |
| At 20° C. under 30% RH | At 20° C. under 60% RH | At 20° C. under 60% RH | At 20° C. under 60% RH | | | | |
| Experimental Ex. No. | | | | | | | |
| 1 | $8.9 \times 10^{10}$ | $4.3 \times 10^{10}$ | $5.2 \times 10^{10}$ | $4.9 \times 10^{10}$ | ◯ | ◯ | 4.5 | 690 |
| 2 | $1.1 \times 10^{11}$ | $5.3 \times 10^{10}$ | $5.1 \times 10^{10}$ | $5.3 \times 10^{10}$ | ◯ | ◯ | 4.2 | 660 |
| 3 | $6.8 \times 10^{10}$ | $2.4 \times 10^{10}$ | $3.1 \times 10^{10}$ | $2.9 \times 10^{10}$ | ◯ | ◯ | 4.4 | 620 |
| 4 | $8.8 \times 10^{11}$ | $3.8 \times 10^{11}$ | $3.7 \times 10^{11}$ | $3.9 \times 10^{11}$ | ◯ | ◯ | 4.3 | 715 |
| 5 | $2.1 \times 10^{11}$ | $8.0 \times 10^{10}$ | $8.3 \times 10^{10}$ | $8.5 \times 10^{10}$ | ◯ | ◯ | 4.6 | 680 |
| 6 | $2.1 \times 10^{10}$ | $1.0 \times 10^{10}$ | $1.1 \times 10^{10}$ | $1.5 \times 10^{10}$ | ◯ | ◯ | 4.1 | 710 |
| 7 | $1.3 \times 10^{11}$ | $5.8 \times 10^{10}$ | $5.7 \times 10^{10}$ | $6.3 \times 10^{10}$ | ◯ | ◯ | 4.0 | 610 |
| Experimental Ex. | | | | | | | |
| 1 | $9.1 \times 10^{16}$ | $8.5 \times 10^{16}$ | $7.3 \times 10^{16}$ | $9.7 \times 10^{16}$ | ◯ | ◯ | 4.8 | 650 |
| 2 | $5.8 \times 10^{13}$ | $4.3 \times 10^{11}$ | $2.1 \times 10^{12}$ | $5.3 \times 10^{14}$ | X | X | 3.1 | 310 |
| 3 | $5.9 \times 10^{10}$ | $2.1 \times 10^{10}$ | $2.8 \times 10^{10}$ | $2.6 \times 10^{10}$ | ◯ | ◯ | 1.9 | 140 |
| 4 | $3.0 \times 10^{10}$ | $1.1 \times 10^{10}$ | $2.1 \times 10^{10}$ | $2.0 \times 10^{10}$ | ◯ | ◯ | 1.7 | 67 |

As apparent from the results shown in Table 3, it would be recognized that the N-substituted acrylamide copolymer of the present invention can impart excellent antistatic property to thermoplastic resins, and is excellent in blocking resistance and does not gives the lowering of transparency, tensile strength and elongation.

EXAMPLES 8 TO 14

An aqueous composition containing each N-substituted acrylamide copolymer obtained in each of Examples 1 to 7, a surfactant and water shown in Table 4 was prepared under the conditions shown in Table 4 in a glass autoclave TEM-V-1000 commercially available from Taiatsu Glass Kogyo Kabushiki Kaisha.

As to the prepared aqueous composition, viscosity, particle size, pH, electroconductivity, transparency and abrasion resistance were measured in accordance with the following methods. The results are shown in Table 4.

Viscosity

The aqueous composition is allowed to stand in a thermostatic room having a temperature of 25° C. for 24 hours. The viscosity is measured at 60 rpm (25° C.) by using a BM viscometer commercially available from Kabushiki Kaisha Tokimeck.

Particle size

A particle size is measured by using "DLS-700" commercially available from Otsuka Denshi Kabushiki Kaisha.

Light source: 5 mW He-Ne Laser
Temperature: 25° C.
Angle at measuring: 90°
Solvent: water
Analytical method: Histgram method pH

A pH of the aqueous composition is measured as it is at 25° C.

Electroconductivity

The aqueous composition is coated on a polyethylene phthalate (PET) film so that the amount of the N-substituted acrylamide copolymer is 2.5 g/m$^2$ by using a bar coater.

After the coating film is dried at room temperature overnight, it is dried at 105° C. for 2 minutes while blowing wind to give a electroconductive PET film.

After the electroconductive PET film is allowed to stand at 20° C. under 50% RH for 48 hours, the electric resistance is measured by using a super isolation meter "SM-10E" commercially available from Toa Denpa Kabushiki Kaisha.

Transparency

The same film as used in the measurement of the electroconductivity is observed with naked eyes.
Estimation
◯: Excellent transparency
X: Poor transparency

Abrasion resistance

A polyethylene plate is coated with the aqueous composition so that the amount of the N-substituted acrylamide copolymer is 2.0 g/m², and it is dried at room temperature overnight. The coated plate is dried at 105° C. for 2 hours while blowing wind, then it is allowed to stand at 20° C. under 65% RH for 48 hours to give a test piece.

Fresh ashes of tobacco are put in a Petri dish (height: 2 cm) on which the test piece which is rubbed with an absorbent cotton is put, and the test piece is observed as to whether the ashes adhere to the piece or not. The numbers of times of rubbing when the ashes first adhere to the piece are shown in Table 4. The more the number of times is, the more excellent the abrasion resistance is.

COMPARATIVE EXAMPLE 3

A 20% aqueous solution of lauryldimethylbenzylammonium chloride was prepared as a known coating-type antistatic agent.

As to the obtained antistatic agent, electroconductivity, transparency and abrasion resistance are examined in the same manner as in Example 8. The results are shown in Table 4.

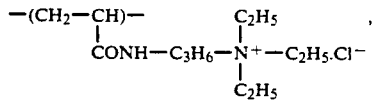

and the mixture was dry-blended to give a resin composition for a film.

Then, a T-die extruder having a cylinder temperature of 180° to 200° C., a nozzle temperature of 200° to 210° C. was charged with the composition, and it was kneaded with melting and extruded through a chill roll to give a non-stretched film having a thickness of 30 μm and a width of 1200 mm.

As to the obtained film, surface resistivity was measured according to the following method. As a result, it was confirmed that the surface resistivity was small such as $3.2 \times 10^{11} \Omega$, which shows that the film was excellent in antistatic property.

The one film was laminated with the other film and the films were allowed to stand in an atmosphere of 80% RH for 7 days. The film was removed from the other and the film surfaces were observed. There was no tackiness due to the bleeding. Also, the print was formed on the obtained film, using a printing ink for

TABLE 4

| Ex. No. | Amount of acrylamide copolymer (g) | Surfactant Kind | Surfactant Amount (g) | Water (g) | Temperature for emulsifying (°C.) | Time for emulsifying (min.) | Viscosity (cP) | Particle size (nm) | pH | Electroconductivity (Ω) | Transparency | Abrasion resistance (number of times) |
|---|---|---|---|---|---|---|---|---|---|---|---|---|
| 8 | 100 | — | — | 400 | 110 | 15 | 85.2 | 93.4 | 4.2 | $6.8 \times 10^8$ | ○ | 440 |
| 9 | 100 | Nonylphenol ethylene oxide additive | 20 | 380 | 115 | 15 | 56.7 | 74.2 | 2.7 | $4.9 \times 10^8$ | ○ | 420 |
| 10 | 100 | 20% aqueous solution of lauryltrimethyl ammonium chloride | 12 | 388 | 120 | 15 | 75.3 | 84.2 | 4.8 | $2.9 \times 10^8$ | ○ | 430 |
| 11 | 100 | Nonylphenol ethylene oxide additive | 20 | 375 | 115 | 10 | 125.0 | 280.5 | 5.1 | $9.2 \times 10^8$ | ○ | 390 |
| 12 | 50 | — | — | 450 | 115 | 20 | 46.2 | 72.1 | 2.8 | $5.1 \times 10^8$ | ○ | 480 |
| 13 | 75 | — | — | 425 | 105 | 15 | 62.1 | 78.0 | 3.0 | $1.9 \times 10^8$ | ○ | 410 |
| 14 | 100 | Nonylphenol ethylene oxide additive | 20 | 380 | 85 | 15 | 52.0 | 68.3 | 5.1 | $4.1 \times 10^8$ | ○ | 320 |
| Com. Ex. 3 | — | — | — | — | — | — | — | — | — | $7.8 \times 10^9$ | ○ | 110 |

It is apparent from the results shown in Table 4 that all of the aqueous compositions obtained in Examples 8 to 14 are excellent in abrasion resistance.

EXAMPLE 15

To 100 parts of a linear low density polyethylene (density: 0.930 g/cm³, melt index: 3.7 g/10 minutes) was added 20 parts of a linear random N-substituted acrylamide copolymer having a weight average molecular weight of 31800, composed of 85% by mole of ethylene units: —(CH₂—CH₂)—, 5% by mole of acrylate units:

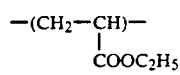

and 10% by mole of acrylamide units:

polypropylene. The print was excellently formed.

When one side of the film was subjected to corona discharge treatment to adjust the wet surface tension to at least 37 dyne/cm, the adhesive properties to various coating agents could be improved.

Further, the film could be sticked to another film, sheet, foam, metallic foil or paper by providing a coating agent layer on its surface. Also, the film was used as various wrapping materials or packing materials by providing a heat sealant layer, or by vapor depositing a metal on one side of the film and further providing a heat sealant layer thereon.

Surface resistivity

A film was cut to give a test piece of 10 cm × 10 cm, and it was allowed to stand in a thermostatic room having a temperature of 20° C. and 60% RH for 24 hours. After aging, the surface resistivity was measured under the above-mentioned atmosphere.

Measuring instrument: VE-40 ultra-insulation meter (commercially available from Kabushiki Kaisha Kawaguchi Denki Seisakujo) with which RC-02 normal temperature measuring box is connected Measuring condition: applied voltage of 100 V In the instant specification, antistatic property means that a substrate has a surface resistivity of at most $1 \times 10^{13} \Omega$ and a half life of charge of at most three minutes.

EXAMPLE 16

To 85 parts of a nylon-6 commercially available under the trademark "CM1021LO" from Toray Industries, Inc. was added 15 parts of a linear ramdon N-substituted acrylamide copolymer having a weight average molecular weight of 35000, composed of 85% by mole of ethylene units: —($CH_2$—$CH_2$)—, 5% by mole of acrylate units:

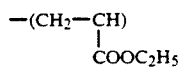

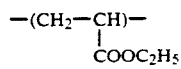

and 10% by mole of acrylamide units:

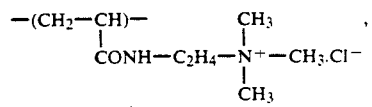

and the mixture was dry-blended to give a resin composition for a film. A non-stretched film was prepared from the composition in the same manner as in Example 15 except that the cylinder temperature was changed to 230° to 250° C. and the nozzle temperature was changed to 250° to 260° C. The thickness of the film was 30 μm.

Then, as to the obtained film, the surface resistivity was measured in the same manner as in Example 15. Also, half life of charge, bleeding out and blocking shear force were measured in the following methods. The results are shown in Table 5.

Half life of charge

In the same atmosphere as that wherein the surface resistivity is measured, the voltage of 10 KV is applied to a sample and damping speed of the charge applied voltage is measured, with a static honest metor commercially available from Kabushiki Kaisha Shishido Shokai. The damping speed is shown in Table 5 as a half life.

Bleeding out

A film is overlapped with another one and they are allowed to stand at 40° C. under 80% RH for 7 days. Then, the film is peeled off from the other, and the film surface is observed with naked eyes. Whether the film surface has a adhered or not is shown in Table 5.

Blocking shear strength

A film is laminated on another in an area of 3 cm (width) × 4 cm (length) on which a weight of 550 g is placed. The films are allowed to stand at 40° C. under 80% RH for 7 days. A shear peel strength of the two films is measured by means of a Schopper tensile tester.

When the film has a shear peel strength of 1000 g or less, the film is sufficient in blocking shear strength. When the film has a shear peel strength of 500 g or less, the film is excellent in blocking shear strength.

EXAMPLE 17

An extruder equipped with a tubular film-forming apparatus was charged with 88 parts of a linear low density polyethylene (density: 0.935 g/cm³, melt index: 8.5 g/10 minutes) and 12 parts of a linear random N-substituted acrylamide copolymer having a weight average molecular weight of 27000, composed of 80% by mole of ethylene units: —($CH_2$—$CH_2$)—, 1% by mole of acrylate units:

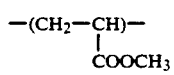

and 19% by mole of acrylamide units:

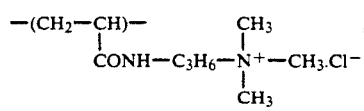

and the mixture was melted with heating and kneaded at 210° to 230° C., and extruded into a non-stretched film through a mandrel nozzle, and at the same time, the non-stretched film was biaxially oriented while cooling by blowing air to give a biaxially stretched film.

The obtained film had a thickness of 20 μm. The physical properties of the obtained film were measured in the same manner as in Example 16. The results are shown in Table 5.

EXAMPLE 18

An extruder equipped with an apparatus for simultaneously and biaxially stretching based upon a tenter method was charged with 98 parts of polypropylene (metl index: 2.5 g/10 minutes) and 2 parts of a linear random N-substituted acrylamide copolymer having a weight average molecular weight of 33000, composed of 88% by mole of ethylene units: —($CH_2$—$CH_2$)—, 3% by mole of acrylate units:

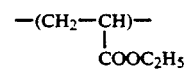

and 9% by mole of acrylamide units:

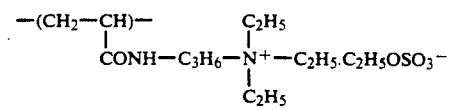

The mixture was melted with heating and kneaded at 210° to 230° C., and extruded into a chill roll kept at 20° C. from a nozzle of the T-die to give a non-stretched film. Subsequently, the film was simultaneously and biaxially stretched in each stretching ration of 5 to 9 and 3 to 4 in the machine direction and the transverse direction, respectively by using a tenter maintained at 150° to 160° C. to give a biaxially stretched film having a thickness of 12 μm.

The properties of the obtained film were measured in the same manner as in Example 16. The results are shown in Table 5.

TABLE 5

| Ex. No. | Surface resistivity (Ω) | Half life of charge (second) | Bleeding out | Blocking shear strength (g) |
|---|---|---|---|---|
| 16 | $6.3 \times 10^8$ | 0.07 | None | 20 |
| 17 | $4.2 \times 10^9$ | 0.10 | None | 12 |
| 18 | $3.8 \times 10^{12}$ | 25 | None | 0 |

COMPARATIVE EXAMPLE 4

There were mixed 99 parts of high pressure processed low density polyethylene (density: 0.923 g/cm³, melt index: 5.6 g/10 minutes) and 1 part of stearic acid monoglyceride as an antistatic agent to give a resin composition for film.

Using the obtained composition, a film was prepared in the same manner as in Example 16. The physical properties of the film were measured in the same manner as in Example 16. The results are shown in Table 6.

COMPARATIVE EXAMPLE 5

There were mixed 99.7 parts of a low pressure processed high density polyethylene (density: 0.955 g/cm³, melt index: 7.3 g/10 minutes) and 0.3 part of a betaine amphoteric surfactant represented by the formula:

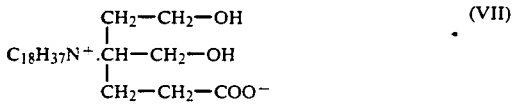

as an antistatic agent to give a resin comosition for film.

Using the obtained composition, a film was prepared and the physical properties of the film were measured in the same manner as in Example 16. The results are shown in Table 6.

COMPARATIVE EXAMPLE 6

There were mixed 98.5 parts of linear low density polyethylene (density: 0.935 g/cm³, melt index: 8.5 g/10 minutes) and 0.5 part of a mixture of stearic acid monoglyceride which was the same as used in Comparative Example 4 and the betaine amphoteric surfactant having the formula (VII) used in Comparative Example 5 as an antistatic agent in a weight ratio of 15:85 to give a resin composition for film.

Using the obtained composition, a film was prepared in the same manner as in Example 17.

The physical properties of the film were measured in the same manner as in Example 16. The results are shown in Table 6.

COMPARATIVE EXAMPLE 7

There were mixed 98.5 parts of an ethylenepropylene copolmer having an ethylene content of 3% (melt index: 4.3 g/10 minutes) and 1.5 parts of a mixture of sodium dodecylbenzene sulfonate and polyethylene glycol in a weight ration of 30:70 to give a resin composition for film.

Using the obtained composition, a biaxially stretched film was prepared in the same manner as in Example 18. The physical properties of the film were measured in the same manner as in Example 16. The results are shown in Table 6.

COMPARATIVE EXAMPLE 8

There were mixed 99.5 parts of polypropylene (melt index: 2.5 g/10 minutes) and 0.5 part of stearyl diethanolamine as an antistatic agent to give a resin composition for film.

Using the obtained composition, a film was prepared in the same manner as in Example 18. The physical properties of the film were measured in the same manner as in Example 16. The results are shown in Table 6.

TABLE 6

| Com. Ex. No. | Film thickness (μm) | Surface resistivity (Ω) | Half life of charge (second) | Bleeding out | Blocking shear strength (g) |
|---|---|---|---|---|---|
| 4 | 40 | $2.3 \times 10^{15}$ | ∞ | Generated | 690 |
| 5 | 15 | $4.2 \times 10^{12}$ | 39 | Generated | 980 |
| 6 | 20 | $4.2 \times 10^{11}$ | 15 | Generated | 760 |
| 7 | 25 | $5.1 \times 10^{13}$ | 120 | Generated | 600 |
| 8 | 22 | $3.8 \times 10^{14}$ | 3600 | Generated | 1080 |

From the results shown in Table 5, it would be recognized that all of the olefinic resin films of the present invention are low in surface resistivity such as less than $1 \times 10^{13} \Omega$, the surface resistivity being an index concerning the antistatic property and have a half life of charge of less than 180 seconds, and also, all of the antistatic components are not bled out from the films. Accordingly, it would be confirmed that the film of the present invention is excellent in antistatic property and has no blocking.

On the other hand, in the films obtained in Comparative Examples 4 to 8, surfactants having a relatively low molecular weight used as an antistatic agent. As shown in Table 6, even though such a film is satisfactory in antistatic property, blocking is generated on the film surface, because the antistatic agent bleeds out.

From the above, it would be recognized that the thermoplastic resin film of the present invention is excellent in antistatic property, and moreover the antistatic agent does not bleed out from the film, thus the blocking does not occur. Accordingly, the film of the present invention is suitable for use in a field wherein harms occuring due to static electricity should be prevented.

EXAMPLE 19

To 100 parts of polyethylene-polypropylene copolymer having an ethylene content of 2.3% by weight (melt index: 4.3 g/10 minutes) was added 20 parts of a linear random N-substituted acrylamide copolymer having a weight average molecular weight of 31300, composed of 85% by mole of ethylene units: —(CH₂—CH₂)—, 5% by mole of acrylate units:

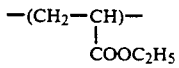

and 10% by mole of acrylamide units:

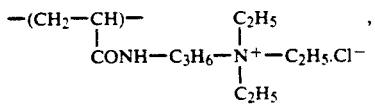

and the mixture was dry-blended to give a resin composition.

Then, the composition was introduced into a T-die extruder having a cylinder temperature of 220° to 250° C. and a nozzle temperature of 240° to 250° C., the composition was kneaded with melting, and extruded through a chill roll having a temperature of 20° C. to give a non-stretched film having a thickness of 900 μm and a width of 660 mm.

The film was heated to 135° C. and was stretched in a stretching ratio of 5 times in machine direction, then it was stretched in a stretching ratio of 9 times in transverse direction at 170° C. The film was relaxed at 140° C., and wound up. The obtained film had a thickness of 20 μm.

The film was introduced into a vacuum deposition machine having a built-in roller, a vapor depositing apparatus, a cooling appratus and a winder. A crucible of the vapor depositing appratus was charged with aluminum in a predetermined amount, then the deposition machine was sealed, and the inside of the depositing apparatus was evacuated by using a vacuum pump to adjust the inner pressure to $10^{-5}$ to $10^{-4}$ Torr.

Aluminum was vapor deposited over the film running at a predetermined speed, the temperature of the crucible being kept at 700° to 800° C., and cooled, then the film over which aluminum was vapor deposited was wound up. The film had an aluminum thickness of 25 nm.

Then, a coating agent layer was provided on the side other than the aluminum deposition layer, on which a skin agent, a film, a sheet, a foam, a metal foil, a paper, a non-woven fabric comprising a natural or a synthetic film or an artificial leather was laminated to give a laminate. The obtained laminate could be formed into a product having a desired shape in various manners.

EXAMPLE 20

The same composition as used in Example 16 was introduced into a T-die extruder having a cylinder temperature of 230° to 250° C. and a nozzle temperature of 250° to 260° C., and it was kneaded with melting and extruded, then was passed through a chill roll to give a non-stretched film having a thickness of 24 μm.

Then, aluminum was vapor deposited over the film in the same manner as in Example 19 to give a film on which an aluminum layer having a thickness of 30 nm was provided.

The physical properties of the obtained olefinic resin film were measured in the following methods. The results are shown in Table 7.

Surface resistance

A film is cut to give a test specimen (10 cm × 10 cm), and the test specimen is allowed to stand in a thermostatic room having a temperature of 20° C. and a relative humidity of 60% RH for 48 hours. Then, the surface resistance of the film is measured in the same atmosphere as the above.

Measuring device: Degital multimeter (commercially available from Takeda Riken Kabushiki Kaisha) Type TR-6843

Figure 9:
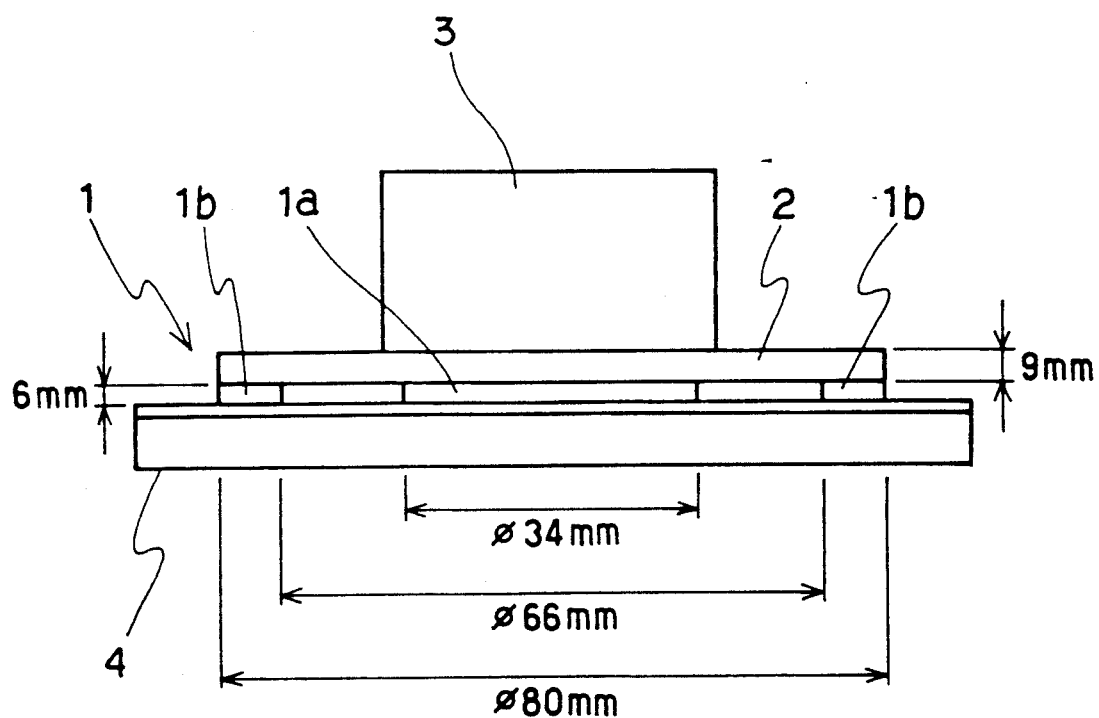
FIG. 9 is a schematic drawing explaining an apparatus for measuring the surface resistance of a film having a vapor deposition layer used in Examples 19 to 22 and Comparative Examples 9 to 13.

As shown in FIG. 9, as an insulation layer 2 is provided in a thickness of 9 mm on an electrode 1 having a circular electrode 1a with a diameter of 34 mm and a thickness of 6 mm, and having a ring electrode 1b with an outside diameter of 80 mm and an inside diameter of 66 mm, on which a weight of 1 kg is put. An electric resistance ($\Omega/\square$) of the vapor deposition layer of the film 4 is measured when voltage of 500 V is applied between the circular electrodes (1a) and (1b).

Blocking shear strength

A film is laminated on another in an area of 3 cm (width) × 4 cm (length), on which a weight of 500 g is placed. The films are allowed to stand at 40° C. under 80% RH for 24 hours. A shear peel strength of the two films is measured by using a schopper tensile tester.

When the film has a shear peel strength of 1000 g or less and the deposition layer is not removed, the film is sufficient in blocking shear force. When the film has a shear peel strength of 500 g or less, the film is excellent in blocking shear strength.

Strength of vapor deposition

The film is introduced into a vacuum deposition machine having a built-in roller, a vapor depositing apparatus, a cooling apparatus and a winder. A crucible of the vapor depositing apparatus is charged with aluminum in a predetermined amount, then the deposition machine is sealed, and the inside of the depositing apparatus is evacuated by using a vacuum pump to adjust the inner pressure to $10^{-5}$ to $10^{-4}$ Torr. Aluminum is vapor deposited over the film running at a predetermined speed, the temperature of the crucible being kept at 700° to 800° C. while cooling, then the film over which aluminum is vapor deposited is wound up. The film has an aluminum thickness of 25 nm.

A pressure sensitive cellophane adhesive tape commercially available from Nichiban Kabushiki Kaisha, width: 24 mm) is adhered to the vapor deposition layer of the film and the tape is 180° -peeled off from the film at a speed of 50 mm/minute. After that, the metal-adhered area of the film is observed and the deposition strength is evaluated in accordance with the following estimation.

| (Estimation) | |
|---|---|
| [Metal adhered area of film] | [Vapor deposition index] |
| 100% | 5 |
| At least 90% to less than 100% | 4 |
| At least 70% to less than 90% | 3 |
| At least 50% to less than 70% | 2 |
| Less than 50% | 1 |

When the vapor deposition index is at least 4, the film is satisfactory in strength of vapor deposition.

Oxygen permeability, cc(NPT)/24 hr.m²/0.1 mm/atm

Oxygen permeability is measured according to General Food Method. Measuring conditions are as follows.
Measuring temperature: 25° C.
Gas: 99.99% dried oxygen The oxygen permeability of the film having no vapor deposition layer and the oxygen permeability of the film having a vapor deposition layer are shown in Table 7.

When the film having a vapor deposition layer has an oxygen permeability of at most half of that of the film having no deposition layer, the film is satisfactory in oxygen permeability.

EXAMPLE 21

The same mixture of the linear low density polyethylene and the N-substituted acrylamide copolymer as used in Example 17 was dry-blended, and introduced into a T-die extruder having a cylinder temperature of 220° to 230° C. and a nozzle temperature of 250° C., and it was kneaded with melting and extruded, then was passed through a chill roll to give a non-stretched film having a thickness of 150 μm. Then, the film was heated up to 135° C., and stretched in a stretching ratio of 5 times in machine direction to give an uniaxially stretched film. The obtained film had a thickness of 25 μm.

Aluminum was vapor deposited over the film in the same manner as in Example 19 to give a film having a aluminum deposition layer of a thickness of 30 nm.

As to the obtained film having the vapor deposition layer, the physical properties were measured in the same manner as in Example 20. The results are shown in Table 7.

EXAMPLE 22

The same mixture of the polypropylene and the N-substituted acrylamide copolymer as used in Example 18 was dry-blended, and it was introduced into a T-die extruder having a cylinder temperature of 230° to 250° C. and a nozzle temperature of 250° C., kneaded with melting, extruded and passed through a chill roll having a temperature of 20° C. to give a non-stretched film having a thickness of 450 μm.

The film was heated up to 155° C., then was stretched in a stretching ratio of 6 times in each of machine direction and transverse direction by using a biaxially stretching machine according to the tenter method to give a simultaneously biaxially stretched film having a thickness of 12.5 μm.

Using tin instead of aluminum, the film was vapor deposited in the same manner as in Example 19 to give a film over which tin was deposited in a thickness of 28 nm.

As to the obtained film having the tin deposition layer, the physical properties were measured in the same manner as in Example 20. The results are shown in Table 7.

having a thickness of 32 μm was prepared in the same manner as in Example 20.

Aluminum was deposited over the obtained film in the same manner as in Example 19 to give a film over which aluminum was deposited in a thickness of 25 nm.

As to the obtained film over which aluminum was deposited, the physical properties were measured in the same manner as in Example 20. The results are shown in Table 8.

COMPARATIVE EXAMPLE 10

There were mixed 80 parts of low pressure processed high density polyethylene (density: 0.955 g/cm$^3$, melt index: 7.3 g/10 minutes) and 20 parts of a betaine amphoteric surfactant having the formula (VII) as an antistatic agent to give a resin composition. Using the obtained composition, a film having a thickness of 28 μm was prepared in the same manner as in Example 21.

Aluminum was vapor deposited over the film in the same manner as in Example 19 to give a film over which aluminum was deposited in a thickness of 20 nm.

As to the film over which aluminum was deposited, the physical properties were measured in the same manner as in Example 20. The results are shown in Table 8.

COMPARATIVE EXAMPLE 11

There were mixed 88 parts of linear low density polyethylene (density: 0.935 g/cm$^3$, melt index: 8.5 g/10 minutes) and 12 parts of a mixture of stearic acid monoglyceride and a betaine amphoteric surfactant in a weight ratio of 15:85 to give a resin composition. Using the composition, a film having a thickness of 18 μm was prepared in the same manner as in Example 22.

Using tin instead of aluminum, the film was vapor deposited in the same manner as in Example 21 to give a film over which tin was deposited in a thickness of 30 nm.

As to the film, the physical properties were measured in the same manner as in Example 20. The results are shown in Table 8.

COMPARATIVE EXAMPLE 12

There were mixed 93 parts of ethylene-propylene copolymer of an ethylene content of 3% by weight (melt index: 4.3 g/10 minutes) and 7 parts of a mixture of sodium dodecylbenzene sulfonate and polyethylene glycol in a weight ratio of 30:70 as an antistatic agent to give a resin composition. Using the composition, a biaxially stretched film having a thickness of 18 μm was

TABLE 7

| | | Blocking shear strength | | Strength of | | |
| | Surface | Shear peeling | Removal of vapor | vapor deposition (Vapor | Oxygen permeability (cc(NPT)/24 hr · m$^2$/0.1 mm/atm) | |
| Ex. No. | resistance (Ω/□) | strength (g) | deposition layer | deposition index) | After vapor deposition | Before vapor deposition |
| --- | --- | --- | --- | --- | --- | --- |
| 20 | 5.9 | 155 | None | 5 | 15 | 152 |
| 21 | 4.2 | 100 | None | 4 | 400 | 1345 |
| 22 | 3.8 | 5 | None | 4 | 12 | 385 |

COMPARATIVE EXAMPLE 9

There were mixed 85 parts of high pressure processed low density polyethylene (density: 0.923 g/cm$^3$, melt index: 5.6 g/10 minutes) and 15 parts of stearic acid monoglyceride as an antistatic agent to give a resin composition. Using the obtained composition, a film prepared in the same manner as in Example 19.

Using gold instead of aluminum, the film was deposited in the same manner as in Example 19 to give a film over which gold was deposited in a thickness of 18 nm.

As to the obtained film, the physical properties were measured in the same manner as in Example 20. The results are shown in Table 8.

COMPARATIVE EXAMPLE 13

There were mixed 98 parts of polypropylene (melt index: 2.5 g/10 minutes) and 2 parts of stearyl diethanol amine as an antistatic agent to give a resin composition. Using the composition, a film was prepared in the same manner as in Example 22.

Aluminum was vapor deposited over the film in the same manner as in Example 19 to give a film over which aluminum was deposited in a thickness of 23 nm.

As to the obtained film, the physical properties were measured in the same manner as in Example 20. The results are shown in Table 8.

TABLE 8

| Comp. Ex. No. | Surface resistance ($\Omega/\square$) | Blocking shear strength | | Strength of vapor deposition (Vapor deposition index) | Oxygen permeability (cc(NPT)/24 hr · m²/0.1 mm/atm) | |
|---|---|---|---|---|---|---|
| | | Shear peeling strength (g) | Removal of vapor deposition layer | | After vapor deposition | Before vapor deposition |
| 9  | 5.3 | 760  | Generated | 2 | 1900 | 1975 |
| 10 | 8.2 | 880  | Generated | 1 | 690  | 698  |
| 11 | 4.2 | 960  | Generated | 1 | 1200 | 1345 |
| 12 | 1.8 | 580  | None      | 3 | 390  | 413  |
| 13 | 3.8 | 1020 | Generated | 2 | 340  | 385  |

From the results shown in Table 7, it would be recognized that the thermoplastic resin film used in the present invention is excellent in metal vapor depositing property, so the metal deposition layer is strongly adhered to the thermoplastic resin film and the metal is not removed from the resin layer and there are no cracks on the deposited layer.

On the other hand, the films having a vapor deposition layer obtained in Comparative Examples 9 to 13 are prepared by using a surfactant having a relatively low molecular weight as an antistatic agent. As apparent from Table 8, it would be recognized that when using such a film, even though the film is vapor deposited, the vapor deposition layer is not satisfactorily adhered to the resin layer. Accordingly, the deposition layer is easily removed even by rubbing a little, and the film has a large oxygen permeability since the deposition layer has some cracks.

As mentioned above, the thermoplastic resin film having a vapor deposition layer of the present invention is not only excellent in metal depositing property and adhesion property of the deposition layer to the resin layer but also in low oxygen permeability since the vapor deposition layer is strongly adhered to the resin layer. Accordingly, the film of the invention can be preferably and widely used in various fields, for instance, wrapping materials, and the like.

EXAMPLE 23

To 100 parts of linear low density polyethylene (density: 0.930 g/cm³, melt index: 3.7 g/10 minutes) was added 20 parts of the same N-substituted acrylamide copolymer as used in Example 19 and the mixture was dry-blended to give a resin composition for resin layer.

The resin composition for resin layer was introduced into a sub-extruder, and linear low density polyethylene (density: 0.930 g/cm³, melt index: 3.7 g/10 minutes) was introduced into a main-extruder, then they were introduced into a co-extruder for forming a film provided with direct laminating process, co-extruded and passed through a chill roll having a temperature of 20° C. to give a non-stretched film having a thickness of 100 μm and a width of 1200 mm. The obtained non-stretched film had a resin layer of the mixture of the N-substituted acrylamide copolymer and the polyethylene having a thickness of 20 μm and a resin film layer of the polyethylene having a thickness of 80 μm. During extrusion, all of the temperatures of the extruder, the direct laminating process and the nozzle were from 180° to 220° C.

As to the obtained film, the surface resistivity was measured in the same manner as in Example 15.

As a result, the film had a small surface resistivity of $3.2 \times 10^{11} \Omega$, which shows that the film was excellent in antistatic property.

The film surface of the obtained laminated film was observed in the same manner as in Example 15. The film was not sticky due to bleeding. Also, when the surface of the film was printed by using a printing ink for polypropylene, defect of printing was not observed due to bleeding.

Then, one side of the laminated film was subjected to corona discharge treatment to adjust a wet surface tension of at least 37 dyne/cm. The thus obtained film could be improved in adhesion property to various coating agents.

Further, another film or sheet could be provided on the film through a coating agent layer, or a heat sealant layer could be provided on the film. The thus obtained films could be used as packing materials and packaging materials. Furthermore, a metal could be vapor deposited over at least one side of the laminated film of the present invention, on which a heat sealant layer was provided, thus obtained film could be used as various packing materials and packaging materials.

EXAMPLE 24

As a resin for resin film, polypropylene (melt index: 2.8 g/10 minutes) was used.

Also, a linear random N-substituted acrylamide copolymer having a polymerization degree of 560, composed of 85% by mole of ethylene units: —(CH₂—CH₂)—, 5% by mole of acrylate units:

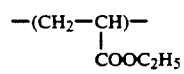

and 10% by mole of acrylamide units:

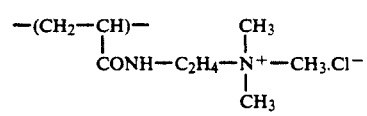

was used as a resin for layer.

Using the resin for resin film and the resin for resin layer, a laminate film was prepared in the same manner as in Example 15.

The laminated film had a thickness of 40 μm, a width of 1200 nm and a thickness of a resin layer of 5 μm.

As to the obtained laminated film, surface resistivity was measured in the same manner as in Example 15, and half life of charge and blocking shear strength were measured in the same manner as in Example 16 and bleeding out and printability were measured in accordance with the following methods. The results are shown in Table 9.

Bleeding out

The surface of the laminated film is covered with a biaxially stretched polypropylene film and it is allowed to stand at 40° C. under 80% RH for 7 days. The film is peeled from the laminated film and the film is observed. Whether or not there are adhered materials on the film is shown in Table 9.

Printability

The laminated film is coated with a printing ink for polypropylene PPST (commercially available from Toyo Ink Seizo Kabushiki Kaisha) by using a #50 bar coater, and it is dried in a hot air drier at 80° C. A pressure sensitive cellophane adhesive tape (commercially available from Nichiban Kabushiki Kaisha, width: 24 mm) having a length of 20 cm is adhered to the printed part of the film in length of 15 cm, and it is strongly rubbed several times to stick the tape to the printed part of the film tightly. The cellophane tape was rapidly peeled off from the film, and the amount of the ink remaining on the film was observed.

| (Estimation) | |
|---|---|
| Less than 50% | One point |
| At least 50% to less than 75% | 2 points |
| At least 75% to less than 90% | 3 points |
| At least 90% to less than 100% | 4 points |
| 100% | 5 points |

The film having 4 or more points is satisfactory in printability.

EXAMPLE 25

A polyethylene terephthalate (instrinsic viscosity 0.598) was used as a resin for resin film.

A mixture of 15 parts of a linear random N-substituted acrylamide copolymer having a weight average molecular weight of 27000, composed of 80% by mole of ethylene units: —(CH$_2$—CH$_2$)—, 1% by mole of acrylate units:

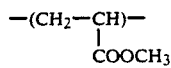

and 19% by mole of acrylamide units:

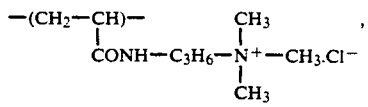

70 parts of polyethylene terephthalate (instrinsic viscosity 0.58) and 15 parts of thermoplastic elastomer (Hytlel commercially available from Du pont-Toray Co., Ltd.) used as a resin for resin layer.

Using the obtained resin for resin film and the resin for resin layer, a laminated film was prepared in the same manner as in Example 23 except that the cylinder temperature was changed to 240° to 280° C. and the nozzle temperature was changed to 260° to 280° C. The obtained laminated film had a thickness of 27 μm, a width of 1200 mm and a thickness of the resin layer of 2 μm.

The physical properties of the obtained laminated film were measured in the same manner as in Example 24. The results are shown in Table 9.

EXAMPLE 26

An ethylene-propylene copolymer (ethylene content: 8% by weight, melt index: 2.3 g/10 minutes) was used as a resin for resin film.

A mixture of 60 parts of a linear random N-substituted acrylamide copolymer having a weight average molecular weight of 33000, composed of 88% by mole of ethylene units: —(CH$_2$—CH$_2$)—, 3% by mole of acrylate units:

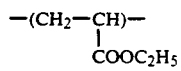

and 9% by mole of acrylamide units:

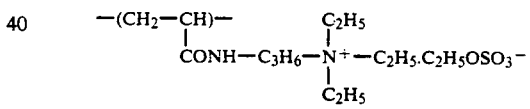

and 40 parts of polypropylene (melt index: 2.5 g/10 minutes) was used as a resin for resin layer.

Using the resin for resin film and the resin for resin layer, a laminated film was prepared in the same manner as in Example 24. The obtained laminated film had a thickness of 14 μm, a width of 1200 mm and a thickness of the resin layer of 2 μm.

The physical properties of the obtained laminated film were measured in the same manner as in Example 24. The results are shown in Table 9.

TABLE 9

| Ex. No. | Surface resistivity (Ω) | Half life of charge (second) | Bleeding out | Blocking shear strength (g) | Printability (points) |
|---|---|---|---|---|---|
| 24 | 2.3 × 10$^8$ | 0.06 | None | 40 | 5 |
| 25 | 5.1 × 10$^9$ | 0.55 | None | 0 | 5 |
| 26 | 3.8 × 10$^{12}$ | 25 | None | 30 | 5 |

COMPARATIVE EXAMPLE 14

Polypropylene (melt index: 2.8 g/10 minutes) was used as a resin for resin film.

A mixture of 99 parts of an ethylene-propylene copolymer (ethylene content: 8% by weight, melt index:

2.3 g/10 minutes) and one part of stearic acid monoglyceride as an antistatic agent was used as a resin for resin layer.

Using the resin for resin film and the resin for resin layer, a laminated film was prepared in the same manner as in Example 24.

The physical properties of the obtained laminated film was measured in the same manner as Example 24. The results are shown in Table 10.

COMPARATIVE EXAMPLE 15

A mixture of 99.2 parts of low density polyethylene (density: 0.921 g/cm$^3$, melt index: 3.2 g/10 minutes) and 0.8 part of a betaine amphoteric surfactant having the above-mentioned formula (VII) as an antistatic agent was used as a resin for resin layer.

The same low density polyethylene as the above was used as a resin for resin film.

Using the resin for resin layer and the resin for resin film, a laminated film was prepared in the same manner as in Example 24.

The physical properties of the obtained laminated film were measured in the same manner as in Example 24. The results are shown in Table 10.

COMPARATIVE EXAMPLE 16

A mixture of 98.5 parts of low density polyethylene (density: 0.921 g/cm$^3$, melt index: 3.2 g/10 minutes) and 1.5 parts of a mixture of stearic acid monoglyceride and a betaine amphoteric surfactant having the above-mentioned formula (VII) as an antistatic agent in a weight ratio of 3:7 was used as a resin for resin layer.

A mixture of linear low density polyethylene (density: 0.930 g/cm$^3$, melt index: 5.2 g/10 minutes) and low density polyethylene (density: 0.920 g/cm$^3$, melt index: 2.1 g/10 minutes) was used as a resin for resin film.

Using the resin for resin layer and the resin for resin film, a laminated film was prepared in the same manner as in Example 25.

The physical properties of the obtained laminated film were measured in the same manner as in Example 24. The results are shown in Table 10.

COMPARATIVE EXAMPLE 17

A mixture of 95 parts of an ethylene-propylene copolymer containing an ethylene content of 5% by weight (melt index: 1.2 g/10 minutes) and 5 parts of a mixture of sodium dodecyl benzene sulfonate and polyethylene glycol in a weight ratio of 15:85 was used as a resin for resin layer.

The same ethylene-propylene copolymer as used in Comparative Example 14 was used as a resin for resin film.

Using the resin for resin film and the resin for resin layer, a laminated film was prepared in the same manner in Example 24.

The physical properties of the obtained laminated film were measured in the same manner as in Example 24.

The results are shown in Table 10.

COMPARATIVE EXAMPLE 18

A mixture of 99.5 parts of polypropylene (melt index: 2.5 g/10 minutes) and 0.5 part of a mixture of 20 parts of stearyl diethanol amine and 80 parts of a betaine amphoteric surfactant having the formula (VII) was used as a resin for resin layer.

The same ethylene-propylene copolymer as in Comparative Example 17 was used as a resin for resin film.

Using the resin for resin film and the resin for resin layer, a laminated film was prepared in the same manner as in Example 24.

The physical properties of the obtained laminated film were measured in the same manner as in Example 24. The results are shown in Table 10.

TABLE 10

| Com. Ex. No. | Thickness of laminated film ($\mu$m) | Thickness of resin layer ($\mu$m) | Surface resistivity ($\Omega$) | Half life of charge (second) | Bleeding out | Blocking shear strength (g) | Printability (points) |
|---|---|---|---|---|---|---|---|
| 14 | 40 | 5 | $2.3 \times 10^{13}$ | 230 | Generated | 715 | 2 |
| 15 | 40 | 5 | $4.2 \times 10^{11}$ | 45 | Generated | 880 | 1 |
| 16 | 27 | 2 | $4.2 \times 10^{12}$ | 105 | Generated | 630 | 2 |
| 17 | 20 | 2 | $5.1 \times 10^{14}$ | 6000< | Generated | 600 | 3 |
| 18 | 14 | 2 | $3.8 \times 10^{11}$ | 15 | Generated | 1230 | 2 |

From the results shown in Table 9, it would be recognized that the laminated film of the present invention is excellent in antistatic property, that is, antistatic components do not bleed out from the resin layer of the laminated film, thus there is no blocking as well as the film is excellent in antistatic property, e.g., it has the surface resistivity of at most $1 \times 10^{13}$ $\Omega$ and the half life of charge of at most 180 seconds.

On the other hand, the laminated films obtained in Comparative Examples 14 to 18 are prepared by using conventional relatively low molecular weight surfactants as an antistatic agent. From the results shown in Table 10, it would be recognized that when the film has satisfactory antistatic property, the antistatic agent bleeds out from the resin layer, so the blocking occurs on the film.

EXAMPLE 27

The same N-substituted acrylamide copolymer as in Example 23 was added to deionized water having a temperature of 60° C., and the mixture was stirred at a high speed using a homogenizer to give an emulsion wherein the copolymer was dispersed in water, and it was cooled to room temperature. The emulsion had 24% by weight of the copolymer.

Separately, polypropylene was kneaded with melting in a T-die extruder, and extruded through a chill roll having a temperature of 20° C. to give a non-stretched propylene film having a thickness of 900 $\mu$m. The non-stretched film was stretched in a stretching ratio of 5 times in machine direction at 130° C. The stretched film was coated with the emulsion obtained above so as to give a thickness of resin layer of 18 $\mu$m in accordance with a roll coating method. Thus obtained film was stretched in a stretching ratio of 9 times in transverse direction in a tenter having a temperature of 160° C., relaxed and wound up. The film had a thickness of 20 $\mu$m and a thickness of the resin layer of 2 $\mu$m.

The surface resistivity of the obtained laminated film was measured in the same manner as in Example 24. The film had a small surface resistivity such as $3.2 \times 10^8$ Ω, so it was excellent in antistatic property.

The coating layer side of the obtained laminated film was covered with the coating layer side of the other laminated film, and they were allowed to stand at 40° C. under 80% RH for 7 days. The film was peeled off from the other, and the surface of the laminated film was observed. The film surface was not stick due to bleeding and the blocking was occured on the film.

The printing was formed on the resin layer side of the laminated film by using a printing ink for polypropylene and a printing ink for cellophane, respectively. With respect to the both inks, the film was excellently printed and the inks did not bleed out.

Then, aluminum was vapor deposited on the resin layer of the laminated film so as to get a deposition layer of about 28 nm in thickness. The deposition film adhered extremely tightly to the resin layer, and there did not occur whitening, peeling off or removal of the aluminum deposition layer due to bleeding.

Also, at least one side of the obtained laminated film was subjected to corona discharge treatment to adjust a wet surface tension of at least 37 dyne/cm. Thus obtained film could be improved in adhesion property to various coating agents.

Also, the another film or sheet was laminated on the laminated film through a coating agent layer or a heat sealant layer, and provided on the laminated film. The thus obtained film could be used as various packing materials and packaging materials.

EXAMPLE 28

Polypropylene (melt index: 2.8 g/10 minutes) was used as a resin for resin film.

The same N-substituted acrylamide copolymer as in Example 24 was mixed with an emulsion of an ethylene-vinyl acetate copolymer (vinyl acetate content: 45% by weight) having a resin content of 35% by weight in a mixing ratio of weight of 10:90.

Using the resin for resin film, a film was formed in the same manner as in Example 27, and the film was coated with the emulsion obtained above to give a laminated film having a thickness of 20.3 μm, and a thickness of the resin layer of 0.3 μm.

As to the obtained laminated film, the surface resistivity was measured in the same manner as in Example 23, half life of charge, bleeding out, blocking shear strength and printability were measured in the same manner as in Example 24, and strength of vapor deposition was measured in the same manner as in Example 20. The results are shown in Table 11.

EXAMPLE 29

A mixture of linear low density polyethylene (density: 0.930 g/cm³, melt index: 5.2 g/10 minutes) and low density polyethylene (density: 0.920 g/cm³, melt index: 2.1 g/10 minutes) in a weight ratio of 30:70 was used as a resin for resin film.

The same N-substrated acrylamide copolymer as in Example 25 was mixed with a toluene solution of ethylene-acrylic acid copolymer (acrylic acid content: 25% by weight) having a resin content of 30% by weight in a weight ratio of 20:80.

Using the resin for resin film, a film was prepared in the same manner as in Example 27, and the film was coated with the toluene solution to give a laminated film having a thickness of 62 μm and a thickness of the resin layer of 2 μm.

The physical properties of the obtained laminated film were measured in the same manner as in Example 28. The results are shown in Table 11.

EXAMPLE 30

The same ethylene-propylene copolymer as in Example 26 was used as a resin for resin film.

The same N-substituted acrylamide copolymer as in Example 26 was pulverized to give the particles having a particle size of 32-mesh pass. The N-substituted acrylamide copolymer powder was mixed with an ethylene-acrylic acid copolymer emulsion (resin content: 15% by weight) in a weight ratio of 30:70.

Using the resin for resin film, a film was formed in the same manner as in Example 27, and the film was coated with the emulsion to give a laminated film having a thickness of 27 μm and a thickness of the resin layer of 2 μm.

The physical properties of the obtained laminated film were measured in the same manner as in Example 28. The results are shown in Table 11.

TABLE 11

| Ex. No. | Surface resistivity (Ω) | Half life of charge (second) | Bleeding out | Blocking shear strength (g) | Printability (points) | Strength of vapor depositing (points) |
|---|---|---|---|---|---|---|
| 28 | $2.3 \times 10^8$ | 0.06 | None | 40 | 5 | 4 |
| 29 | $4.2 \times 10^9$ | 0.10 | None | 50 | 5 | 5 |
| 30 | $3.8 \times 10^{12}$ | 25 | None | 30 | 5 | 5 |

COMPARATIVE EXAMPLE 19

Using polypropylene (melt index 2.8 g/10 minutes), a resin film was prepared in the same manner as in Example 28. The obtained film had a thickness of 20 μm.

There were mixed ethylene-vinyl acetate copolymer (vinyl acetate content: 45% by weight) and chlorinated polyethylene (degree of chlorination: 34% by weight) in a weight ratio of 70:30, and the mixture was diluted with toluene to give a toluene solution having a resin content of 25%.

The film was coated with the toluene solution in the same manner as in Example 28 to give a laminated film having a thickness of 22.5 μm and a thickness of the resin layer of 2.5 μm.

The physical properties of the obtained laminated film were measured in the same manner as in Example 28. The results are shown in Table 12.

COMPARATIVE EXAMPLE 20

Using low density polyethylene (density: 0.921 g/cm³, melt index: 3.2 g/10 minutes), a resin film was prepared in the same manner as in Example 28. The obtained film had a thickness of 40 μm.

Using the same emulsion of ethylene-vinyl acetate copolymer as used in Example 28, a laminated film was prepared in the same manner as in Example 28. The obtained laminated film had a thickness of the resin layer of 4 μm.

The physical properties of the obtained laminated film were measured in the same manner as in Example 28. The results are shown in Table 11.

COMPARATIVE EXAMPLE 21

Using the same mixture of the linear low density polyethylene and the low density polyethylene as used in Example 29, a resin film was prepared in the same manner as in Example 29. The obtained resin film had a thickness of 60 μm.

The resin film was coated with an emulsion (resin content: 20% by weight) wherein an ethylene-acrylic acid copolymer (acrylic acid content: 25% by weight) was neutralized with sodium hydroxide in the same manner as in Example 29 to give a laminated film having a thickness of the resin layer of 5.2 μm.

The physical properties of the obtained laminated film were measured in the same manner as Example 28. The results are shown in Table 12.

COMPARATIVE EXAMPLE 22

Using the same ethylene-propylene copolymer as in Example 30, a resin film was prepared in the same manner as in Example 30. The obtained film had a thickness of 30 μm.

The film was coated with a toluene solution of ethylene-acrylic acid copolymer (acrylic acid content: 25% by weight having a resin content of 18%) in the same manner as in Example 29 to give a laminated film having a thickness of the resin layer of 5.2 μm.

The physical properties of the obtained laminated film were measured in the same manner as in Example 28. The results are shown in Table 12.

COMPARATIVE EXAMPLE 23

Using the same ethylene-propylene copolymer as in Example 30, a resin film was prepared in the same manner as in Example 30. The obtained film had a thickness of 25 μm.

The film was coated with an emulsion having a resin content of 20% by weight wherein ethylene-acrylic acid copolymer (acrylic acid content: 25% by weight) was mixed with sodium dodecylbenzene sulfonate in a weight ratio of 90:10 in the same manner as in Example 30 to give a laminated film having a thickness of 3 μm.

The physical properties of the obtained laminated film were measured in the same manner as in Example 28. The results are shown in Table 12.

added surfactant as an antistatic agent, they are poor in adhesion property and strength of vapor deposition.

As mentioned above, it would be recognized that the thermoplastic laminated film of the present invention is excellent in antistatic property and an antistatic agent does not bleed out, thus blocking does not occur. Accordingly, the laminated film of the present invention is suitable for use in a field wherein harms resulting from static electricity should be prevented or in a field wherein printing or vapor deposition are necessitated, for instance, wrapping materials and packaging materials.

EXAMPLE 31

A mixture of 10 parts of an azodicarbon amide as a blowing agent and 100 parts of high pressure low density polyethylene (density: 0.921 g/cm$^3$, melt index: 3.7 g/10 minutes, particle size: 32 mesh pass) was used as an expandable resin composition.

There was used as a resin for resin layer a linear random N-substituted acrylamide copolymer having a weight average molecular weight of 21000, composed of 85% by mole of ethylene units: —(CH$_2$—CH$_2$)—, 5% by mole of acrylate units:

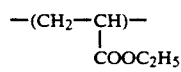

and 10% by mole of acrylamide units:

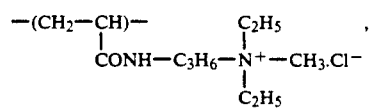

which was pulverized to have a particle size of 32 mesh pass.

The expandable resin composition and the resin for resin layer were introduced into two extruders, respectively, then were introduced into a laminating apparatus equipped with a coextrusion apparatus in which two polymer streams join in a die and extruded into a molten composite continuous sheet wherein the resin layer having a thickness of 500 μm was provided on the expandable resin layer having a thickness of 1.5 mm, which has a width of 500 mm.

The obtained sheet was irradiated with electron beam

TABLE 12

| Com. Ex. No. | Surface resistivity (Ω) | Half life of charge (second) | Bleeding out | Blocking shear strength gg | Printability (points) | Strength of vapor deposition (point) |
| --- | --- | --- | --- | --- | --- | --- |
| 19 | 2.3 × 10$^{16}$ | ∞ | None | 1030 | 1 | 1 |
| 20 | 4.2 × 10$^{16}$ | ∞ | None | 990 | 2 | 1 |
| 21 | 4.2 × 10$^{15}$ | ∞ | None | 520 | 3 | 2 |
| 22 | 5.1 × 10$^{17}$ | ∞ | None | 610 | 2 | 1 |
| 23 | 3.8 × 10$^{14}$ | 2450 | None | 890 | 1 | 1 |

From the results shown in Table 11, it would be recognized that the laminated film of the present invention is excellent in antistatic property, that is, it has a surface resistivity of at most 1 × 10$^{12}$ Ω and a half life of charge of at most 180 seconds, and the antistatic component does not bleed out and thus there is no blocking, moreover the film is remarkably excellent in printability and strength of metal vapor deposition.

On the other hand, as apparent from the results shown in Table 12, although conventional laminated films have satisfactory antistatic property based upon an of 5 Mrad by using an electron beam irradiating apparatus to crosslink, thus a crosslinked expandable laminated sheet was obtained.

The obtained crosslinked expandable laminated sheet was continuously introduced into a vertical hot air expandable apparatus wherein the atmosphere was maintained at 230° C. by heating to expand, thus an expanded laminate was obtained.

The expanded laminate had a thickness of 3.3 mm, a width of 1170 mm, apparent expansion ratio of 20 times and a thickness of the resin layer of 43 μm.

The surface resistivity of the obtained laminate was measured by the following method. As a result, the laminate had a small surface resistivity of $3.2 \times 10^8$ Ω, thus, it is excellent in antistatic property.

The obtained laminate was allowed to stand at 40° C. under 80% RH for 7 days, and the surface of the resin layer of the laminate was observed. The surface was not sticky due to the bleeding. Also, printing was formed on the resin layer side of the laminate by using a printing ink for polypropylene. The laminate was excellently printed without bleeding out.

One side of the obtained laminate was subjected to corona discharge treatment to adjust a wet surface tension to at least 45 dyne/cm. Thus obtained laminate could be improved in adhesion property to various coating agents.

Further, a coating agent layer was provided on the laminate, on which other materials such as various facings, films, sheets other foams, metallic foils, paper, non-woven fabric composed of a natural fiber or synthetic fiber or artificial leather were laminated. Thus obtained laminated could be formed into a desired shape according to various methods.

Surface resistivity

The laminate was cut to give a test piece (10 cm × 10 cm) and it was allowed to stand in a thermostatic room having a temperature of 20° C. and a humidity of 60% RH for 48 hours.

After aging, the surface resistivity was measured in the same atmosphere as the above.

Apparatus: A super insulation meter VE-40 commercially available from Kabushiki Kaisha Kawaguchi Denki Seisakusho, connected with an ambient temperature measuring box RC-02.

A laminate having a surface resistivity of at most $1 \times 10^{13}$ Ω and a half life of charge of at most 3 minutes is defined as an antistatic laminate.

EXAMPLE 32

A mixture of 10 parts of azodicarbonamide as a blowing agent and 100 parts of low density polyethylene (density: 0.923 g/cm$^3$, melt index: 1.2 g/10 minutes, particle size: 32 mesh pass) was used as an expandable resin composition.

Also, there was used as a resin for resin layer a linear random N-substituted acrylamide copolymer having a weight average molecular weight of 30000, composed of 85% by mole of ethylene units: —(CH$_2$—CH$_2$)—, 5% by mole of acrylate units:

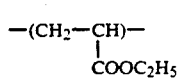

and 10% by mole of acrylamide units:

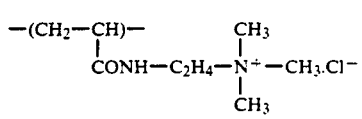

Using the expandable resin composition and the resin for resin layer, a laminate was prepared in the same manner as in Example 31. The obtained laminate had a thickness of 1.9 mm, a width of 1170 mm, an apparent expansion ratio of 15 times and a thickness of the resin layer of 50 μm.

As to the obtained laminate, surface resistivity was measured in the same manner as in Example 31, and a half life of charge, bleeding out and blocking shear strength were measured in the same manner as in Example 16.

When the shear peeling strength is at most 1000 g, the laminate is satisfactory in blocking shear strength. Further, when the shear peeling is not more than 500 g, the laminate is preferable in blocking shear strength.

The results are shown in Table 13.

EXAMPLE 33

There were used as an expandable resin composition, a composition of 100 parts of a mixture of linear low density polyethylene (density: 0.925 g/cm$^3$, melt index: 2 g/10 minutes) and low density polyethylene (density: 0.923 g/cm$^3$, melt index: 1.5 g/10 minutes) in a weight ratio of 30:70 and 10 parts of azodicarbonamide as a blowing agent.

There was used as a resin for resin layer a mixture of 80 parts of a linear random N-substituted acrylamide copolymer having a weight average molecular weight of 27000, composed of 80% by mole of ethylene units: —(CH$_2$—CH$_2$)—, 1% by mole of acrylate units:

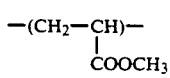

and 19% by mole of acrylamide units:

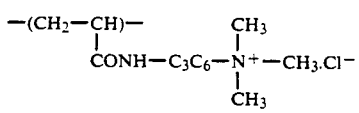

and 20 parts of linear low density polyethylene (density: 0.921 g/cm$^3$, melt index: 3.2 g/10 minutes, particle size: 32 mesh pass).

Using the expandable resin composition and the resin for resin layer, a laminate was prepared in the same manner as in Example 31. The obtained laminate had a thickness of 4.35 mm, a width of 1170 mm, and a thickness of the resin of 50 μm. The apparent expansion ratio was 20 times.

The physical properties of the obtained laminate were measured in the same manner as in Example 32.

The results are shown in Table 13.

EXAMPLE 34

There were used as an expandable rein composition, a composition of 100 parts of an ethylenepropylene copolymer (ethylene content: 8% by weight, melt index: 2.3 g/10 minutes) and 4 parts of azodicarbon amide as a blowing agent.

There was used as a resin for resin layer a mixture of 10 parts of a pulverized linear random N-substituted acrylamide copolymer having a weight average molecular weight of 33000, composed of 88% by mole of ethylene structure units: —(CH$_2$—CH$_2$)—, 3% by mole of acrylate structure units:

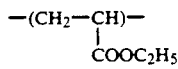

and 9% by mole of acrylamide units:

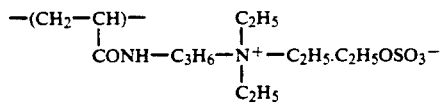

having a particle size of 32 mesh pass and 90 parts of polypropylene (melt index: 2.5 g/10 minutes, particle size: 32 mesh pass).

Using the expandable resin composition and the resin for resin layer, a laminate was prepared in the same manner as in Example 31. The obtained laminate had a thickness of 4.2 mm, a width of 1170 mm, an apparent expansion ratio of 9 times a thickness of the resin layer of 150 μm.

The physical properties of the obtained laminate were measured in the same manner as in Example 32. The results are shown in Table 13.

TABLE 13

| Ex. No. | Surface resistivity (Ω) | Half life of charge (second) | Bleeding out | Blocking shear strength (g) |
|---|---|---|---|---|
| 32 | $2.3 \times 10^8$ | 0.06 | None | 15 |
| 33 | $4.2 \times 10^9$ | 0.10 | None | 0 |
| 34 | $3.8 \times 10^{12}$ | 25 | None | 0 |

COMPARATIVE EXAMPLE 24

There were mixed 99 parts of polypropylene (melt index: 2.5 g/10 minutes, particle size: 32 mesh pass) and one part of stearic acid monoglyceride as an antistatic agent to give a resin for resin a layer.

There were mixed 100 parts of an ethylene-propylene copolymer (ethylene content: 5% by weight, melt index: 1.2 g/10 minutes), 3.5 parts of azodicalbonamide as a blowing agent and one part of dicumylperoxide to give an expandable composition.

Using the expandable composition and the resin for resin layer, a laminate comprising a foamed article and an olefinic resin layer was prepared in the same manner as in Example 31 except that crosslinking was carried out by decomposing dicumylperoxide, that is, electron beam irradiation was not carried out.

The physical properties of the obtained laminate were measured in the same manner as in Example 32. The results are shown in Table 14.

COMPARATIVE EXAMPLE 25

There were mixed 99.2 parts of polypropylene (melt index: 2.5 g/10 minutes, particle size: 32 mesh pass) and 0.8 part of a betain type amphoteric surfactant having the formula (VII) to give a resin for resin layer.

There were mixed 100 parts of the same ethylene-propylene copolymer as used in Comparative Example 24, 2 parts of azodicalbonamide as a blowing agent and 2 parts of divinylbenzene to give an expandable composition.

Then, a laminate comprising a foamed article and an olefinic resin layer was prepared in the same manner as in Example 31, using the obtained expandable composition and the resin for resin a layer.

The physical properties of the obtained laminate of foamed articles were measured in the same manner as in Example 32. The results are shown in Table 14.

COMPARATIVE EXAMPLE 26

There were mixed 98.5 parts of straight chain low density polyethylene (density: 0.921 g/cm³, melt index: 3.2 g/10 minutes, particle size: 32 mesh pass) and 1.5 parts of a mixture of stearic acid monoglyceride as an antistatic agent and betain amphoteric surfactant having the formula (VII) in a weight ratio of 1:1 to give a resin for resin layer.

There were mixed 100 parts of the same low density polyethylene as in Example 33 and 15 parts of azodicalbonamide as a blowing agent to give an expandable composition.

Then, a laminate comprising a foamed article and an olefinic resin layer was prepared in the same manner as in Example 31, using the obtained expandable composition and the resin for resin layer.

The physical properties of the obtained laminate were measured in the same manner as in Example 32. The results are shown in Table 14.

COMPARATIVE EXAMPLE 27

There were mixed 95 parts of an ethylene-propylene copolymer ethylene content: 5% by weight, melt index: 1.2 g/10 minutes, particle size: 32 mesh pass) and 5 parts of a mixture of sodium dodecylbenzenesulfonate as an antistatic agent and polyethylene glycol in a weight ratio of 1:1 to give a resin for resin layer.

There were mixed 100 parts of the same polypropylene as used in Example 34, 12 parts of azodicalbonamide as a blowing agent, one part of dicumylperoxide and 2 parts of divinylbenzene to give an expandable composition.

Then, a laminate comprising a foamed article and and an olefinic resin layer was prepared in the same manner as in Example 31, using the obtained expandable composition and the resin for resin layer.

The physical properties of the obtained laminate were measured in the same manner in Example 32. The results are shown in Table 14.

COMPARATIVE EXAMPLE 28

There were mixed 99.2 parts of polypropylene (melt index: 2.5 g/10 minutes, particle size: 32 mesh pass) and 0.8 part of stearyldiethanolamine as an antistatic agent to give a resin for resin layer.

There were mixed 100 parts of the above-mentioned polypropylene, 2 parts of azodicalbonamide as a blowing agent and 2 parts of divinylbenzene to give an expandable composition.

Then, a laminate comprising a foamed article and and an olefinic resin layer was prepared in the same manner as in Example 31, using the obtained expandable composition and the resin for resin a layer.

The physical properties of the obtained laminate were investigated in the same manner in Example 32. The results are shown in Table 14.

TABLE 14

| Com. Ex. No. | Apparent Expansion ratio (times) | Thickness of laminate (mm) | Thickness of resin layer (μm) | Surface resistivity (Ω) | Half life of charge (second) | Bleeding out | Blocking shear strength (g) |
| --- | --- | --- | --- | --- | --- | --- | --- |
| 24 | 8 | 1.35 | 50 | $2.3 \times 10^{15}$ | ∞ | Generated | 690 |
| 25 | 8 | 1.93 | 30 | $4.2 \times 10^{12}$ | 39 | Generated | 980 |
| 26 | 35 | 4.6 | 100 | $4.2 \times 10^{11}$ | 18 | Generated | 760 |
| 27 | 20 | 3.25 | 50 | $5.1 \times 10^{13}$ | 120 | Generated | 600 |
| 28 | 5 | 2.0 | 500 | $4.2 \times 10^{14}$ | 3600 | Generated | 1080 |

From the results shown in Table 13, it would be recognized that the laminates of the foamed article and the polyolefinic resin of the present invention are excellent in antistatic property, that is, surface resistivity which is an indication of antistatic property is at most $1 \times 10^{13} \Omega$ and the half life of charge is at most 180 seconds. Further, an antistatic component does not bleed out from the resin layer of the laminate.

On the other hand, from the results shown in Table 14, it would be recognized that when the laminates obtained in Comparative Examples 24 to 28 in which the conventional antistatic agents that is, relatively low molecular weight surfactants were used, are satified with antistatic property, blocking occurs due to the bleeding of the antistatic agent.

EXAMPLE 35

The same N-substituted acrylamide copolymer as in Example 31 was added to deionized water heated at 60° C., it was stirred to dispers at a high speed by using a homogenizer to give an emulsion and cooled to room temperature. The obtained emulsion contained 24% by weight of the copolymer.

A foamed article was prepared from low density polyethylene (density: 0.923 g/cm³, melt index: 3.2 g/10 minutes) in an expansion ratio of 20 times according to atmospheric pressure crosslinked expanding method. The foamed article had a thickness of 3 mm. The foamed article was coated with the emulsion obtained in the above according to a roll coating method so as to get a thickness of a resin layer of 5 μm. It was supplied to a hot air drier having a temperature of 120° C. and wound up. The thickness of the resin layer after drying was 2 μm.

The surface of the obtained laminate was measured in the same manner as in Example 31. The laminate had a very small surface resistivity of $3.2 \times 10^8 \Omega$, that is, it was excellent in antistatic property.

The resin layer side of the laminate was covered over the foam side of the laminate, and was allowed to stand at 40° C. under 80% RH for 24 hours. The one laminate was peeled off from the other, and the surface was observed. The laminate were not sticky without bleeding. Printing could be carried out the resin layer side of the laminate by using a printing ink for polypropylene and a printing ink for cellophane, respectively. The printing could be carried out excellently without bleeding out.

Alminum was vapor deposited on the resin layer side of the laminate so as to get a thickness of the resin layer of about 20 to 50 μm. The aluminum layer was excellently adhered to the laminate. Whitening, peeling off and removal of the deposition layer due to bleeding were not observed.

Also, one side of the laminate was subjected to corona discharge treatment to adjust a wet surface tension of at least 37 dyne/cm. Thus the laminate could be improved in adhesion property to various coating agents.

Further, other films or sheets could be laminated on the resin layer of the laminate through a coating agent layer, or a heat sealant layer provided on the laminate. Thus obtained laminate could be used as various wrapping materials and packing materials.

EXAMPLE 36

There were mixed 100 parts of polypropylene (melt index 2.3 g/10 minutes), 5 parts of azodicalbonamide as a blowing agent and 2 parts of divinylbenzene to give a expandable resin composition.

The obtained expandable resin composition was introduced into an extruder having a temperature of 170° to 180° C., and was molten and kneaded so as not to decompose the blowing agent to give an expandable sheet having a thickness of 2.0 mm. The expandable sheet was irradiated with an electron beam of 2.8 Mrad to crosslink. Then, the sheet was expanded in a silicone bath having a temperature of 230° C. to give a foamed article having a thickness of 2.5 mm (expansion ratio: 10 times).

There were mixed the same N-substituted acrylamide copolymer as used in Example 32 and an emulsion (resin content: 20% by weight) of an ethylene-vinyl acetate copolymer (vinyl acetate content: 45% by weight) in a weight ratio of 10:90. The foamed article obtained above was coated with the emulsion by using a roll coater to give a laminate of the foamed article and the olefinic resin layer.

The thickness of the resin layer of the laminate was 0.5 mm.

Then, the surface resistivity of the obtained laminate was measured in the same manner as in Example 31. The half life of charge, bleeding out and blocking shear strength of the laminate were measured in the same manner as in Example 16. As to the laminate, printability and strength of vapor deposition was measured in the same manner as in Examples 20 and 24. The results are shown in Table 15.

EXAMPLE 37

There were mixed 100 parts of a mixture of a linear low density polyethylene (density: 0.925 g/cm³, melt index: 5 g/10 minutes) and low density polyethylene (density: 0.923 g/cm³, melt index 3 g/10 minutes) in a weight ratio of 30:70, 15 parts of azodicalbonamide as a blowing agent and 1.5 parts of dicumyl peroxide to give an expandable resin composition.

Then, the obtained expandable resin composition was introduced into an extruder having a temperature of 120° to 130° C., and molten and kneaded so as not to decompose the blowing agent and not to promote the crosslinking during kneading by decomposing dicumyl peroxide and to give a suitable degree of crosslinking, and formed into an expandable sheet. The sheet was expanded in a horizontal foaming machine provided with a floating apparatus having a temperature of 250° C. to give a foamed article having a thickness of 4 mm (expansion ratio: 35 times).

There were mixed the same N-substituted acrylamide copolymer as used in Example 33 and an emulsion (resin content: 30% by weight) of an ethylene-acrylic acid copolymer (acrylic acid content: 25% by weight) in a weight ratio of 20:80. The foamed article obtained above was coated with the emulsion in the same manner as in Example 36 to give a laminate of a foamed article and an olefinic resin layer.

The thickness of resin layer of the obtained laminate was 0.02 mm.

Then, the physical properties of the obtained laminate were investigated in the same manner as in Example 36. The results are shown in Table 15.

EXAMPLE 38

There were mixed 100 parts of an ethylene-propylene copolymer (ethylene content: 8% by weight, melt index: 2.3 g/10 minutes), 15 parts of azodicalbonamide as a blowing agent and 2 parts of divinylbenzene to give an expandable resin composition.

Then, the obtained expandable resin composition was introduced into an extruder having a temperature of 170° to 180° C., and molten and kneaded so as not to decompose the blowing agent to give an expandable sheet having a thickness of 2.6 mm. Further, the sheet was irradiated with an electron beam of 2.8 Mrad to crosslink, introduced into a silicone bath having a temperature of 230° C. and expanded to give a foamed article having a thickness of 5 mm (expansion ratio: 30 times).

There were mixed a linear random N-substituted acrylamide copolymer having a weight average molecular weight of 31300, composed of 88% by mole of ethylene units having the formula: $-(CH_2-CH_2)-$, 3% by mole of acrylate units having the formula:

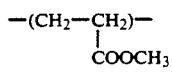

and 9% by mole of acrylamide units having the formula:

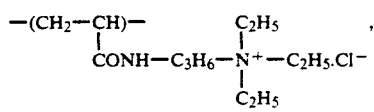

which was pulverized so as to pass the 32 mesh and a 20% toluene solution of the same ethylene-acrylic acid copolymer as used in Example 37 in a weight ratio of 50:50. The above-mentioned foamed article was coated using the obtained mixture in the same manner as in Example 36 to give a laminate comprising the foamed article and the olefinic resin layer.

The thickness of the resin layer of the laminate was 0.03 mm.

Then, physical properties of the obtained laminate were measured in the same manner as in Example 36. The results are shown in Table 15.

EXAMPLE 39

There were mixed 100 parts of the same ethylene-propylene copolymer as used in Example 38, 4 parts of azodicalbonamide as a blowing agent and 2 parts of divinylbenzene to give an expandable resin composition.

A foamed article was prepared in the same manner as in Example 36, using the obtaining expandable resin composition. The obtained foamed article had a thickness of 3 mm (expansion ratio: 8 times).

There were mixed the same N-substituted acrylamide copolymer as used in Example 34 and an emulsion of the same ethylene-acrylic acid copolymer as used in Example 36 in a weight ratio of 30:70. The above-mentioned foamed article was coated in the same manner as in Example 36 using the mixture to give a laminate of the foamed article and the olefinic resin layer.

The thickness of the obtained laminate was 0.08 mm.

Then, the physical properties of the obtained laminate were measured in the same manner as in Example 36. The results are shown in Table 15.

TABLE 15

| Ex. No. | Surface resistivity ($\Omega$) | Half life of charge (second) | Bleeding out | Blocking shear strength (g) | Printability (points) | Strength of vapor depositing (points) |
|---|---|---|---|---|---|---|
| 36 | $2.3 \times 10^{12}$ | 20 | None | 260 | 4 | 4 |
| 37 | $4.2 \times 10^{10}$ | 1.2 | None | 330 | 5 | 5 |
| 38 | $5.1 \times 10^{9}$ | 0.3 | None | 115 | 5 | 5 |
| 39 | $3.8 \times 10^{10}$ | 3.5 | None | 70 | 4 | 5 |

COMPARATIVE EXAMPLE 29

A foamed article was prepared in the same manner as in Example 36, using polypropylene (melt index: 2.8 g/10 minutes). The foamed article had an expansion ratio of 6 times and a thickness of 2.5 mm.

Using a 15% toluene solution wherein an ethylene-vinylacetate copolymer (vinyl acetate content: 45% by weight) and chlorinated polyethylene (chlorination ratio: 34% by weight) were dissolved in toluene in a weight ratio of 70:30, the foamed article was coated in the same manner as in Example 36. The obtained laminate of the foamed article and the olefinic resin layer was 0.02 mm in thickness.

The physical properties of the obtained laminate were measured in the same manner as in Example 36. The results are shown in Table 16.

COMPARATIVE EXAMPLE 30

There were mixed 100 parts of low density polyethylene (density: 0.921 g/cm³, melt index: 3.2 g/10 minutes) and 13 parts of azodicalbonamide as a blowing agent to give an expandable resin composition.

The obtained expandable resin composition was introduced into an extruder having a temperature of 120° to 130° C., and molten and kneaded so as not to decompose the blowing agent to give an expandable sheet having a thickness of 1.5 mm. Further, the sheet was irradiated with an electron beam of 3.2 Mrad to crosslink and the expanded in a horizontal hot air expandable apparatus having a temperature of 250° C. to give a formed article having a thickness of 3 mm and expansion ratio of 25 times.

Then, the foamed article was coated with the same emulsion of ethylene-vinyl acetate as used in Example 36 in the same manner as in Example 36.

39 to give a laminate of a foamed article and an olefinic resin layer.

The thickness of the resin layer of the obtained laminate was 0.03 mm.

Then, the physical properties of the obtained laminate were measured in the same manner as in Example 36. The results are shown in Table 16.

TABLE 16

| Com. Ex. No. | Surface resistivity (Ω) | Half life of charge (second) | Bleeding out | Blocking shear strength (g) | Printability (points) | Strength of vapor depositing (points) |
|---|---|---|---|---|---|---|
| 29 | $2.3 \times 10^{16}$ | ∞ | None | 1130 | 2 | 1 |
| 30 | $4.2 \times 10^{16}$ | ∞ | None | 950 | 2 | 2 |
| 31 | $4.2 \times 10^{15}$ | ∞ | None | 620 | 3 | 2 |
| 32 | $5.1 \times 10^{17}$ | ∞ | None | 710 | 2 | 1 |
| 33 | $3.8 \times 10^{14}$ | 2450 | None | 990 | 1 | 1 |

The thickness of the resin layer of the obtained laminate was 0.05 mm.

Then, the physical properties of the obtained laminate were measured in the same manner as in Example 36. The results are shown in Table 16.

COMPARATIVE EXAMPLE 31

A foamed article was prepared in the same manner as in Example 37, using the same mixture of linear low density polyethylene and low density polyethylene as used in Example 37. The article had a thickness of 5 mm and an expansion ratio of 30 times.

Then, the above obtained foamed article was coated with an emulsion (resin content: 30% by weight) wherein an ethylene-acrylic acid copolymer (acrylic acid content: 25% by weight) was neutralized with sodium hydroxide in the same manner as in Example 37 to give a laminate of a foamed article and an olefinic resin layer. The thickness of the obtained laminate was 0.01 mm.

Then, the physical properties of the obtained laminate were measured in the same manner as in Example 36. The results are shown in Table 16.

COMPARATIVE EXAMPLE 32

A foamed article was prepared in the same manner as in Example 37, using the same ethylene-propylene copolymer as used in Example 37. The obtained article had a thickness of 3 mm and an expansion ratio of 35 times.

Then, the obtained foamed article was coated with a 18% toluene solution of ethylene-acrylic acid copolymer (acrylic acid content: 25% by weight) in the same manner as in Example 37, to give a laminate of the foamed article and the olefinic resin layer. The thickness of the obtained laminate was 0.009 mm.

Then, physical properties of the obtained laminate were measured in the same manner as in Example 36. The results are shown in Table 16.

COMPARATIVE EXAMPLE 33

A foamed article was prepared in the same manner as in Example 39, using the same ethylene-propylene copolymer as used in Example 39. The obtained article had a thickness of 3 mm and an expansion ratio of 10 times.

The obtained foamed article was coated with an emulsion (resin content: 20% by weight) of an ethylene-acrylic acid copolymer (acrylic acid content: 25% by weight) and sodium dodecylbenzene-sulfonate in a weight ratio of 90:10 in the same manner as in Example As apparent from the results shown in Table 15, it would be recognized the laminates of the present invention are excellent in antistatic property, that is the surface resistivity is at most $1 \times 10^{13}$ Ω and the half life of charge is at most 180 seconds. Further, from the laminates of the present invention, an antistatic component does not bleed out, thus blocking does not occur. The laminates are excellent in printability and strength of vapor desposition.

On the other hand, as apparent from the results shown in Table 16, though the conventional laminates are excellent in antistatic property by adding a surfactant as an antistatic agent, the laminate are poor in adhesion property and strength of vapor deposition.

As mentioned above, it would be recognized that the laminates comprising the foamed article and the olefinic resin layer of the present invention are excellent in antistatic property, that an antistatic component does not bleed out, and that the blocking does not occur. Accordingly, the laminate is preferably used in a filed wherein it is required to prevent harms due to static electricity, or in a field wherein the printing or vapor deposition is required, for instance, wrapping materials or packaging materials.

EXAMPLE 40

A biaxially stretched polyester film (thickness: 125 μm) was coated with an emulsion containing 24% by weight of a linear random N-substituted acrylamide copolymer by using a bar coater in an amount of 12 g/m². The used acrylamide copolymer had a weight average molecular weight of 31300, composed of 85% by mole of ethylene structure units having the formula: —(CH₂—CH₂)—, 5% by mole of acrylate units having the formula:

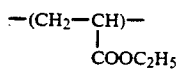

and 10% by mole of acrylamide units having the formula:

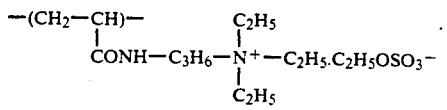

The film was dried in hot air drier of 100° C. The thickness of the electroconductive layer after the drying was 0.5 μm.

The surface resistivity was measured at 20° C. under 20% RH, 40% RH, 60% RH and 80% RH, respectively according to the following method. As a result, the laminate was excellent in electroconductivity such as $9.0 \times 10^7$ Ω, $7.5 \times 10^7$ Ω, $7.0 \times 10^7$ Ω and $6.8 \times 10^7$ Ω, respectively. Therefore, the laminate was small in variation of resistance depending on humidity, which was conventional defects in electroconductivity due to ionic conduction.

The electroconductive layer side of the obtained substrate was coated with an aqueous emulsion containing 20% by weight of an ethylene-acrylic acid copolymer (acrylic acid content: 20% by weight) and soft calcium carbonate fine powder of which surface was treated with an ethylene-imine coupling agent by using a bar coater to give a high resistant dielectric layer having a thickness of 5 μm. The coated substrate was dried using a hot air dryer of 110° C. The obtained substrate was allowed to stand at 20° C. under 60% RH for 24 hours to humidify, thus an electrostatic recorder was prepared. The backside of the coating layer of the electrostatic recorder was strengthened using a pressure sensitive adhesive tape, and a pressure sensitive adhesive tape was sticked on the strengthened coating layer and rapidly 180'-peeled off. As a result, no peeling off was observed at any surface of the substrate, the electroconductive layer and the high resistant dielectric layer, and cohesive tearing of woodfree paper occured. Therefore, the adhesion was excellent.

The electrostatic recorder can be appropriately used as an electrostatic master and a master for electrophotography.

Surface resistivity

The electrostatic recorder is cut into 10 cm × 10 cm and it is allowed to stand at 20° C. under a humidity of 20% RH, 40% RH, 60% RH and 80% RH, respectively for 48 hours.

After aging, the surface resistivity is measured in the same atmosphere as the above.

When the surface resistivity is at most $1 \times 10^{13}$Ω, the film is excellent in electroconductivity.

EXAMPLE 41

An electroconductive layer was prepared in the same manner as in Example 40 except that the resin content of the olefinic resin emulsion was 25% by weight and that the electroconductive layer had a thickness of 15 μm. The thickness of the electroconductive layer after drying was 3 μm.

The obtained support for recording sheets was smoothed by using a super calender. The surface resistivity of the obtained support was $6.7 \times 10^{17}$Ω.

The backside of the substrate of the obtained support for recording sheets was strengthened by a pressure sensitive adhesive tape, and the peeling test was carried out in the same manner as in Example 40. As a result, no peeling off was observed.

The electroconductive layer was coated with a solution prepared by dessolving 20 g of an acrylic resin (commercially available from Mitsubishi Rayon Co., Ltd., under the trade mark of "LR 472") and 4 g of talc in 76 g of methyl ethyl ketone, by using a bar coater so as to get a thickness of 30 μm and dried to form a high registant dielectric layer.

As to the obtained recording sheet, a peeling test was carried out in the same manner as the above. As a result, no peeling off was observed between the applied layer and the high resistance dielectric layer.

EXAMPLE 42

A support for recording sheets was prepared in the same manner as in Example 41 except that as an N-substituted acrylamide copolymer, the N-substituted acrylamide copolymer having the acrylamide units represented by the formula:

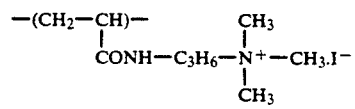

was used.

The physical properties of the obtained support for recording sheets were measured. As a result, no peeling off of the applied layer from the substrate was observed likewise in the support obtained in Example 41. Further, as to the electrostatic recorder prepared by applying a high resistant dielectric comprising a polyester resin and drying, no peeling was observed likewise as to the electrostatic recorder and was desirable in adhesion property.

COMPARATIVE EXAMPLE 34

The same substrate as in Example 40 was coated with a 25% emulsion of a cationic high molecular electroconductive agent (polyvinylbenzyltrimethylammoniumchloride) as an electroconductive agent so as to give a thickness of 2 μm in dry, to which the same high resistant dielectric as in Example 40 was applied to give a support for recording sheets.

The substrate side of the obtained support for recording sheets was backed with a pressure sensitive adhesive tape and a peeling test of the applied side was carried out. Then, peeling between the eleectroconductive layer and the high resistant dielectric layer occured.

COMPARATIVE EXAMPLE 35

A support for recording sheets was prepared in the same manner as in Example 40, using a cationic high molecular electroconductive agent [poly(N,N-dimethyl-3,5-methylenepiperidiniumchloride)] as an electroconductive agent, and as a high resistant dielectric layer resin component, a 30% toluene solution prepared by adding 40% by weight of calcium calbonate to a mixture of a styrene resin commercially available under the trade mark of "Teisan Resin N101" from Teikokukasei Kabushiki Kaisha and an acrylate resin commercially available under the trade mark of "Acrydic 7-1021", from DAINIPPON INK AND CHEMICALS, INC. in a weight ratio of 1.25:1 in an amount 40% by weight of the mixture.

The backside of the applied side of the obtained support for recording sheet was backed with a pressure sensitive adhesive tape and the peeling test of the applied side was carried out. As a result, it was confirmed that peeling between the electroconductive layer and the high resistant dielectric layer occured, likewise the support obtained in Comparative Example 34.

EXAMPLES 43 TO 49

To 100 parts of toluene was added 2 to 3 parts of one of the N-substituted acrylamide copolymers obtained in Examples 1 to 7 and heated to 50° C. to dissolve to give a solution of electroconductive treatment agent.

Then, wood free paper (basic area weight: 60 g/m$^2$) was dipped in the solution of electroconductive treatment agent, taken out and dried at 105° to 120° C. for 2 minutes, and wind was blown to give electroconductive paper. In each of Examples 43 to 49, the amount of the acrylamide resin adhered to the paper was adjusted to 2.5 g/m$^2$ in solids content.

Stickiness, solvent resistance and electroconductivity were measured as to the obtained electroconductive paper according to the following method. The results are shown in Table 17.

Stickiness

The electroconductive paper is allowed to stand in a thermostatic room having a temperature of 40° C., a relative humidity of 80% for 2 days, on which a non-treated wood free paper, which is humidified in the same manner as the above, was covered and pressed under a pressure of 3 kg/cm$^2$ to give a sample for measuring the stickiness.

The paper is slowly peeled off from the other by hands. (Estimation)

⊚: Paper does not adhere to each other at all.
○: Although papers adhere to each other in parts, they can be separated without breaking.
Δ: Although papers adhere to each other wholly, they can be separated without breaking.
X: Papers are broken at separation.

Solvent resistance

The electroconductive paper is allowed to stand at 20° C. under 50% RH over day and night. To the coating surface of the paper was dropped 0.5 ml of a toluene solution for dyeing (2% Flaming red dye), and it is allowed to stand for 10 seconds. The dyeing solution is wiped out after 10 seconds. Then, the permeability of the solution (%) is measured at the other side of the paper and compared with TAPPI Standard Solvent Holdout-Penetration Chart.

Electroconductivity

Electroconductive paper is humidificated under the atmosphere of 20%, 50% or 80% of relative humidity, respectively for 48 hours and then, determined by a super isolation meter (SM-10E type) (made by Toa Denpa Kabushiki Kaisha).

COMPARATIVE EXAMPLES 36 TO 38

An electroconductive paper was prepared in the same manner as in Example 43 except that dimethyldiallylammonium chloride acrylamide copolymer (molar ratio: 80/20) (Comparative Example 36), dimethyldiallylammoniumchloride-N-vinyl-N-methylvinylacetoamide copolymer (molar ratio: 80/20) (Comparative Example 37) or a reaction product of dimethylamine and epichlorhydrin (Comparative Example 38) was used instead of an N-substituted acrylamide copolymer as an electroconductive agent. Provided that, all of the above-mentioned electroconductive agents used in Comparative Examples 36 to 38 were not dissolved in toluene, so they were used in the form of aqueous solution.

The physical properties of the obtained electroconductive paper were measured in the same manner as in Example 43. The results are shown in Table 17.

TABLE 17

| Ex. No. | Stickiness | Solvent resistance (%) | Electroconductivity (Ω) 20° C., 20% RH | 20° C., 50% RH | 20° C., 80% RH |
|---|---|---|---|---|---|
| 43 | ⊚ | 20 | 1.3 × 10$^8$ | 4.3 × 10$^7$ | 1.5 × 10$^7$ |
| 44 | ⊚ | 20 | 1.4 × 10$^8$ | 4.9 × 10$^7$ | 2.0 × 10$^7$ |
| 45 | ⊚ | 20 | 3.0 × 10$^7$ | 1.3 × 10$^7$ | 6.4 × 10$^6$ |
| 46 | ⊚ | 20 | 1.8 × 10$^8$ | 8.0 × 10$^7$ | 2.6 × 10$^7$ |
| 47 | ⊚ | 20 | 1.1 × 10$^8$ | 3.9 × 10$^7$ | 1.1 × 10$^7$ |
| 48 | ⊚ | 10 | 8.4 × 10$^7$ | 1.4 × 10$^7$ | 2.6 × 10$^6$ |
| 49 | ⊚ | 10 | 1.2 × 10$^8$ | 3.0 × 10$^7$ | 7.9 × 10$^6$ |
| Com. Ex. No. | | | | | |
| 36 | X | 20 | 1.2 × 10$^{10}$ | 2.5 × 10$^8$ | 6.1 × 10$^6$ |
| 37 | Δ | 30 | 2.0 × 10$^8$ | 1.1 × 10$^7$ | 1.2 × 10$^6$ |
| 38 | ○ | 95 | 1.6 × 10$^8$ | 3.5 × 10$^7$ | 6.6 × 10$^6$ |

EXAMPLE 50

With an emulsion containing 24% by weight of a linear random N-substituted acrylamide copolymer having a weight average molecular weight of 31300, composed of 85% by mole of ethylene units: —(CH$_2$—CH$_2$)—, 5% by mole of acrylate units:

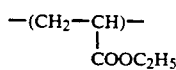

and 10% by mole of acrylamide units:

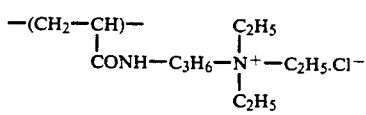

was coated a high quality paper (basic area weight: 60 g/m$^2$) by using a bar coater so as to give a thickness of 2 μm, was dried in a hot air drier kept at 100° C. The thickness of the coating layer was 0.5 μm after drying.

The surface resistivity was measured in the same manner as in Example 40 at 20° C. under 20% RH, 40% RH, 60% RH and 80% RH, respectively.

The surface resistivity was excellent such as 9.0×10$^7$ Ω, 7.5×10$^7$ Ω, 7.0×10$^7$ Ω and 6.8×10$^7$ Ω, respectively. That is, the electroconductive paper of the present invention was very small in variation of resistance depending on humidity, which was large in conventional electroconductivity according to ion-conductivity.

With an aqueous emulsion containing 20% by weight of an ethylene-acrylic acid copolymer (acrylic acid content: 20% by weight) and a soft calcium carbonate fine powder subjected to surface treatment with an ethylene-imine coupling agent was coated the electroconductive layer side by using a bar coater so as to give a thickness of 5 μm of a high resistant dielectric layer, then it was dried in a hot air drier having a temperature of 110° C. It was allowed to stand at 20° C. under 60% RH for 24 hours to humidify, thus antistatic recording paper was obtained. The backside of the coating layer of the electrostatic recording paper was strengthened by a pressure sensitive cellophane adhesive tape, then, a pressure sensitive adhesive tape was sticked on the coating layer and rapidly 180-peeled off. No peeling off was observed at any surface of the substrate, the electroconductive layer and the high resistant dielectric layer, and cohesive tearing of the high quality paper was broken. Therefore, the adhesion property was excellent.

An image was record on the antistatic recording paper in a high speed facsimile under the conditions of a linear density of 8 l/mm, a pulse width of 12 μsec, and applied voltage of a pin electrode of −300 V and subelectrode of +300 V. A concentration of the obtained image was measured as a refraction concentration by using a Mac-beth densimeter ("RD-100R type" commercially available from Mac-beth Co. Ltd.,). The impage had a very high concentration such as a refraction concentration of 0.9 to 1.2.

The recording paper having a surface resistivity of at most $1 \times 10^{13}$ Ω was excellent in electroconductivity.

EXAMPLE 51

An electroconductive layer was formed in the same manner as in Example 50 except that the solid content in the N-substituted acrylamide copolymer emulsion was 25% by weight and the emulsion was coated so as to give a coating layer having a thickness of 3 μm. The thickness of the electroconductive layer was 0.7 μm after drying.

The thus obtained support for the antistatic recording paper was smoothed by using a super calender. Its surface resistivity was $6.7 \times 10^7$ Ω.

With an emulsion comprising 35 g of calcium carbonate, 15 g of an acryl resin (commercially available from Mitsubishi Rayon Co. Ltd., under the trademark of "LR 472"), 80 mg of phthalic anhydride and 20 g of toluene was coated the electroconductive layer of the support by a bar coater so as to get a thickness of 5 μm, and it was dried to give a high resistant dielectric layer.

The peeling test was conducted in the same manner as in Example 50.

An image was recorded on the antistatic recording paper in the same manner as in Example 50. The image was very high in refraction concentration such as 0.9 to 1.2.

EXAMPLE 52

An antistatic recording paper was prepared in the same manner as in Example 51 except that the N-substituted acrylamide copolymer of which acrylamide structure units was represented by the formula:

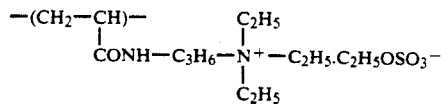

was employed.

The physical properties of the obtained electrostatic recording paper were measured in the same manner as in Example 51.

As a result, it was confirmed that the peeling between the electroconductive layer and the substrate and the peeling between the electroconductive layer and the high resistant dielectric layer did not occur, and the image recording property was excellent.

COMPARATIVE EXAMPLE 39

With an emulsion containing 25% of a cationic high molecular electroconductive agent (polyvinylbenzyltrimetylammonium chloride) was coated the same substrate as in Example 51 so as to get a thickness of 2 μm in dry, on which a high resistant dielectric layer was formed in the same manner as in Example 51 to give an antistatic recording paper.

The peeling test was conducted in the same manner as in Example 51. The peeling between the electroconductive layer and the dielectric layer occured.

An image was recorded on the antistatic recording paper in the same manner as in Example 51. Although the recording paper prepared in Comparative Example 39 was similar to the recording paper of the present invention in refraction concentration, bleeding of the image and uniform records were observed.

COMPARATIVE EXAMPLE 40

An antistatic recording paper was prepared in the same manner as in Example 51, using the same electroconductive agent as used in Comparative Example 35 and as a high resistant dielectric layer forming component, a 10% toluene solution wherein calcium carbonate was added to the same mixture as used in Comparative Example 39 in an amount of 40% by weight of the mixture.

The peeling test was conducted in the same manner as in Example 51. It was confirmed that the peeling between the electroconductive layer and the high resistant dielectric layer occured. Also, an image was recorded on the recording paper in the same manner as in Example 51. As a result, bleeding and ununiform records were observed.

EXAMPLE 53

There was added 10 parts of azodicarbonamide as an blowing agent to 100 parts of a resin mixture of 30 parts of a linear random N-substituted acrylamide copolymer having a weight average molucular weight of 29000, composed of 85% by mole of ethylene units: —(CH$_2$—CH$_2$)—, 5% by mole of acrylate units:

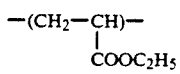

and 10% by mole of acrylamide units:

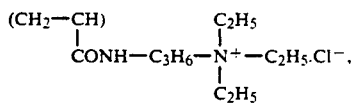

which was pulverized to get a particle size of 32 mesh pass and 100 parts of high pressure processed low density polyethylene (density: 0.921 g/cm$^3$, melt index: 3.7 g/10 minutes, particle size: 32 mesh pass) to give an expandable resin composition.

Then, the obtained expandable resin composition was molten and kneaded in an extruder having a temperature of 120° to 130° C., and was extruded into a molten continuous sheet having a thickness of 1.5 mm and a width of 500 mm. The sheet was irradiated with an electron beam of 5 Mrad to crosslink. The obtained cross-linked expandable sheet was continuously introduced into a vertical hot air expanding machine having a temperature of 230° C. to give a foamed article. The foamed article had a thickness of 3.1 mm, a width of 1170 mm and an expansion ratio of 20 times.

The surface resistivity was measured in the same manner as in Example 31. It was confirmed that the foamed article had a surface resistivity of $1.6 \times 10^9 \Omega$, which shows that the foamed article was excellent in antistatic property.

The foamed article was allowed to stand at 40° C. under 80% RH for 7 days, and the surface of the foamed article was observed. The foamed article was not sticky. Also, printing could be carried out on the foamed article by using an printing ink for polypropylene, and the formed article was excellently printed without bleeding out.

One side surface of the obtained foamed article was subjected to corona discharge treatment to give a wet surface tension of at least 45 dyne/cm. Thus obtained foamed article could be improved in adhesion property to various coating agents.

Also, various skin materials, films, sheets, other foamed articles, metallic foil, paper, non-woven fabric comprising a natural fiber or a synthetic fiber or artificial leather could be laminated on the foamed article through a coating agent layer, and it could be formed into various shapes according to various methods.

The foamed article having a surface resistivity of at least $1 \times 10^{13} \Omega$ and a half life of charge of at least 3 minutes was defined as a foamed article which was excellent in antistatic property.

EXAMPLE 54

A foamed article was prepared in the same manner as in Example 53 except that linear low density polyethylene (density: 0.930 g/cm$^3$, melt index: 3.7 g/10 minutes, particle size: 32 mesh pass) was used instead of the high pressure processed low density polyethylene, and that the amount of the olefinic resin was changed from 30 parts to 20 parts, and the amount of azodicarbonamide was changed from 10 parts to 6 parts.

The obtained foamed article had a thickness of 3.2 mm, a width of 1170 mm and an apparent expansion ratio of 2.0 times.

The wet surface tension of the foamed article was measured according to JIS K 6768. The foamed article had a wet surface tension of 39 dyne/cm, which shows that the foamed article is excellent in surface wettability, compared with a foamed article of linear low density polyethylene, which had a wet surface tension of 31 dyne/cm. Also, the surface resistivity was measured in the same manner as in Example 53. It was confirmed that the foamed article was very small in surface resistivity such as $2.3 \times 10^{11} \Omega$.

The foamed article was coated with a printing ink or an adhesive agent, both of the printing ink and the adhesive agent were not repelled from the foamed article, and tightly adhered to the article.

When a metal was vapor deposited over the foamed article, the metallic layer was remarkably tightly adhered to the foamed article.

As apparent from the above, the foamed article of the present invention was not only improved in adhesion property resulting from the increase of the surface wettability but also excellent in adhesion property to a metallic film.

EXAMPLE 55

An expandable resin composition was prepared in the same manner as in Example 53 except that 50 parts of a linear random N-substituted acrylamide copolymer having a weight average molecular weight of 33000 and 100 parts of low density polyethylene were used. The N-substituted acrylamide copolymer was a copolymer composed of 85% by mole of ethylene structure units: —(CH$_2$—CH$_2$)$_2$—, 5% by mole of acrylate units:

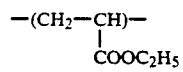

and 10% by mole of acrylamide units:

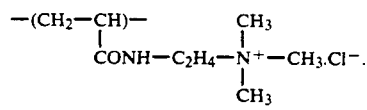

The obtained composition was molten in the extruder having a temperature of 110° to 120° C. Then, while a volatile solvent was blown into the middle of a barrel of the extruder under pressure, the composition in the extruder was kneaded until the blowing agent was dispersed in the composition uniformly. After the temperature of the composition was adjusted so as to get a viscosity preferable for expansion, the composition was extruded through a nozzle to atmospheric pressure to expand, thus a foamed article was obtained. The obtained foamed article was 10 mm in thickness, 600 mm in width and 15 times in apparent expansion ratio.

As to the obtained foamed article, the surface resistivity was measured in the same manner as in Example 53, and half life of charge, bleeding out and blocking shear strength were measured in the same manner as in Example 32. The results are shown in Table 18.

EXAMPLE 56

An expandable resin composition was prepared in the same manner as in Example 53 except that 20 parts of a linear random N-substituted acrylamide copolymer having a weight average molecular weight of 33000, composed of 80% by mole of ethylene units: —(CH$_2$—CH$_2$)—, one % by mole of acrylate unit:

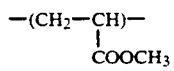

and 19% by mole of acrylamide units:

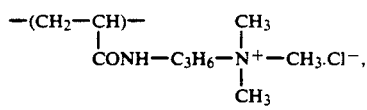

, and 8 parts of azodicarbonamide as a foaming agent were added to 80 parts of linear low density polyethylene (density: 0.921 g/cm$^3$, melt index: 3.2 g/10 minutes, particle size: 32 mesh pass).

Using the obtained expandable resin composition, a cross-linked expandable sheet was prepared and the sheet was heated to give a foamed article in the same manner as in Example 53. The obtained foamed article was 3.9 mm in thickness, 1500 mm in width and 40 in apparent expansion ratio.

The physical properties of the obtained foamed article were measured in the same manner as in Example 55. The results are shown in Table 18.

EXAMPLE 57

To 90 parts of polypropylene (melt index: 2.5 g/10minutes, particle size: 32 mesh pass) was added and mixed 10 parts of a linear random N-substituted acrylamide copolymer having a weight average molecular weight of 34400, composed of 88% by mole of ethylene structure units: —(CH$_2$—CH$_2$)—, 3% by mole of acrylate units:

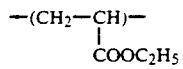

and 9% by mole of acrylamide units:

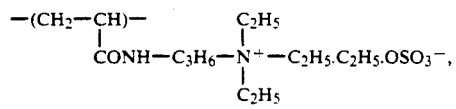

which was pulverized to give an expandable composition.

Using the obtained expandable composition, a foamed article was prepared in the same manner as in Example 55. The obtained foamed article was 2.5 mm in thickness, 450 mm in width and 9 times in apparent expansion ratio.

The physical properties of the obtained foamed article were measured in the same manner as in Example 55. The results are shown in Table 18.

TABLE 18

| Ex. No. | Surface resistivity (Ω) | Half life of charge (second) | Bleeding out | Blocking shear strength (g) |
|---|---|---|---|---|
| 55 | 2.3 × 10$^8$ | 0.06 | None | 15 |
| 56 | 4.2 × 10$^9$ | 0.10 | None | 0 |
| 57 | 3.8 × 10$^{12}$ | 25 | None | 0 |

COMPARATIVE EXAMPLE 41

There were mixed 99 parts of the same polypropylene as in Comparative Example 24 and one part of the same antistatic agent as in Comparative Example 24 to give an expandable composition.

Using the obtained expandable composition, a foamed article was prepared in the same manner as in Example 55.

The physical properties of the obtained foamed article were measured in the same manner as in Example 55. The results are shown in Table 19.

COMPARATIVE EXAMPLE 42

There were mixed 99.2 parts of the same polypropylene as in Comparative Example 25 and 0.8 part of the same antistatic agent as in Comparative Example 25 to give an expandable composition.

Using the obtained expandable composition, a foamed article was prepared in the same manner as in Example 55.

The physical properties of the obtained foamed article were measured in the same manner as in Example 55. The results are shown in Table 19.

COMPARATIVE EXAMPLE 43

There were mixed 98.5 parts of the same linear low density polyethylene as in Comparative Example 26, 1.5 parts of the same antistatic agents as in Comparative Example 26 and 10 parts of azodicarbonamide as a blowing agent to give an expandable composition.

Using the obtained expandable composition, a foamed article was prepared in the same manner as in Example 53.

The physical properties of the obtained foamed article were measured in the same manner as in Example 55. The results are shown in Table 19.

COMPARATIVE EXAMPLE 44

There were mixed 95 parts of the same ethylene-propylene copolymer (ethylene content: 5% by weight) as in Comparative Example 27, 5 parts of the same antistatic agent as used in Comparative Example 27, 10 parts of azodicarbonamide as a foaming agent and 2 parts of dicumyl peroxide as a crosslinking agent to give an expandable composition.

The obtained expandable composition was molten and kneaded in an extruder having a temperature of 160° to 170° C. and introduced into a heated die in a predetermined amount and sealed under pressure. Then, the temperature was elevated to a decomposition temperature of the blowing agent to decompose the blowing agent, then released into a low pressure zone to give a foamed article.

The physical properties of the obtained foamed article were measured in the same manner as in Example 55. The results are shown in Table 19.

COMPARATIVE EXAMPLE 45

There were mixed 99.2 parts of the same polypropylene as in Comparative Example 28 and one part of the same antistatic agent as in Comparative Example 28 to give an expandable composition.

Using the obtained expandable composition, a foamed article was prepared in the same manner as in Example 55.

The physical properties of the obtained foamed article were measured in the same manner as in Example 55. The results are shown in Table 19.

TABLE 19

| Com. Ex. No. | Apparent expansion ratio (times) | Surface resistivity ($\Omega$) | Half life of charge (second) | Bleeding out | Blocking shear strength (g) |
|---|---|---|---|---|---|
| 41 | 8 | $2.3 \times 10^{15}$ | $\infty$ | generated | 690 |
| 42 | 5 | $4.2 \times 10^{12}$ | 39 | generated | 980 |
| 43 | 35 | $4.2 \times 10^{11}$ | 18 | generated | 760 |
| 44 | 20 | $5.1 \times 10^{13}$ | 120 | generated | 600 |
| 45 | 5 | $4.2 \times 10^{14}$ | 3600 | generated | 1080 |

From the results shown in Table 18, it would be recognized that the foamed article comprising the foamed article and the olefinic resin of the present invention is excellent in antistatic property, that is, surface resistivity, which is an index of the antistatic property, is at most $1 \times 10^{13} \Omega$ and the half life of charge is at most 180 seconds, and an antistatic component does not bleed out from the foamed article, accordingly, the blocking does not occur.

On the other hand, the foamed articles obtained in Comparative Examples 41 to 45 are foamed articles prepared by using a conventional relatively low molecular weight surfactant as an antistatic agent. As shown in Table 19, when the foamed article is satisfactory in antistatic property, the antistatic agent bleeds out from the foamed article, thus the blocking occured.

As apparent from the above, the foamed article of the present invention is excellent in antistatic property, and an antistatic agent does not bleed out, thus blocking does not occur. Accordingly, it can be suitably used in a field wherein a harm resulting from static electricity must be prevented.

Wet surface tension

It is measured in accordance with the procedure of JIS K 6768.

Repellency

The foamed article is coated with a printing ink for cellophane commercially available under the trademark of "CCST" from Toyo Ink Seizo Kabushiki Kaisha by using a #50 bar coater and the foamed article is allowed to stand in a room and observed as to whether the ink film has circular dewetting or not.

Estimation
Excellent: The ink film has no dewetting.
Bad: The ink film has no dewetting.

Printability

A foamed article is coated with CCST by using #50 bar coater, and it is dried in a hot air dryer at 80° C. to remove a solvent. A pressure sensitive cellophane adhesive tape is adhered to the ink layer. The tape is 180°-peeled off, and the area of the ink remaining on the foamed article is measured.

| (Estimation) | Index |
|---|---|
| Ink remains on the foamed article in the area of less than 50%: | 1 point |
| Ink remains on the foamed article in the area of at least 50% to less than 70%: | 2 points |
| Ink remains on the foamed article in the area of at least 70% to less than 90%: | 3 points |
| Ink remains on the foamed article in the area of at least 90% to less than 100%: | 4 points |
| Ink remains on the foamed article in the area of 100%: | 5 points |

TABLE 20

| Ex. No. | Foamed article | Expansion ratio (times) | Surface resistivity ($\Omega$) | Wet surface tension (dyne/cm) | Repellency | Printability (points) |
|---|---|---|---|---|---|---|
| 58 | Foamed article obtained in Example 55 | 15 | $2.3 \times 10^{8}$ | 39 | Excellent | 5 |
| 59 | Foamed article obtained in the same manner as in Example 56 except that 10 parts of the acrylamide copolymer and 90 parts of the low density polyethylene were used. | 40 | $4.2 \times 10^{9}$ | 39 | Excellent | 4 |
| 60 | Foamed article obtained in the same manner as in Example 57 except that 15 parts of the N-substituted acrylamide copolymer and 85 parts of the low density polyethylene were used. | 9 | $3.8 \times 10^{12}$ | 39 | Excellent | 4 |

EXAMPLES 58 TO 60

Each foamed article was prepared in the same manner as in Example 55 except that the blending ratio of the N-substituted acrylamide copolymer to the olefinic resin was changed to as shown in Table 20. As to the obtained foamed article, surface resistivity was measured in the same manner as in Example 53, and the wet surface tension, repellency and printability were measured according to the following methods. The results are shown in Table 20.

COMPARATIVE EXAMPLE 46

A foamed article was prepared in the same manner as in Comparative Example 41 except that an antistatic agent was not used.

The physical properties of the obtained foamed article were measured in the same manner as in Example 58 to 60. The results are shown in Table 21.

COMPARATIVE EXAMPLE 47

A foamed article was prepared in the same manner as in Comparative Example 42 except that an ethylene-vinyl acetate copolymer (vinyl acetate content: 20% by weight, weight average molecular weight: 56000) was used instead of the antistatic agent, and the ethylene-vinyl acetate copolymer was mixed with polypropylene in a weight ratio of 15/85.

The physical properties of the obtained foamed article were measured in the same manner as in Examples 58 to 60. The results are shown in Table 21.

COMPARATIVE EXAMPLE 48

A foamed article was prepared in the same manner as in Comparative Example 43 except that an ethylene-ethyl acrylate copolymer (ethyl acrylate content: 18% by weight, weight average molecular weight: 5000) was used instead of the antistatic agent, and the ethylene-ethyl acrylate copolymer was mixed with the low density polyethylene in a weight ratio of 10/90.

The physical properties of the obtained foamed article were measured in the same manner as in Examples 58 to 60. The results are shown in Table 21.

COMPARATIVE EXAMPLE 49

A foamed article was prepared in the same manner as in Comparative Example 44 except that an ethylene-ethyl acrylate-maleic anhydride copolymer (ethyl acrylate content: 14% by weight, maleic anhydride content: 2% by weight, weight average molecular weight: 58000) was used instead of the antistatic agent, and the ethylene-ethyl acrylate-maleic anhydride copolymer was mixed with the ethylene-propylene copolymer in a weight ratio of 20/80.

The physical properties of the obtained foamed article were measured in the same manner as in Examples 58 to 60. The results are shown in Table 21.

COMPARATIVE EXAMPLE 50

A foamed article was prepared in the same manner as in Comparative Example 45 except that an ethylenemethyl methacrylate-maleic anhydride copolymer (methyl methacrylate content: 13% by weight, maleic anhydride content: 2% by weight, weight average molecular weight: 61000) was used instead of the antistatic agent, and the ethylene-methyl methacrylate-maleic anhydride copolymer was mixed with the polypropylene in a weight ratio of 15/85.

The physical properties of the obtained foamed article were measured in the same manner as in Examples 58 to 60. The results are shown in Table 21.

TABLE 21

| Com. Ex. No. | Expansion ratio (times) | Surface resistivity ($\Omega$) | Wet surface tension (dyne/cm) | Repelling | Printability (points) |
|---|---|---|---|---|---|
| 46 | 20 | $2.3 \times 10^{18}$ | 31 | bad | 1 |
| 47 | 5 | $4.2 \times 10^{16}$ | 32 | bad | 1 |
| 48 | 35 | $4.2 \times 10^{16}$ | 34 | bad | 2 |
| 49 | 20 | $5.1 \times 10^{15}$ | 33 | bad | 3 |
| 50 | 5 | $4.2 \times 10^{16}$ | 32 | bad | 2 |

As apparent from the results shown in Table 20, it would be recognized that the foamed article comprising the olefinic resin of the present invention obtained in each of Examples 58 to 60 is improved in wet surface tension and does not repel a coating agent even if a physical surface treatment is not conducted. Also, the foamed article is excellent in printability, adhesion property and strength of vapor deposition, and moreover is excellent in antistatic property, namely has a surface resistivity, which is the index of the antistatic property, of at most $1 \times 10^{13} \Omega$.

On the other hand, as shown in Table 21, the foamed articles obtained in Comparative Examples 46 to 50 according to conventional methods, if the foamed article is not subjected to corona discharge treatment and a specific coating agent is not employed, repelling is generated. Also, it is unsatisfactory in printability, adhesion property and strength of vapor deposion. Moreover, it is unsatisfactory in antistatic property.

Thus, the foamed article having excellent surface wettability of the present invention can be subjected to printing, vapor deposition, laminating, or the like. Moreover, the foamed article can be preferably used as wrapping materials or packaging materials solely because it has no harm resulting from static electricity.

EXAMPLE 61

There were mixed 100 parts of high pressured low density polyethylene (density: 0.921 g/cm$^3$, melt index: 3.7 g/10 minutes, particle size: 32 mesh pass) and 10 parts of azodicarbonamide as a foaming agent to give an expandable resin composition (A) for a polyolefinic resin foamed article used as a support.

There were mixed 20 parts of a linear random N-substituted acrylamide copolymer having a weight average molecular weight of 33000, 100 parts of the above-mentioned high pressured low density polyethylene and 6 parts of azodicarbonamide as a foaming agent to give an expandable resin composition (B) used as a resin for a foamed article layer. The N-substituted acrylamide copolymer was a copolymer composed of 85% by mole of ethylene units: —(CH$_2$—CH$_2$)—, 5% by mole of acrylate units:

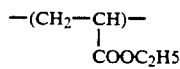

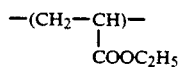

and 10% by mole of acrylamide structure units:

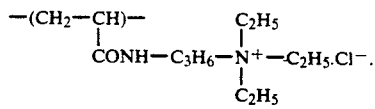

After the above-mentioned expandable resin compositions (A) and (B) were introduced into two extruders, respectively, they were introduced into the laminating apparatus having a nozzle complex system, and molten and kneaded to form a molten composite continuous sheet. The obtained sheet had a thickness of the layer of the composition (B) of 1 mm, and a thickness of the support layer of the composition (A) of 1.5 mm, and a width of 500 mm.

The obtained sheet was irradiated with an electron beam of 5 Mrad by an electron beam irradiation machine to give a cross-linked expandable laminated sheet.

The obtained cross-linked expandable laminated sheet was continuously introduced into a vertical hot air foaming machine having a temperature of 230° C. to give a laminate of foamed articles. The obtained laminate of foamed articles was 4.2 mm in thickness, 1170 mm in width, 20 times in apparent expansion ratio of the article, 15 times of apparent expansion ratio of the foamed article layer and 1.7 mm in thickness of the foamed article layer.

As to the obtained laminate of foamed articles, surface resistivity was measured in the same manner as in Example 31. The surface resistivity of the laminate was very small such as $3.2 \times 10^{11} \Omega$. Therefore, the laminate was excellent in antistatic property.

After the obtained laminate of foamed articles was allowed to stand at 40° C. under 80% RH for 7 days, the resin layer surface of the laminate of foamed articles was observed. As a result, there was no stickiness due to bleeding. Also, when a printing was applied to the resin layer surface of the obtained laminate of foamed articles by using a printing ink for polypropylene, the printing was excellently carried out without bleeding out.

Then, one side of the obtained laminate of foamed articles was subject to corona discharge treatment to give a wet surface tension of at least 37 dyne/cm. The obtained foamed article could be improved in adhesion property to various coating agents.

Moreover, various skin materials, films, sheets, other foamed articles, metallic foil, paper, non-woven fabrics comprising a natural fiber or synthetic fiber or artificial leather could be laminated on the laminate of foamed articles through a coating agent layer. The thus obtained laminate could be formed into various shapes by various methods.

A laminate having a surface resistivity of at most $1 \times 10^{13} \Omega$ and a half life of charge of at most 3 minutes is defined as a laminate which is excellent in antistatic property.

EXAMPLE 62

There were mixed 100 parts of low density polyethylene (density: 0.923 g/cm³, melt index: 1.2 g/10 minutes, particle size: 32 mesh pass) and 10 parts of azodicarbonamide as a blowing agent to give an expandable resin composition (A) for a support of an olefinic resin foamed article.

There were mixed 20 parts of a linear random N-substituted acrylamide copolymer having a weight average molecular weight of 35000, composed of 85% by mole of ethylene units: —(CH₂—CH₂)—, 5% by mole of acrylate units:

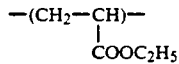

and 10% by mole of acrylamide units:

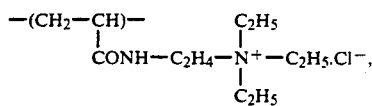

and 4 parts of azodicarbonamide as a foaming agent to give an expandable composition (B) used as a resin for a foamed article layer.

Using the expandable resin composition (A) and the expandable resin composition (B), a laminate of foamed articles was prepared in the same manner as in Example 61. The obtained laminate of foamed articles was 3.0 mm in thickness, and 1170 mm in width. The expansion ratio of the foamed support was 15 times, the expansion ratio of the foamed article layer was 15 times, and the thickness of the foamed article layer was 0.8 mm.

As to the obtained laminate of foamed articles, surface resistivity was measured in the same manner as in Example 61. The half life of charge, bleeding out and blocking shear strength were measured in the same manner as in Example 16. The results are shown in Table 22.

EXAMPLE 63

There was mixed a linear low density polyethylene (density: 0.925 g/cm³, melt index: 2 g/10 minutes) and low density polyethylene (density: 0.923 g/cm³, melt index: 1.5 g/10 minutes) in a weight ratio of 30:70 to give an expandable resin composition (A) for a support.

There were mixed 20 parts of a linear random N-substituted acrylamide copolymer having a weight average molecular weight of 27400, composed of 80% by mole of ethylene units: —(CH₂—CH₂)—, 1% by mole of acrylate unit:

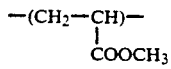

and 19% by mole of acrylamide unit:

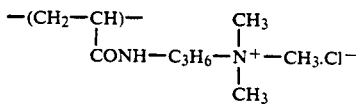

and 80 parts of a linear low density polyethylene (density: 0.921 g/cm³, melt index: 3.2 g/10 minutes, particle size: 32 mesh pass) to give an expandable resin composition (B) used as a resin for a foamed article layer.

The expandable resin composition (A) and the expandable resin composition (B) were introduced into two extruders having a temperature of 110° to 125° C., respectively, and molten therein, A volatile solvent was blown through a barrel of each extruder. Each of the compositions was kneaded until the volatile solvent was uniformly dispersed in the composition, and the temperature of the extruder was adjusted so as to get a preferable viscosity for expansion. The compositions were introduced into a coextrusion apparatus in which two polymer streams join in a die and extruded into an atmospheric pressure zone to expand, thus a laminate of foamed articles was obtained. The obtained laminate of foamed articles was 4.5 mm in thickness, and 1170 mm in width. The expansion ratio of the foamed article support was 20 times, the expansion ratio of the foamed article layer was 20 times and the thickness of the foamed article layer was 1.25 mm.

The physical properties of the obtained laminate of foamed articles were measured in the same manner as in Example 62. The results are shown in Table 22.

EXAMPLE 64

There were mixed 100 parts of an ethylene-propylene copolymer (ethylene content: 8% by weight, melt index: 2.3 g/10 minutes), 3 parts of azodicarbonamide as a blowing agent, one part of dicumyl peroxide and 2 parts of divinyl benzen to give an expandable resin composition (A) for a support.

There were mixed 60 parts of a linear random N-substituted acrylamide copolymer having a weight average molecular weight of 34400, composed of 88% by mole of ethylene units: —(CH$_2$—CH$_2$)—, 3% by mole of acrylate units:

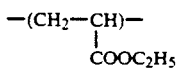

and 9% by mole of acrylamide units:

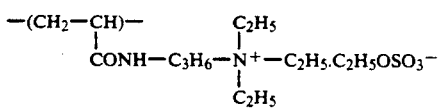

which was pulverized to have a particle size of 32 mesh pass, and 40 parts of polypropylene (melt index: 2.5 g/10 minutes, particle size: 32 mesh pass), 2 parts of azodicarbonamide as a blowing agent, one part of dicumyl peroxide and 2 parts of divinyl benzene to give an expandable resin composition (B) used as a resin for a resin layer.

A laminate of foamed articles was obtained in the same manner as in Example 61 except that crosslinking was carried out by the decomposition of dicumyl peroxide, that is, the laminate was not irradiated with an electron beam.

The obtained laminate of foamed articles was 4.5 mm in thickness, and 1170 mm in width. Also, the expansion ratio of the foamed article support was 9 times, the expansion ratio of the foamed article layer was 9 times, and the thickness of the foamed article layer was 0.25 mm.

The physical properties of the obtained laminate of foamed articles were measured in the same manner as in Example 62. The results are shown in Table 22.

TABLE 22

| Ex. No. | Surface resistivity (Ω) | Half life of charge (second) | Bleeding out | Blocking shear strength (g) |
| --- | --- | --- | --- | --- |
| 62 | 2.3 × 10$^8$ | 0.06 | None | 15 |
| 63 | 4.2 × 10$^9$ | 0.10 | None | 0 |
| 64 | 3.8 × 10$^{12}$ | 25 | None | 0 |

COMPARATIVE EXAMPLE 51

There were mixed 99 parts of polypropylene (melt index: 2.5 g/10 minutes, particle size: 32 mesh pass), one part of stearic acid monoglyceride as an antistatic agent, 5 parts of azodicarbonamide as a blowing agent and 2 parts of divinyl benzene to give an expandable composition (B) for a foamed article layer.

There were mixed 100 parts of ethylene-propylene copolymer (ethylene content: 5% by weight, melt index: 1.2 g/10 minutes), 3 parts of azodicarbonamide as a blowing agent and 2 parts of divinyl benzene to give an expandable composition (A) for a support.

Using the expandable composition (A) and the expandable composition (B), a laminate of foamed articles were prepared in the same manner as in Example 61.

The physical properties of the obtained laminate of foamed articles were measured in the same manner as in Example 62. The results are shown in Table 23.

COMPARATIVE EXAMPLE 52

There were mixed 99.2 parts of polypropylene (melt index: 2.5 g/10 minutes, particle size: 32 mesh pass), 0.8 part of a betaine amphoteric surfactant having the formula (VII) as an antistatic agent, 3 parts of azodicarbonamide as a blowing agent and 2 parts of divinyl benzene to give an expandable resin composition (B) for foamed article layer.

There were mixed 100 parts of the same ethylene-propylene copolymer as used in Comparative Example 51, one part of azodicarbonamide as a blowing agent and 2 parts of divinyl benzene to give an expandable composition (A) for a support.

Using the obtained expandable composition (A) and the expandable composition (B), a laminate of foamed articles was prepared in the same manner as in Example 61.

The physical properties of the obtained laminate were measured in the same manner as in Example 62. The results are shown in Table 23.

COMPARATIVE EXAMPLE 53

There were mixed 98.5 parts of a low density polyethylene (density: 0.921 g/cm$^3$, melt index: 3.2 g/10 minutes, particle size: 32 mesh pass) and 1.5 parts of a mixture of stearic acid monoglyceride and a betaine amphoteric surfactant having the formula (VII) in a weight ratio of 1:1 as an antistatic agent to give an expandable resin composition (B) for foamed article layer.

Using a low density polyethylene (density: 0.921 g/cm$^3$, melt index: 3.2 g/10 minutes), an expandable resin composition (A) for a support was obtained in the same manner as in Example 61.

Using the obtained expandable resin composition (A) and the composition (B), a laminate of foamed articles was prepared in the same manner as in Example 63.

The physical properties of the obtained laminate of foamed articles were measured in the same manner as in Example 62. The results are shown in Table 23.

COMPARATIVE EXAMPLE 54

There were mixed 95 parts of ethylene-propylene copolymer (ethylene content: 5% by weight, melt index: 1.2 g/10 minutes, particle size: 32 mesh pass), 5 parts of a mixture of sodium dodecylbenzenesulfonate and polyethylene glycol in a weight ratio of 1:1 as an antistatic agent, 10 parts of azodicarbonamide as a blowing agent and 2 parts of divinyl benzene to give an expandable composition (B) for foamed article layer.

There were mixed 100 parts of the same polypropylene as used in Example 64, 8 parts of azodicarbonamide as a blowing agent and 2 parts of divinyl benzene to give an expandable composition (A) for a support.

Using the obtained expandable composition (A) and the composition (B), a laminate of foamed articles were prepared in the same manner as in Example 61.

The physical properties of the obtained laminate of foamed articles were measured in the same manner as in Example 62. The results are shown in Table 23.

COMPARATIVE EXAMPLE 55

There were mixed 99.2 parts of polypropylene (melt index: 2.5 g/10 minutes, particle size: 32 mesh pass), 0.8 part of stearyl diethanol amine as an antistatic agent, 3 parts of azodicarbonamide as a blowing agent, one part of dicumyl peroxide and 2 parts of divinyl benzene to give an expandable composition (B) for foamed article layer.

There were mixed 100 parts of the same polypropylene as used in the above, 2 parts of azodicarbonamide as a blowing agent, one part of dicumyl peroxide and 2 parts of divinyl benzene to give an expandable composition (A) for a support.

Using the obtained expandable composition (A) and the expandable composition (B), a laminate of foamed articles was prepared in the same manner as in Example 61 except that the compositions were cross-linked by the decomposition of dicumyl peroxide, that is, without the irradiation of an electron beam.

The physical properties of the obtained laminate of foamed articles were measured in the same manner as in Example 62. The results are shown in Table 23.

TABLE 23

| Com. Ex. No. | Expansion ratio (times) | | Thickness of laminate (mm) | Thickness of foamed article layer (mm) | Surface resistivity ($\Omega$) | Half life of charge (second) | Bleeding out | Blocking shear strength (g) |
| --- | --- | --- | --- | --- | --- | --- | --- | --- |
| | Support | Foamed article layer | | | | | | |
| 51 | 8 | 5 | 3.5 | 1.0 | $2.3 \times 10^{15}$ | $\infty$ | Generated | 690 |
| 52 | 5 | 3 | 4.0 | 1.5 | $4.2 \times 10^{12}$ | 39 | Generated | 980 |
| 53 | 35 | 30 | 4.0 | 1.0 | $4.2 \times 10^{11}$ | 18 | Generated | 760 |
| 54 | 20 | 15 | 5.0 | 0.85 | $5.1 \times 10^{13}$ | 120 | Generated | 600 |
| 55 | 5 | 2 | 3.0 | 0.5 | $4.2 \times 10^{14}$ | 3600 | Generated | 1080 |

From the results shown in Table 22, it would be recognized that the laminate of foamed articles having an olefinic resin of the present invention is excellent in antistatic property, namely has a surface resistivity, which is an index of the antistatic property, of at least $1 \times 10^{13} \Omega$, and half life of charge of at most 180 seconds. Also, since the antistatic agent does not bleed out from the foamed article layer of the laminate of foamed articles, the blocking does not occur.

On the other hand, the laminate of foamed articles obtained in each of Comparative Examples 51 to 55 is a laminate of foamed articles prepared by using a conventional relatively low molecular weight surfactant as an antistatic agent. From the results shown in Table 23, it would be recognized that if the laminate is satisfied with antistatic property, an antistatic agent bleeds out from the laminate, and blocking occurs.

As mentioned above, it would be recognized that the laminate of foamed articles of the present invention is excellent in antistatic property, and an antistatic agent does not bleed out, thus blocking does not occur. Accordingly, the laminate can be preferably used in a field wherein harm resulting from static electricity should be prevented.

As mentioned above, the N-substituted acrylamide copolymer of the present invention imparts excellent antistatic ability to thermoplastic resins, and can be widely applied to various thermoplastic resins since the N-substituted acrylamide copolymer is excellent in antiblocking ability without lowering physical properties such as transparency and elongation of films and articles formed from a thermoplastic resin.

The aqueous composition of the N-substituted acrylamide copolymer the present invention can be widely applied to various resins as an antistatic agent since the aqueous composition is excellent in transparency and durability for friction.

The thermoplastic resin film having a vapor deposition layer of the present invention can be appropriately used, for instance, as packaging materials since the thermoplastic resin film has very excellent metallic film vapor deposition strength and does not have cracks or omission in a metallic layer.

A laminated film of a thermoplastic resin, a thermoplastic resin film, a laminate comprising a foamed article and a thermoplastic resin layer, a laminate of foamed articles of the present invention are excellent in adhesion property for printing, and the like since they show very excellent antistatic ability without bleeding out, does not have adhesion property for dust and does not give a shock to human body by discharge of static electricity.

Further, the polyolefinic resin foamed article of the present invention is very excellent in surface wettability, adhesion property, repellency against a coating material, printing property, vapor deposition property, and the like.

A support for recording sheets and the electrostatic recording paper of the present invention are excellent in electroconductivity, and the like. Therefore, the support for recording sheets and the electrostatic recording paper can be appropriatly used as an electrostatic master, an electro-photographic master, and the like in the field of transmission of information using an electorstatic record method.

Further, the electroconductive paper of the present invention can be appropriately used as paper for copy machine, paper for computer, paper for facsimile, and the like as well as electrostatic record paper since the electroconductive paper does not show stickiness and is excellent in resistance to solvent, and the like.

What is claimed is:

1. A linear N-substituted random acrylamide copolymer comprising: (1) 65 to 99% by mole of ethylene units having the formula (I):

$$-(CH_2-CH_2)- \qquad (I)$$

(2) 1 to 15% by mole of acrylate units having the formula (II):

$$\begin{array}{c} -(CH_2-CH)- \\ | \\ COOR^1 \end{array} \qquad (II)$$

wherein $R^1$ is an alkyl group having 1 to 4 carbon atoms, and (3) 1 to 35% by mole of acrylamide units having the formula (III):

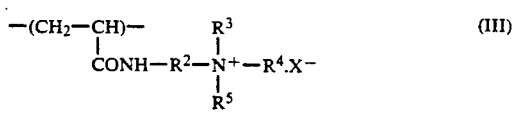

$$\begin{array}{c} -(CH_2-CH)- \qquad R^3 \\ | \qquad\qquad | \\ CONH-R^2-N^+-R^4.X^- \\ | \\ R^5 \end{array} \qquad (III)$$

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$; said copolymer having a weight average molecular weight of 1000 to 50000.

2. A linear random N-substituted acrylamide copolymer comprising:

(1) 65 to 99% by mole of ethylene units having the formula (I):

$$-(CH_2-CH_2)- \qquad (I)$$

(2) 1 to 15% by mole of acrylate units having the formula (II):

wherein $R^1$ is an alkyl group having 1 to 4 carbon atoms, and (3) 1 to 35% by mole of acrylamide units having the formula (IV):

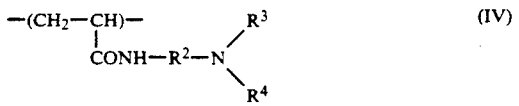

wherein $R^2$ is an alkylene group having 2 to 8 carbon atoms, and $R^3$ and $R^4$ are the same or different and each is an alkyl group having 1 to 4 carbon atoms, said copolymer having a weight average molecular weight of 1000 to 50000.

3. An aqueous composition of a linear random N-substituted acrylamide copolymer comprising:

(1) 65 to 99% by mole of ethylene units having the formula (I):

$$-(CH_2-CH_2)- \qquad (I)$$

(2) 1 to 15% by mole of acrylate units having the formula (II):

wherein $R^1$ is an alkyl group having 1 to 4 carbon atoms, and (3) 1 to 35% mole of acrylamide units having the formula (III):

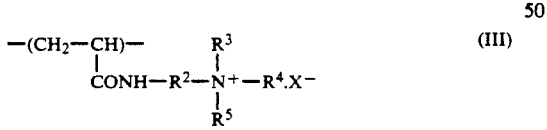

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

4. An antistatic thermoplastic resin film comprising a thermoplastic resin containing 0.3 to 50% by weight of a linear random N-substituted acrylamide copolymer comprising:

(1) 65 to 99% by mole of ethylene structure units having the formula (I):

$$-(CH_2-CH_2)- \qquad (I)$$

(2) 1 to 15% by mole of acrylate units having the formula (II):

wherein $R^1$ is an alkyl group having 1 to 4 carbon atoms, and (3) 1 to 35% by mole of acrylamide units having the formula (III):

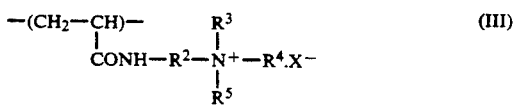

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

5. A thermoplastic resin film having a vapor deposition layer comprising an antistatic-thermoplastic resin film containing 0.3 to 50% by weight of a linear random N-substituted acrylamide copolymer comprising:

(1) 65 to 99% by mole of ethylene units having the formula (I):

$$-(CH_2-CH_2)- \qquad (I)$$

(2) 1 to 15% by mole of acrylate units having the formula (II):

wherein $R^1$ is an alkyl group having 1 to 4 carbon atoms, and (3) 1 to 35% by mole of acrylamide units having the formula (III):

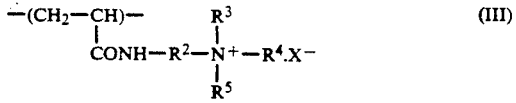

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: CH₃OSO₃— or a group having the formula: C₂H₅OSO₃—;

said copolymer having a weight average molecular weight of 1000 to 50000;

having a vapor deposition layer on its surface.

6. A laminated thermoplastic resin film having a thermoplastic resin layer containing a linear random N-substituted acrylamide copolymer comprising:

(1) 65 to 99% by mole of ethylene structure units having the formula (I):

(2) 1 to 15% by mole of acrylate units having the formula (II):

wherein R¹ is an alkyl group having 1 to 4 carbon atoms, and (3) 1 to 35% by mole of acrylamide units having the formula (III):

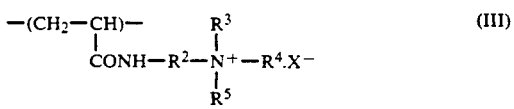

wherein R² is an alkylene group having 2 to 8 carbon atoms, R³ and R⁴ are the same or different and each is an alkyl group having 1 to 4 carbon atoms, R⁵ is an alkyl group having 1 to 12 carbon atoms, an arylalkyl group having 6 to 12 carbon atoms or an alicyclic alkyl group having 6 to 12 carbon atoms, and X is a halogen atom, a group having the formula: CH₃OSO₃— or a group having the formula: C₂H₅OSO₃—;

said copolymer having a weight average molecular weight of 1000 to 50000.

7. The film of claim 6, wherein said resin layer has a thickness of 0.1 to 50 μm.

8. The film of claim 6, wherein said resin layer has 0.3 to 50% by weight of said polyacrylamide copolymer.

9. A laminate comprising an olefinic resin foamed article and an olefinic resin layer containing a linear random N-substituted acrylamide copolymer comprising:

(1) 65 to 99% by mole of ethylene units having the formula (I):

—(CH₂—CH₂)—     (I)

(2) 1 to 15% by mole of acrylate units having the formula (II):

wherein R¹ is an alkyl group having 1 to 4 carbon atoms, and (3) 1 to 35% by mole of acrylamide units having the formula (III):

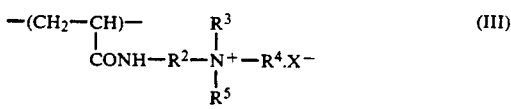

wherein R² is an alkylene group having 2 to 8 carbon atoms, R³ and R⁴ are the same or different and each is an alkyl group having 1 to 4 carbon atoms, R⁵ is an alkyl group having 1 to 12 carbon atoms, an arylalkyl group having 6 to 12 carbon atoms or an alicyclic alkyl group having 6 to 12 carbon atoms, and X is a halogen atom, a group having the formula: CH₃OSO₃— or a group having the formula: C₂H₅OSO₃—;

said copolymer having a weight average molecular weight of 1000 to 50000.

10. A support for recording sheets comprising a substrate and an electroconductive layer containing a linear random N-substituted acrylamide copolymer comprising:

(1) 65 to 99% by mole of ethylene units having the formula (I):

—(CH₂—CH₂)—     (I)

(2) 1 to 15% by mole of acrylate units having the formula (II):

wherein R¹ is an alkyl group having 1 to 4 carbon atoms, and (3) 1 to 35% by mole of acrylamide units having the formula (III):

wherein R² is an alkylene group having 2 to 8 carbon atoms, R³ and R⁴ are the same or different and each is an alkyl group having 1 to 4 carbon atoms, R⁵ is an alkyl group having 1 to 12 carbon atoms, an arylalhkl group having 6 to 12 carbon atoms or an alicyclic alkyl group having 6 to 12 carbon atoms, and X is a halogen atom, a group having the formula: CH₃OSO₃— or a group having the formula: C₂H₅OSO₃—;

said copolymer having a weight average molecular weight of 1000 to 50000.

11. An electroconductive paper comprising paper having a layer of a linear random N-substituted acrylamide copolymer comprising:

(1) 65 to 99% by mole of ethylene units having the formula (I):

—(CH₂—CH₂)—     (I)

(2) 1 to 15% by mole of acrylate units having the formula (II):

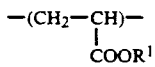 (II)

wherein $R^1$ is an alkyl group having 1 to 4 carbon atoms, and (3) 1 to 35% by mole of acrylamide units having the formula (III):

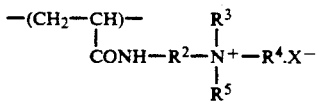 (III)

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

12. An electrostatic recording paper comprising paper, a high resistant dielectric layer and an electroconductive layer comprising an olefinic resin containing a linear random N-substituted acrylamide copolymer comprising:

(1) 65 to 99% by mole of ethylene units having the formula (I):

$-(CH_2-CH_2)-$ (I)

(2) 1 to 15% by mole of acrylate units having the formula (II):

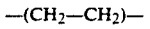 (II)

wherein $R^1$ is an alkyl group having 1 to 4 carbon atoms, and (3) 1 to 35% by mole of acrylamide units having the formula (III):

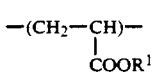 (III)

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

13. A foamed article comprising an olefinic resin containing a linear random N-substituted acrylamide copolymer comprising:

(1) 65 to 99% by mole of ethylene units having the formula (I):

$-(CH_2-CH_2)-$ (I)

(2) 1 to 15% by mole of acrylate units having the formula (II):

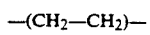 (II)

wherein $R^1$ is an alkyl group having 1 to 4 carbon atoms, and (3) 1 to 35% by mole of acrylamide units having the formula (III):

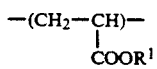 (III)

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

14. A laminate of foamed articles having an olefinic resin foamed article layer containing a linear random N-substituted acrylamide copolymer comprising:

(1) 65 to 99% by mole of ethylene units having the formula (I):

$-(CH_2-CH_2)-$ (I)

(2) 1 to 15% by mole of acrylate units having the formula (II):

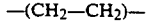 (II)

wherein $R^1$ is an alkyl group having 1 to 4 carbon atoms, and (3) 1 to 35% by mole of acrylamide units having the formula (III):

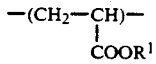 (III)

wherein $R^2$ is an alkylene group having 2 to 8 carbon atoms, $R^3$ and $R^4$ are the same or different and each is an alkyl group having 1 to 4 carbon atoms, $R^5$ is an alkyl group having 1 to 12 carbon atoms, an arylalkyl group having 6 to 12 carbon atoms or an alicyclic alkyl group having 6 to 12 carbon atoms, and X is a halogen atom, a group having the formula: $CH_3OSO_3-$ or a group having the formula: $C_2H_5OSO_3-$;
said copolymer having a weight average molecular weight of 1000 to 50000.

* * * * *

UNITED STATES PATENT AND TRADEMARK OFFICE
CERTIFICATE OF CORRECTION

PATENT NO.: 5,202,193
DATED : April 13, 1993
INVENTOR(S): SUMI et al.

It is certified that error appears in the above-identified patent and that said Letters Patent is hereby corrected as shown below:

In the cover page, Item [73], in the Assignee's name,
change "Kai-Ichi Kogyo Seiyaku Co., Ltd."
to --Dai-Ichi Kogyo Seiyaku Co., Ltd.--

Signed and Sealed this

Fifth Day of April, 1994

*Attest:*

BRUCE LEHMAN

*Attesting Officer*    *Commissioner of Patents and Trademarks*